(12) United States Patent
Sato et al.

(10) Patent No.: US 12,360,375 B2
(45) Date of Patent: Jul. 15, 2025

(54) OPTICAL ELEMENT, LIGHT GUIDE ELEMENT, AND IMAGE DISPLAY DEVICE

(71) Applicant: FUJIFILM Corporation, Tokyo (JP)

(72) Inventors: Hiroshi Sato, Minamiashigara (JP); Yukito Saitoh, Minamiashigara (JP); Ayako Muramatsu, Minamiashigara (JP); Daisuke Kashiwagi, Minamiashigara (JP); Katsumi Sasata, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 342 days.

(21) Appl. No.: 18/168,312

(22) Filed: Feb. 13, 2023

(65) Prior Publication Data

US 2023/0229002 A1 Jul. 20, 2023

Related U.S. Application Data

(60) Division of application No. 17/034,535, filed on Sep. 28, 2020, now Pat. No. 11,630,308, which is a
(Continued)

(30) Foreign Application Priority Data

| Mar. 29, 2018 | (JP) | 2018-064084 |
| Dec. 11, 2018 | (JP) | 2018-231784 |

(51) Int. Cl.
*G02B 27/01* (2006.01)
*C09K 19/02* (2006.01)
(Continued)

(52) U.S. Cl.
CPC ...... *G02B 27/0172* (2013.01); *C09K 19/0208* (2013.01); *C09K 19/36* (2013.01);
(Continued)

(58) Field of Classification Search
None
See application file for complete search history.

(56) References Cited

U.S. PATENT DOCUMENTS

| 6,072,629 A | 6/2000 | Fan et al. |
| 2004/0263723 A1 | 12/2004 | Moon et al. |

(Continued)

FOREIGN PATENT DOCUMENTS

| JP | 2004-190157 A | 7/2004 |
| JP | 2005-49866 A | 2/2005 |

(Continued)

OTHER PUBLICATIONS

International Preliminary Report on Patentability (Forms PCT/IB/326, PCT/IB/373 and PCT/ISA/237) and Written Opinion of the International Searching Authority, dated Oct. 8, 2020, for International Application No. PCT/JP2019/014241, with an English translation.

(Continued)

*Primary Examiner* — Jerry Rahll
(74) *Attorney, Agent, or Firm* — Birch, Stewart, Kolasch & Birch, LLP

(57) ABSTRACT

Provided are an optical element that can make the brightness of light emitted from a light guide plate uniform, a light guide element, and an image display device. The optical element includes a patterned cholesteric liquid crystal layer that is obtained by immobilizing a cholesteric liquid crystalline phase, in which the patterned cholesteric liquid crystal layer has a liquid crystal alignment pattern in which a direction of an optical axis derived from a liquid crystal compound changes while continuously rotating in at least one in-plane direction, and the patterned cholesteric liquid crystal layer has regions having different pitches of helical structures in a plane.

5 Claims, 15 Drawing Sheets

Related U.S. Application Data continuation of application No. PCT/JP2019/014241, filed on Mar. 29, 2019.

(51) Int. Cl.
    *C09K 19/36*     (2006.01)
    *C09K 19/56*     (2006.01)
    *F21V 8/00*     (2006.01)
    *G02B 5/18*     (2006.01)

(52) U.S. Cl.
    CPC ............ *C09K 19/56* (2013.01); *G02B 5/1828* (2013.01); *G02B 6/0016* (2013.01); *G02B 6/0038* (2013.01); *G02B 2027/0123* (2013.01); *G02B 2027/0178* (2013.01)

(56) References Cited

U.S. PATENT DOCUMENTS

| | | | |
|---|---|---|---|
| 2008/0278675 | A1 | 11/2008 | Escuti et al. |
| 2010/0225876 | A1 | 9/2010 | Escuti et al. |
| 2013/0027656 | A1 | 1/2013 | Escuti et al. |
| 2014/0126029 | A1 | 5/2014 | Fuetterer |
| 2015/0205182 | A1 | 7/2015 | Leister |
| 2016/0033698 | A1 | 2/2016 | Escuti et al. |
| 2016/0231588 | A1 | 8/2016 | Saarikko et al. |
| 2017/0373459 | A1 | 12/2017 | Weng et al. |
| 2018/0052264 | A1 | 2/2018 | Saitoh et al. |
| 2018/0143438 | A1 | 5/2018 | Oh |
| 2018/0164480 | A1* | 6/2018 | Yoshida ................ G02F 1/1396 |
| 2019/0086786 | A1 | 3/2019 | Katoh et al. |
| 2019/0317352 | A1 | 10/2019 | Saitoh et al. |
| 2022/0179257 | A1 | 6/2022 | Oh |

FOREIGN PATENT DOCUMENTS

| | | |
|---|---|---|
| JP | 2007-504484 A | 3/2007 |
| JP | 2010-525394 A | 7/2010 |
| JP | 2012-181360 A | 9/2012 |
| JP | 5276847-82 | 8/2013 |
| JP | 2014-628597 A | 10/2014 |
| JP | 2017-522601 A | 8/2017 |
| JP | 2019-536101 A | 12/2019 |
| JP | 2020-501186 A | 1/2020 |
| WO | WO 2016/194890 A1 | 12/2016 |
| WO | WO-2016194961 A1 * 12/2016 ........... G02B 5/0252 |
| WO | WO 2017/180403 A1 | 10/2017 |
| WO | WO 2017/199812 A1 | 11/2017 |

OTHER PUBLICATIONS

International Search Report (Form PCT/ISA/210), dated May 7, 2019, for International Application No. PCT/JP2019/014241, with an English translation.

Japanese Office Action for corresponding Japanese Application No. 2021-186298, dated Nov. 22, 2022, with English translation.

Japanese Office Action for corresponding Japanese Office Action for Japanese Application No. 2020-511144, dated Jul. 13, 2021, with English translation.

Kress et al., "Towards the Ultimate Mixed Reality Experience: Hololens Display Architecture Choices", SID 2017 Digest, pp. 127-131 (5 pages).

Office Action issued Jun. 28, 2022 in corresponding U.S. Appl. No. 17/034,535.

Office Action issued Mar. 14, 2022 in corresponding U.S. Appl. No. 17/034,535.

* cited by examiner

OPTICAL ELEMENT, LIGHT GUIDE ELEMENT, AND IMAGE DISPLAY DEVICE

CROSS-REFERENCE TO RELATED APPLICATIONS

This application is a Divisional of U.S. application Ser. No. 17/034,535, filed Sep. 28, 2020, which is a Continuation of PCT International Application No. PCT/JP2019/014241, filed on Mar. 29, 2019, which claims priority under 35 U.S.C. § 119(a) to Japanese Patent Application No. 2018-064084, filed on Mar. 29, 2018, and Japanese Patent Application No. 2018-231784, filed on Dec. 11, 2018. Each of the above applications is hereby expressly incorporated by reference, in its entirety, into the present application.

BACKGROUND OF THE INVENTION

1. Field of the Invention

The present invention relates to an optical element that diffracts incident light, and a light guide element and an image display device including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMID).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that is actually being seen by a user.

In AR glasses, light (projection light) projected from a display is diffracted (refracted) using a diffraction element to be incident into one end portion of a light guide plate. As a result, light is introduced into the light guide plate with an angle and propagates up to another end portion in the light guide plate while being reflected from an interface (surface) of the light guide plate. The light propagated in the light guide plate is also diffracted by the diffraction element in the other end portion of the light guide plate and is emitted from the light guide plate to an observation position by the user.

As this diffraction grating, a diffraction element formed of liquid crystal is known. For example, JP2017-522601A describes an optical element comprising a plurality of stacked birefringent sublayers configured to alter a direction of propagation of light passing therethrough according to a Bragg condition, in which the stacked birefringent sublayers respectively comprise local optical axes that vary along respective interfaces between adjacent ones of the stacked birefringent sublayers to define respective grating periods. The optical element described in JP2017-522601A diffracts transmitted light. JP2017-522601A describes that light incident into a substrate (light guide plate) is diffracted by an optical element such that the light is incident at angle at which the light is totally reflected in the substrate and is guided in a direction substantially perpendicular to the incidence direction of the light in the substrate (refer to FIG. 7 of JP2017-522601A).

JP5276847B describes a polarization diffraction grating comprising: a polarization sensitive photo-alignment layer; and at least first and second liquid crystal compositions that include a polymerizable mesogen and are arranged on the photo-alignment layer, in which an anisotropic alignment pattern corresponding to a polarization hologram is arranged in the photo-alignment layer, the first liquid crystal composition is arranged on and aligned by the alignment layer and at least partly polymerized, the second liquid crystal composition is arranged on and aligned by the first liquid crystal composition, and both the liquid crystal compositions have a thickness d of a layer determined by the formula d≤dmax=Λ/2, where d represents the thickness of the layer and Λ represents a pitch of the polarization diffraction grating.

WO2016/194961A discloses a reflective structure comprising: a plurality of helical structures each extending in a predetermined direction; a first incidence surface that intersects the predetermined direction and into which light is incident; and a reflecting surface that intersects the predetermined direction and reflects the light incident from the first incidence surface, in which the first incidence surface includes one of end portions in each of the plurality of helical structures, each of the plurality of helical structures includes a plurality of structural units that lies in the predetermined direction, each of the plurality of structural units includes a plurality of elements that are helically turned and laminated, each of the plurality of structural units includes a first end portion and a second end portion, the second end portion of one structural unit among structural units adjacent to each other in the predetermined direction forms the first end portion of the other structural unit, alignment directions of the elements positioned in the plurality of first end portions included in the plurality of helical structures are aligned, the reflecting surface includes at least one first end portion included in each of the plurality of helical structures, and the reflecting surface is not parallel to the first incidence surface.

Here, in AR glasses, in a case where light propagated in a light guide plate is diffracted by a diffraction element after adjusting the diffraction efficiency of the diffraction element, it is known that a viewing zone expands (exit pupil expansion) with a configuration in which a part of light is diffracted at a plurality of positions to be emitted to the outside of the light guide plate. For example, WO2017/180403A describes an optical waveguide including an input-coupler (diffraction element), in which the input-coupler couples light corresponding to an image and having a corresponding field of view (FOV) into the optical waveguide, splits the FOV of the image coupled into the optical waveguide into first and second portions, and diffracts a portion of the light corresponding to the image in a second direction toward a second-intermediate component, and an intermediate coupler (diffraction element) and an output-coupler (diffraction element) performs exit pupil expansion.

However, a screen using a cholesteric liquid crystal layer that is obtained by immobilizing a cholesteric liquid crystalline phase is known.

The cholesteric liquid crystal layer has wavelength selectivity in reflection and reflects only circularly polarized light in a specific turning direction. That is, for example, the cholesteric liquid crystal layer reflects only right circularly polarized light of red light and allows transmission of the other light.

By using the cholesteric liquid crystal layer, for example, a transparent projection screen through which an opposite side can be seen can be realized.

Light reflection by the cholesteric liquid crystal layer is specular reflection. For example, light incident into a cholesteric liquid crystal layer from a normal direction (front side) is reflected in the normal direction of the cholesteric liquid crystal layer.

Therefore, the application range of the cholesteric liquid crystal layer is limited.

On the other hand, WO2016/194961A describes a reflective structure including a cholesteric liquid crystal layer, in which light can be reflected with an angle in a predetermined direction with respect to specular reflection instead of specular reflection.

This reflective structure includes a plurality of helical structures each of which extends in a predetermined direction. In addition, this reflective structure includes: a first incidence surface that intersects the predetermined direction and into which light is incident; and a reflecting surface that intersects the predetermined direction and reflects the light incident from the first incidence surface, in which the first incidence surface includes one of two end portions in each of the plurality of helical structures. In addition, each of the plurality of helical structures includes a plurality of structural units that lies in the predetermined direction, and each of the plurality of structural units includes a plurality of elements that are helically turned and laminated. In addition, each of the plurality of structural units includes a first end portion and a second end portion, the second end portion of one structural unit among structural units adjacent to each other in the predetermined direction forms the first end portion of the other structural unit, and alignment directions of the elements positioned in the plurality of first end portions included in the plurality of helical structures are aligned. Further, the reflecting surface includes at least one first end portion included in each of the plurality of helical structures and is not parallel to the first incidence surface.

SUMMARY OF THE INVENTION

In a case where a liquid crystal diffraction element is used as a diffraction element of a light guide element used in AR glasses and diffracts a part of light at a plurality of positions to be emitted to the outside of the light guide plate for viewing zone expansion (exit pupil expansion) of AR glasses, there is a problem in that the brightness (light amount) of light emitted from the light guide plate is non-uniform in a case where the diffraction efficiency in a plane of the liquid crystal diffraction element is uniform.

An object of a first aspect of the present invention is to solve the above-described problems of the related art and to provide an optical element that can make the brightness of light emitted from a light guide plate uniform, a light guide element, and an image display device.

The reflective structure (cholesteric liquid crystal layer) described in WO2016/194961A includes the reflecting surface that is not parallel to the first incidence surface.

Therefore, the reflective structure described in WO2016/194961A reflects incident light with an angle in the predetermined direction with respect to specular reflection instead of specular reflection. For example, in the cholesteric liquid crystal layer described in WO2016/194961A, light incident from the normal direction is reflected with an angle with respect to the normal direction instead of being reflected in the normal direction.

As a result, in WO2016/194961A, the application range of the reflective structure including the cholesteric liquid crystal layer can be extended.

However, in the reflection of light from the cholesteric liquid crystal layer, a so-called blue shift (short-wavelength shift) in which the wavelength of light to be selectively reflected shifts to a short wavelength side occurs depending on angles of incidence light.

Therefore, the cholesteric liquid crystal layer described in WO2016/194961A reflects light with an angle in the predetermined direction with respect to specular reflection, and thus has a problem in that the amount of reflected light decreases due to influence of blue shift (short-wavelength shift) as the reflection angle increases.

In particular, in the case of a reflection element having a lens function, the reflection angle varies depending on incidence positions of light as described in WO2016/194961A. Therefore, there is a difference in the amount of light reflected depending on incidence positions in a plane of the element. That is, there is a region where the brightness of light reflected is low depending on incidence positions in a plane of the element.

An object of a second aspect of the present invention is to solve the problem in the related art and to provide an optical element that reflects light using a cholesteric liquid crystal layer, in which incident light can be reflected with an angle in a predetermined direction with respect to specular reflection and the amount of light reflected is also large.

In order to achieve the object, the first aspect of the present invention has the following configurations.

[1] An optical element comprising a patterned cholesteric liquid crystal layer that is obtained by immobilizing a cholesteric liquid crystalline phase, in which the patterned cholesteric liquid crystal layer has a liquid crystal alignment pattern in which a direction of an optical axis derived from a liquid crystal compound changes while continuously rotating in at least one in-plane direction, and the patterned cholesteric liquid crystal layer has regions having different pitches of helical structures in a plane.

[2] The optical element according to [1], in which in the patterned cholesteric liquid crystal layer, a pitch of a helical structure increases from one side toward another side in the in-plane direction.

[3] The optical element according to [1] or [2], comprising:

a plurality of cholesteric liquid crystal layers, in which the cholesteric liquid crystal layers have different twisted directions of helical structures, and at least one of the cholesteric liquid crystal layers is the patterned cholesteric liquid crystal layer.

[4] The optical element according to [3], comprising:

the patterned cholesteric liquid crystal layers having different twisted directions of helical structures, in which in the patterned cholesteric liquid crystal layers having different twisted directions of helical structures, directions in which the direction of the optical axis derived from the liquid crystal compound continuously rotates in the liquid crystal alignment pattern are different from each other.

[5] The optical element according to [3] or [4], in which the cholesteric liquid crystal layers having different twisted directions of helical structures have the same selective reflection center wavelength.

[6] The optical element according to any one of [1] to [5], comprising:
a plurality of patterned cholesteric liquid crystal layers,
in which the patterned cholesteric liquid crystal layers have the same twisted direction in helical structures.

[7] The optical element according to [6], comprising:
the patterned cholesteric liquid crystal layers having the same twisted direction in helical structures,
in which in the patterned cholesteric liquid crystal layers having the same twisted direction in helical structures, directions in which the direction of the optical axis derived from the liquid crystal compound continuously rotates in the liquid crystal alignment pattern are the same as each other.

[8] The optical element according to [6] or [7],
in which the patterned cholesteric liquid crystal layers having the same twisted direction of helical structures have different slope pitches.

[9] The optical element according to any one of [1] to [8],
in which in a case where a length over which the direction of the optical axis derived from the liquid crystal compound rotates by 180° in a plane is set as a single period, the length of the single period is 50 μm or less.

[10] The optical element according to [9],
in which the length of the single period is 1 μm or less.

[11] A light guide element comprising:
a light guide plate; and
the optical element according to any one of [1] to [10] that is disposed on a surface of the light guide plate,
in which the optical element is disposed such that a helical pitch of a helical structure of the patterned cholesteric liquid crystal layer gradually changes toward a traveling direction of light in the light guide plate.

[12] A light guide element comprising:
a light guide plate;
a first diffraction element that is disposed on a surface of the light guide plate and diffracts light to be incident into the light guide plate;
a third diffraction element that diffracts light propagated in the light guide plate to be emitted to an outside of the light guide plate; and
a second diffraction element that diffracts light propagated from a position of the first diffraction element in the light guide plate in a direction toward the third diffraction element,
in which at least one of the second diffraction element or the third diffraction element is the optical element according to any one of [1] to [10].

[13] The light guide element according to [12],
in which each of the second diffraction element and the third diffraction element is the optical element according to any one of [1] to [10].

[14] The light guide element according to [12] or [13],
in which each of the first diffraction element, the second diffraction element, and the third diffraction element is a cholesteric liquid crystal layer that has a liquid crystal alignment pattern in which a direction of an optical axis derived from a liquid crystal compound changes while continuously rotating in at least one in-plane direction, and
in a case where lengths of single periods of the liquid crystal alignment patterns in the first diffraction element, the second diffraction element, and the third diffraction element are represented by $\Lambda_1$, $\Lambda_2$, and $\Lambda_3$, respectively, $\Lambda_2 < \Lambda_1$, and $\Lambda_2 < \Lambda_3$ are satisfied.

[15] An image display device comprising:
the light guide element according to any one of [11] to [14]; and
a display element that emits an image to the light guide element.

[16] The image display device according to [15]
in which the display element emits circularly polarized light.

In order to achieve the object, the second aspect of the present invention has the following configurations.

[17] An optical element comprising:
a patterned cholesteric liquid crystal layer that is obtained by immobilizing a cholesteric liquid crystalline phase,
in which the patterned cholesteric liquid crystal layer has a liquid crystal alignment pattern in which a direction of an optical axis derived from a liquid crystal compound changes while continuously rotating in at least one in-plane direction,
the patterned cholesteric liquid crystal layer has regions having different pitches of helical structures in a plane, and
in a case where a length over which the direction of the optical axis derived from the liquid crystal compound rotates by 180° in a plane is set as a single period, the patterned cholesteric liquid crystal layer has regions having different lengths of the single periods.

[18] The optical element according to [17],
in which a plurality of regions having different lengths of the single periods in the liquid crystal alignment pattern are arranged in order of the length of the single period in the patterned cholesteric liquid crystal layer,
the plurality of regions having different pitches of helical structures are arranged in order of the length of the pitch of the helical structure, and
a direction of a permutation of the lengths of the single periods is different from a direction of a permutation of the lengths of the pitches of the helical structures.

[19] The optical element according to [17] or [18],
in which in the patterned cholesteric liquid crystal layer, the length of the single period in the liquid crystal alignment pattern gradually decreases from one side toward another side in the in-plane direction in which the direction of the optical axis derived from the liquid crystal compound changes while continuously rotating in the liquid crystal alignment pattern.

[20] The optical element according to any one of [17] to [19],
in which the liquid crystal alignment pattern is a concentric circular pattern having a concentric circular shape where the in-plane direction in which the direction of the optical axis derived from the liquid crystal compound changes while continuously rotating moves from an inside toward an outside.

[21] The optical element according to any one of [17] to [20], comprising:
a plurality of cholesteric liquid crystal layers,
in which the cholesteric liquid crystal layers have different twisted directions of helical structures, and
at least one of the cholesteric liquid crystal layers is the patterned cholesteric liquid crystal layer.

[22] The optical element according to [21] comprising:
the patterned cholesteric liquid crystal layers having different twisted directions of helical structures,
in which in the patterned cholesteric liquid crystal layers having different twisted directions of helical structures, directions in which the direction of the optical axis derived from the liquid crystal compound continuously rotates in the liquid crystal alignment pattern are different from each other.

[23] The optical element according to [21] or [22], in which the cholesteric liquid crystal layers having different twisted directions of helical structures have the same selective reflection center wavelength.

[24] The optical element according to any one of [17] to [23], comprising:
a plurality of patterned cholesteric liquid crystal layers, in which the patterned cholesteric liquid crystal layers have the same twisted direction in helical structures.

[25] The optical element according to [24], comprising:
the patterned cholesteric liquid crystal layers having the same twisted direction in helical structures,
in which in the patterned cholesteric liquid crystal layers having the same twisted direction in helical structures, directions in which the direction of the optical axis derived from the liquid crystal compound continuously rotates in the liquid crystal alignment pattern are the same as each other.

[26] The optical element according to [24] or [25], in which the cholesteric liquid crystal layers having the same twisted direction of helical structures have different slope pitches.

[27] The optical element according to any one of [17] to [26],
in which the length of the single period in the liquid crystal alignment pattern is 50 µm or less.

In the first aspect of the present invention, it is possible to provide an optical element that can make the brightness of light emitted from a light guide plate uniform, a light guide element, and an image display device.

In the second aspect of the present invention, it is possible to provide an optical element that reflects light using a cholesteric liquid crystal layer, in which incident light can be reflected with an angle in a predetermined direction with respect to specular reflection and the amount of light reflected is also large.

DESCRIPTION OF THE PREFERRED EMBODIMENTS

Figure 1:
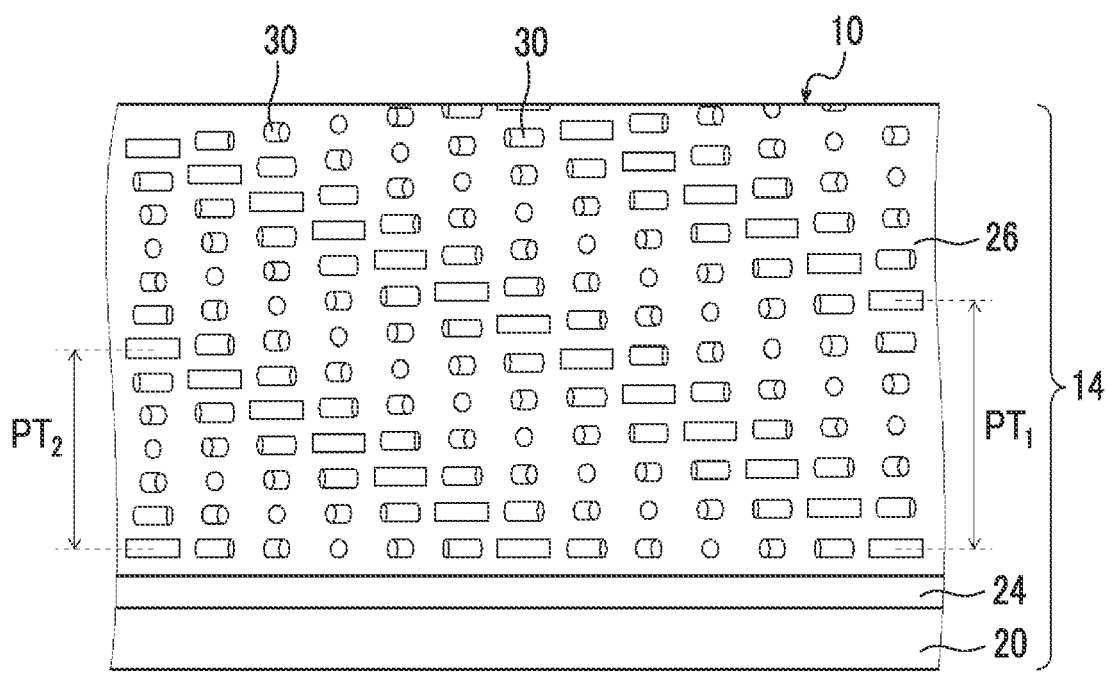
FIG. 1 is a conceptual diagram showing an example of an optical element according to a first aspect of the present invention.

Hereinafter, an optical element according to a first aspect of the present invention, a light guide element, and an image display device will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more. In addition, "perpendicular" or "parallel" regarding an angle represents a range of the exact angle ±5°, and "the same" regarding an angle represents that a difference from the exact angle is less than 5 degrees unless specified otherwise. The difference from the exact angle is preferably less than 4 degrees and more preferably less than 3 degrees.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

$T1/2=100-(100-Tmin)/2$ Expression for obtaining Half Value Transmittance:

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

In the present specification, Re(λ) represents an in-plane retardation at a wavelength λ. Unless specified otherwise, the wavelength λ refers to 550 nm.

In the present specification, Re(λ) is a value measured at the wavelength λ using AxoScan (manufactured by Axometrics, Inc.). By inputting an average refractive index ((nx+ny+nz)/3) and a thickness (d (μm)) to AxoScan, the following expressions can be calculated.

Slow Axis Direction (°)

$Re(λ)=R0(λ)$

R0(λ) is expressed as a numerical value calculated by AxoScan and represents Re(λ).

The optical element according to the first aspect of the present invention is a light reflection element that reflects incident light and includes a patterned cholesteric liquid crystal layer obtained by immobilizing a cholesteric liquid crystalline phase.

In the optical element according to the embodiment of the present invention, the patterned cholesteric liquid crystal layer has a liquid crystal alignment pattern in which a direction of an optical axis derived from a liquid crystal compound changes while continuously rotating in at least one in-plane direction. Here, in the liquid crystal alignment pattern, a length over which the direction of the optical axis rotates by 180° in the in-plane direction in which the direction of the optical axis changes while continuously rotating is set as a single period. In addition, the patterned cholesteric liquid crystal layer has regions having different pitches of helical structures in a plane.

Although described below in detail, the optical element according to the embodiment of the present invention includes the above-described structure such that the brightness of emitted light can be made uniform in a case where light propagated in a light guide plate is diffracted by the optical element to be emitted from the light guide plate.

First Embodiment

FIG. 1 is a diagram conceptually showing an example of the optical element according to the embodiment of the present invention.

An optical element 10 shown in the drawing selectively reflects light having a specific wavelength and includes a first reflecting layer 14.

In the optical element 10, the first reflecting layer 14 includes a support 20, an alignment film 24, and a patterned cholesteric liquid crystal layer 26.

In addition, the optical element 10 shown in the drawing includes the support 20 for the reflecting layer. However, the optical element according to the embodiment of the present invention does not necessarily include the support 20 for the reflecting layer.

For example, the optical element according to the embodiment of the present invention may be formed of only the alignment film and the patterned cholesteric liquid crystal layer or may be formed of only the patterned cholesteric liquid crystal layer by peeling off the support 20 of the first reflecting layer 14 from the above-described configuration.

That is, the optical element according to the embodiment of the present invention can use various layer configurations as long as the patterned cholesteric liquid crystal layer has a liquid crystal alignment pattern in which a direction of an optical axis derived from a liquid crystal compound changes while continuously rotating in at least one in-plane direction and the patterned cholesteric liquid crystal layer has regions having different pitches of helical structures in a plane.

The above-described point can be applied to all the optical elements according to respective aspects of the present invention described below.

<Support>

In the first reflecting layer 14, the support 20 supports the alignment film 24 and the patterned cholesteric liquid crystal layer 26.

As the support 20, various sheet-shaped materials (films or plate-shaped materials) can be used as long as they can support the alignment film 24 and the patterned cholesteric liquid crystal layer 26.

A transmittance of the support 20 with respect to corresponding light is preferably 50% or higher, more preferably 70% or higher, and still more preferably 85% or higher.

The thickness of the support 20 is not particularly limited and may be appropriately set depending on the use of the optical element 10, a material for forming the support 20, and the like in a range where the alignment film 24 and the patterned cholesteric liquid crystal layer 26 can be supported.

The thickness of the support 20 is preferably 1 to 1000 μm, more preferably 3 to 250 μm, and still more preferably 5 to 150 μm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.

<Alignment Film>

In the first reflecting layer 14, the alignment film 24 is formed on a surface of the support 20. The alignment film 24 is an alignment film for aligning the liquid crystal compound 30 to a predetermined liquid crystal alignment pattern during the formation of the patterned cholesteric liquid crystal layer 26 of the first reflecting layer 14.

The following description regarding the alignment film is also applicable to an alignment film provided in the reflection member described below. Accordingly, in the following description, in a case where it is not necessary to distinguish the alignment film from another alignment film, the alignment films will also be simply referred to as "alignment film". In addition, in a case where it is not necessary to distinguish the reflecting layer 14 and the patterned cholesteric liquid crystal layer 26 from another cholesteric liquid crystal layer, the reflecting layer 14 and the patterned cholesteric liquid crystal layer 26 will also be simply referred to as "cholesteric liquid crystal layer".

Although described below, in the optical element 10 according to the embodiment of the present invention, the patterned cholesteric liquid crystal layer has a liquid crystal alignment pattern in which a direction of an optical axis 30A (refer to FIG. 2) derived from the liquid crystal compound 30 changes while continuously rotating in one in-plane direction.

In addition, in the liquid crystal alignment pattern, a length over which the direction of the optical axis 30A rotates by 180° in the in-plane direction in which the direction of the optical axis 30A changes while continuously rotating is set as a single period Λ (a rotation period of the optical axis).

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as if-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 4:
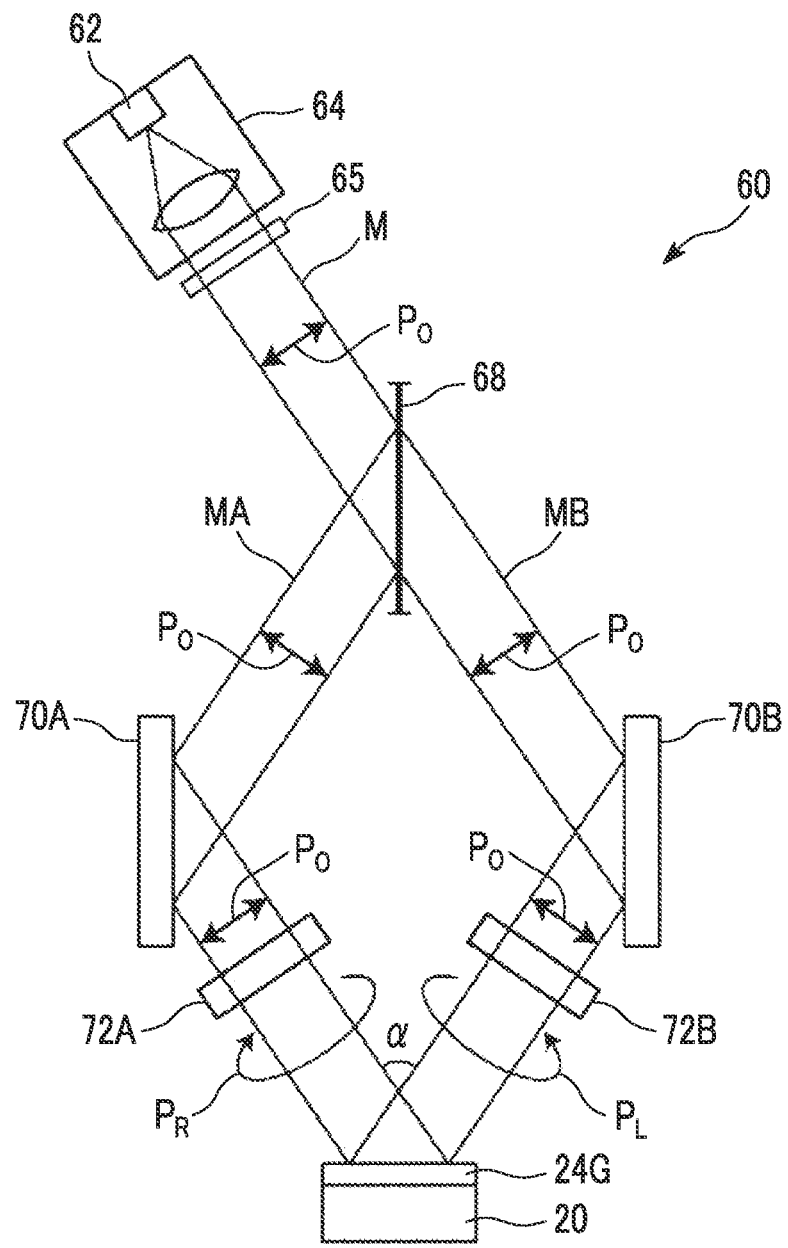
FIG. 4 is a conceptual diagram showing one example of an exposure device that exposes an alignment film of the optical element shown in FIG. 1.

FIG. 4 conceptually shows an example of an exposure device that exposes the alignment film to form an alignment pattern. In the example shown in FIG. 4, for example, the exposure of the alignment film 24 of the first reflecting layer 14 is shown.

An exposure device 60 shown in FIG. 4 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24 on which the alignment pattern is not yet formed is disposed at an exposed portion, the two beams MA and MB intersect and interfere each other on the alignment film 24, and the alignment film 24 is irradiated with and exposed to the interference light.

Due to the interference at this time, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersection angle α between the two beams MA and MB, the period of the alignment pattern can be adjusted. That is, by adjusting the intersection angle α in the exposure device 60, in the alignment pattern in which the optical axis 30A derived from the liquid crystal compound 30 continuously rotates in the in-plane direction, the length of the single period over which the optical axis 30A rotates by 180° in the in-plane direction in which the optical axis 30A rotates can be adjusted.

By forming the cholesteric liquid crystal layer on the alignment film having the alignment pattern in which the alignment state periodically changes, as described below, the patterned cholesteric liquid crystal layer 26 having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the patterned cholesteric liquid crystal layer has the liquid crystal alignment pattern in which the direction of the optical axis 30A derived from the liquid crystal compound 30 changes while continuously rotating in at least one in-plane direction.

<Patterned Cholesteric Liquid Crystal Layer>

In the first reflecting layer 14, the patterned cholesteric liquid crystal layer 26 is formed on the surface of the alignment film 24.

The patterned cholesteric liquid crystal layer 26 is obtained by immobilizing a cholesteric liquid crystalline phase, the patterned cholesteric liquid crystal layer has a liquid crystal alignment pattern in which a direction of an optical axis derived from a liquid crystal compound changes while continuously rotating in at least one in-plane direction, and the patterned cholesteric liquid crystal layer has regions having different pitches of helical structures in a plane.

Figure 2:
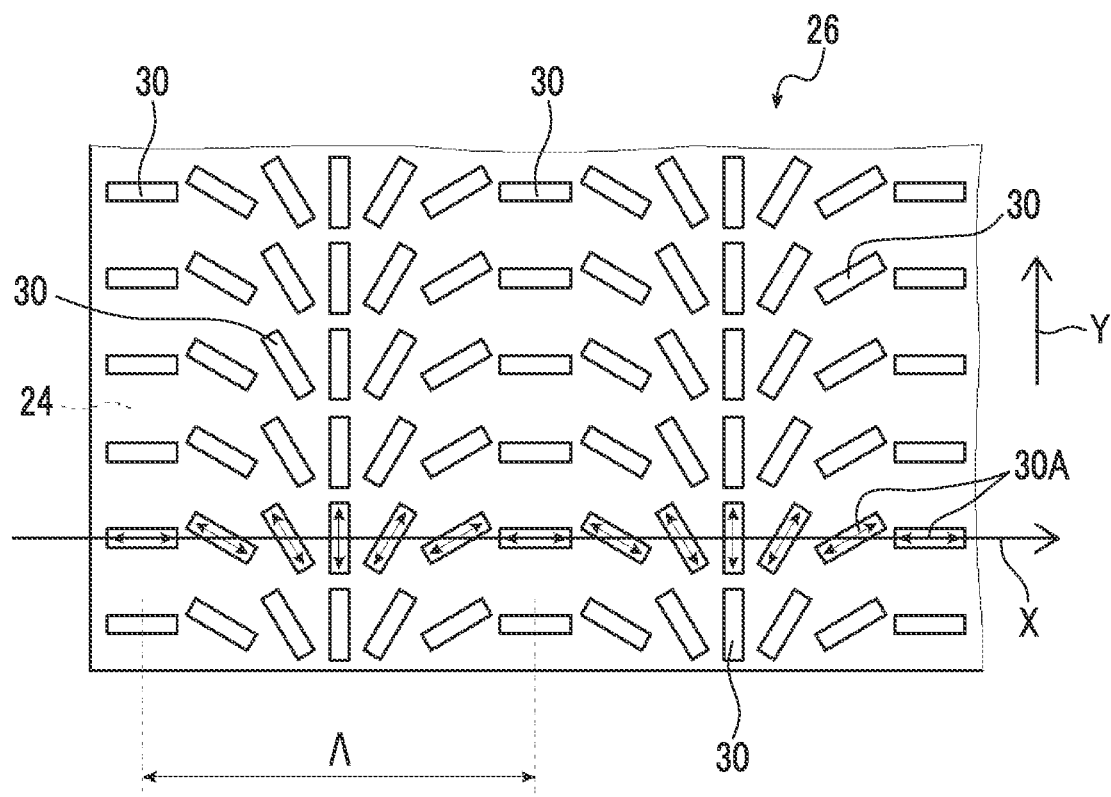
FIG. 2 is a plan view showing a cholesteric liquid crystal layer of the optical element shown in FIG. 1.

In FIG. 2, in order to simplify the drawing and to clarify the configuration of the optical element 10, only the liquid crystal compound 30 (liquid crystal compound molecules) on the surface of the alignment film in the patterned cholesteric liquid crystal layer 26 is conceptually shown. However, as conceptually shown in FIG. 1, the patterned cholesteric liquid crystal layer 26 has a helical structure in which the liquid crystal compound 30 is helically turned and laminated as in a cholesteric liquid crystal layer obtained by immobilizing a typical cholesteric liquid crystalline phase. In the helical structure, a configuration in which the liquid crystal compound 30 is helically rotated once (rotated by 360) and laminated is set as one helical pitch, and plural pitches of the helically turned liquid crystal compound 30 are laminated.

The patterned cholesteric liquid crystal layer has wavelength selective reflection properties.

For example, in a case where the patterned cholesteric liquid crystal layer 26 has a selective reflection center wavelength in a green wavelength range, the patterned cholesteric liquid crystal layer 26 reflects right circularly polarized light $G_R$ of green light and allows transmission of the other light.

Here, since the liquid crystal compound 30 rotates to be aligned in a plane direction, the patterned cholesteric liquid crystal layer 26 diffracts (refracts) incident circularly polarized light to be reflected in a direction in which the direction of the optical axis continuously rotates. At this time, the diffraction direction varies depending on the turning direction of incident circularly polarized light.

That is, the patterned cholesteric liquid crystal layer 26 reflects right circularly polarized light or left circularly polarized light having a selective reflection wavelength and diffracts the reflected light.

The patterned cholesteric liquid crystal layer 26 is obtained by immobilizing a cholesteric liquid crystalline phase. That is, the patterned cholesteric liquid crystal layer 26 is a layer formed of the liquid crystal compound 30 (liquid crystal material) having a cholesteric structure.

<<Cholesteric Liquid Crystalline Phase>>

It is known that the cholesteric liquid crystalline phase exhibits selective reflection properties at a specific wavelength. The center wavelength λ of selective reflection (selective reflection center wavelength λ) depends on a pitch P (=helical period) of a helical structure in the cholesteric liquid crystalline phase and satisfies a relationship of λ=n×P with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element 10 shown in the drawing, the cholesteric liquid crystal layer is a layer obtained by immobilizing a right-twisted cholesteric liquid crystalline phase.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection range (circularly polarized light reflection range) where selective reflection is exhibited depends on Δn of the cholesteric liquid crystalline phase and the helical pitch P and complies with a relationship of Δλ=Δn×P. Therefore, the width of the selective reflection range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and is, for example, 10 to 500 nm and preferably 20 to 300 nm and more preferably 30 to 100 nm.

Method of Forming Cholesteric Liquid Crystal Layer

The cholesteric liquid crystal layer (patterned cholesteric liquid crystal layer) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for turned nematic (TN) or super turned nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

—Photoreactive Chiral Agent—

In the present invention, it is preferable that a photoreactive chiral agent is used as the chiral agent. The photoreactive chiral agent is formed of, for example, a compound represented by the following Formula (I) and has properties capable of controlling an aligned structure of the liquid crystal compound and changing a helical pitch of liquid crystal, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; μm) of a liquid crystal molecule at a given temperature and converting the measured value into a value [μm$^{-1}$] in terms of the concentration of the chiral agent. In a case where a selective reflection color is formed by the photoreactive chiral agent depending on the illuminance of light, a change ratio in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

Formula (I)

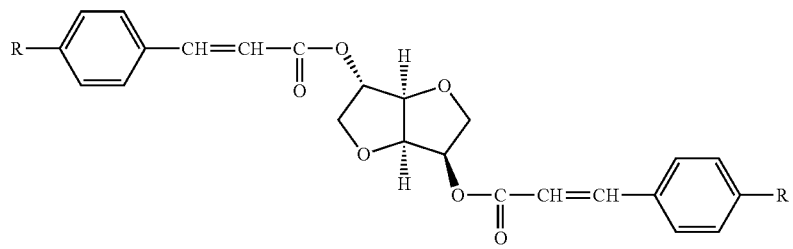

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

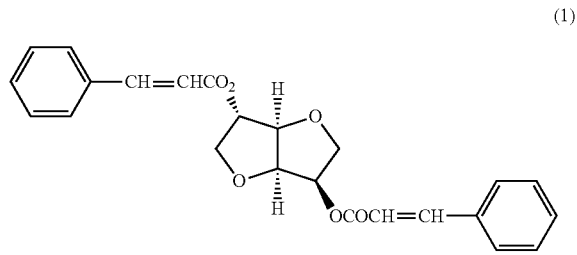

(1) Right Twisted
Mw = 406.43

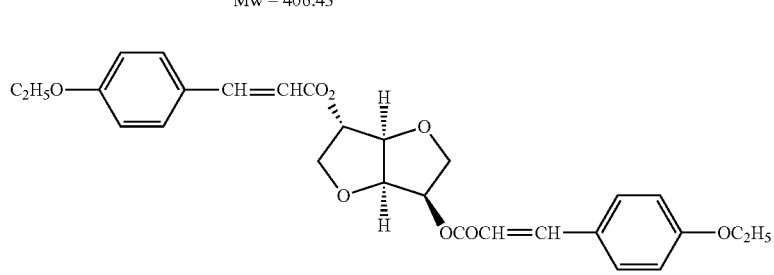

(2) Right Twisted
Mw = 466.48

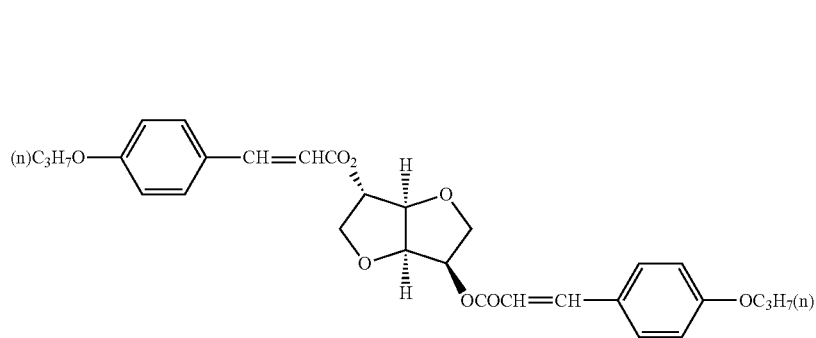

(3) Right Twisted
Mw = 494.53

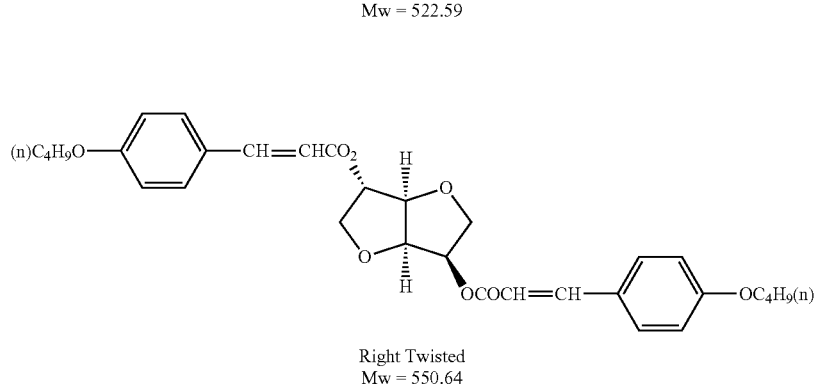

(4) Right Twisted
Mw = 522.59

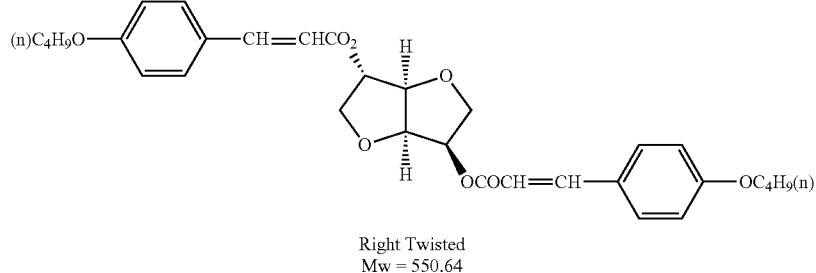

(5) Right Twisted
Mw = 550.64

-continued
(6)
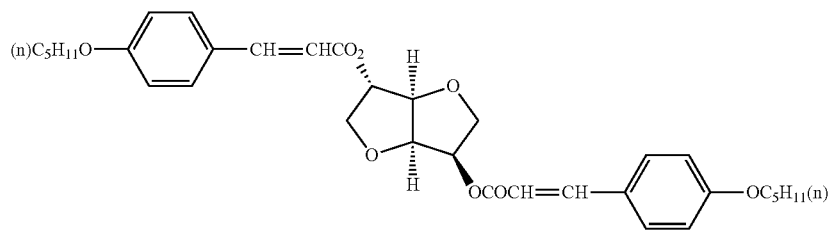
Right Twisted
Mw = 578.69
(7)
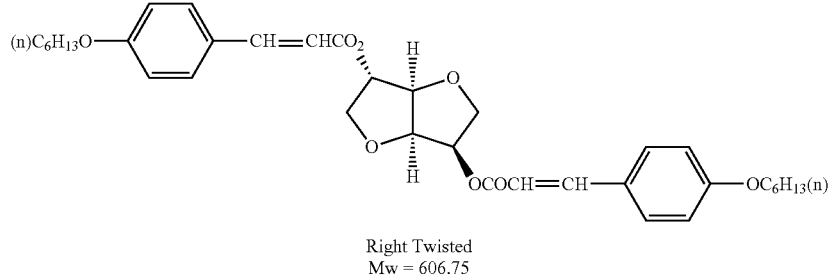
Right Twisted
Mw = 606.75
(8)
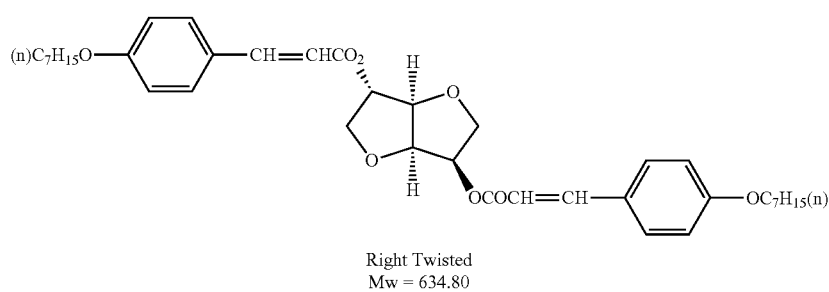
Right Twisted
Mw = 634.80
(9)
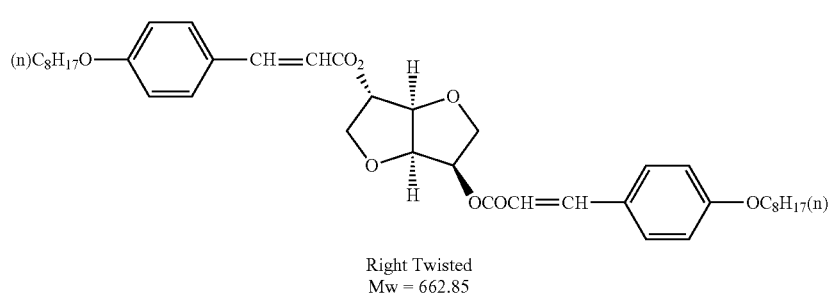
Right Twisted
Mw = 662.85
(10)
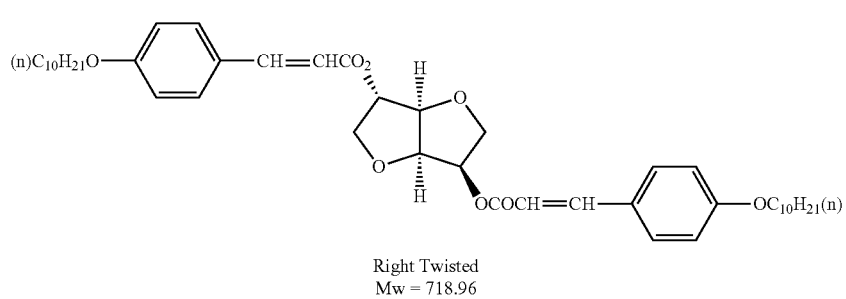
Right Twisted
Mw = 718.96

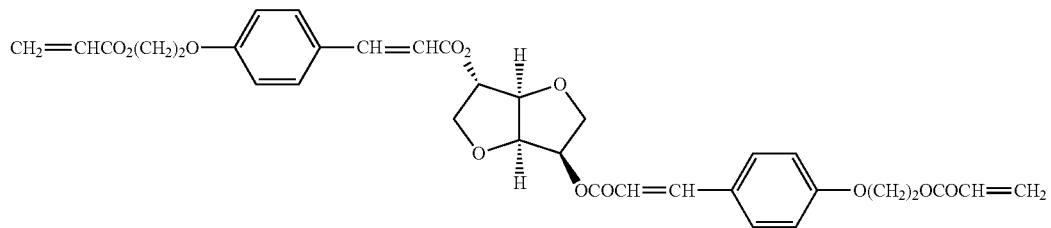
(11)
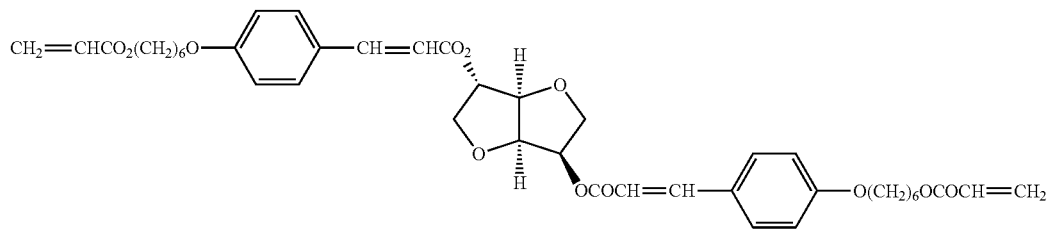
(12)
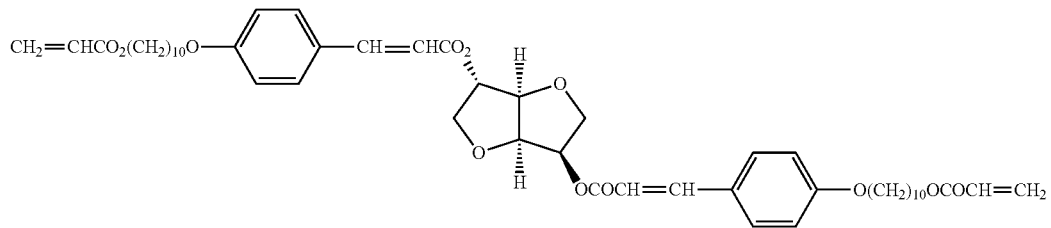
(13)
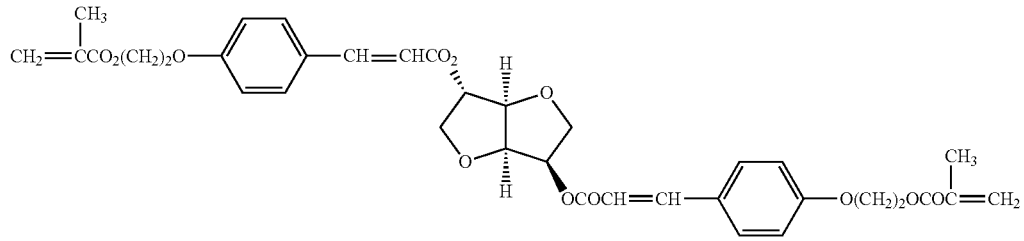
(14)
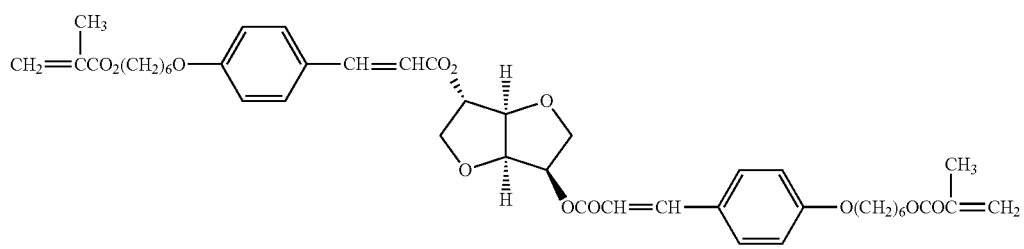
(15)
In the present invention, as the photoreactive chiral agent, for example, a photoreactive optically active compound represented by the following Formula (II) is also used.
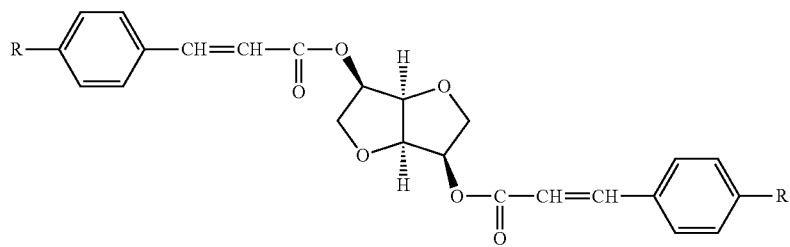
Formula (II)

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

(21)

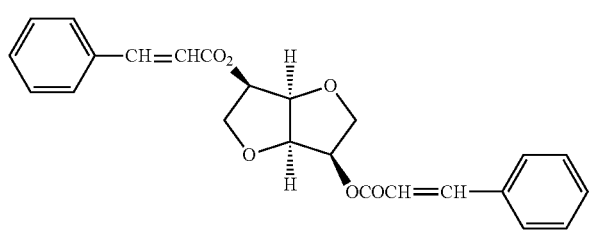

Left Twisted Mw = 406.43

(22)

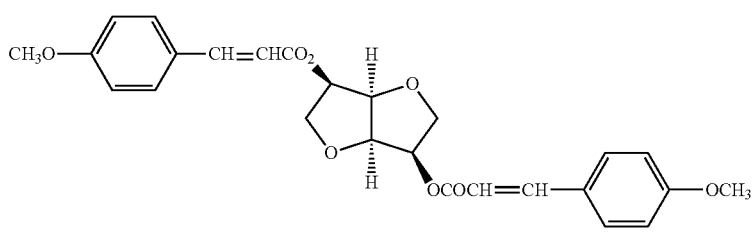

Left Twisted Mw = 466.48

(23)

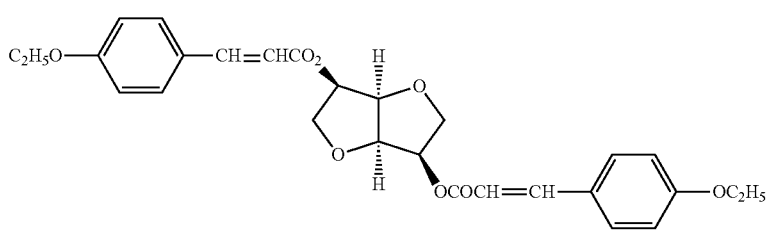

Left Twisted Mw = 494.53

(24)

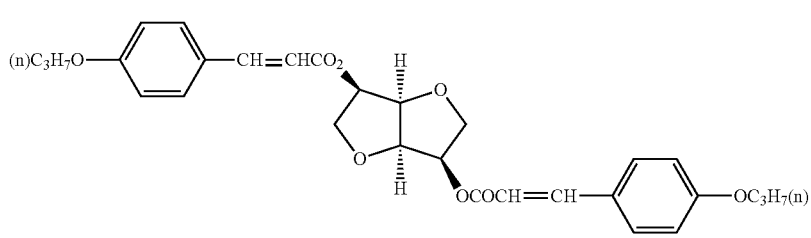

Left Twisted Mw = 522.59

-continued
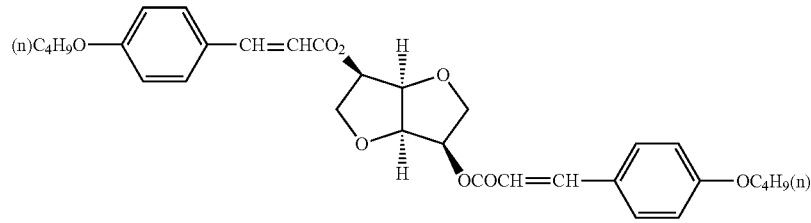
Left Twisted Mw = 550.64
(25)
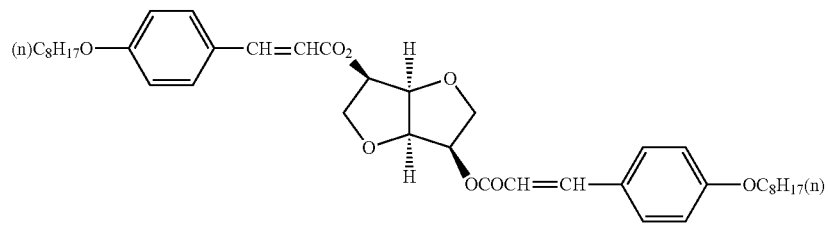
Left Twisted Mw = 662.85
(26)
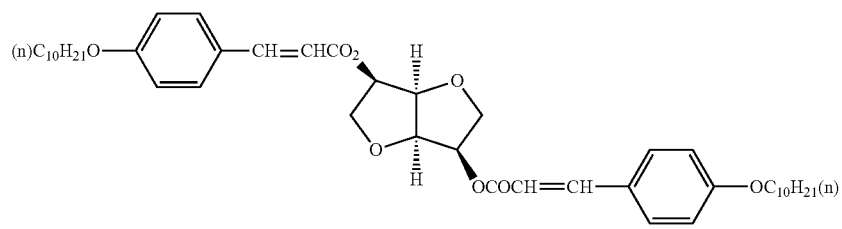
Left Twisted Mw = 716.96
(27)
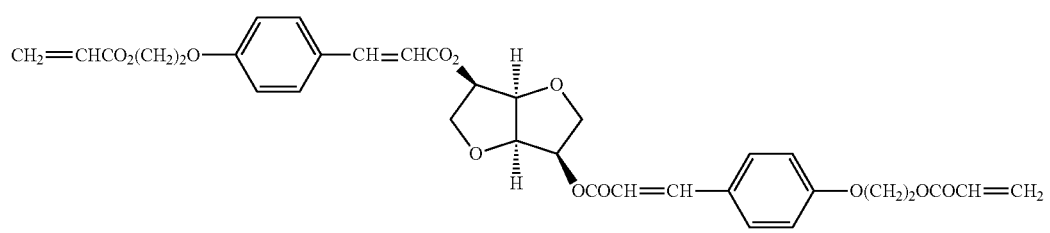
(28)
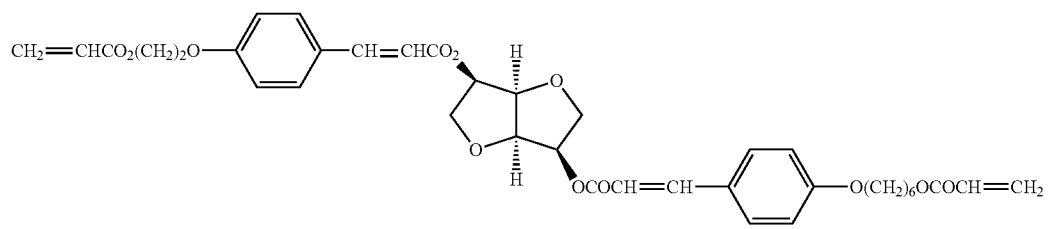
(29)
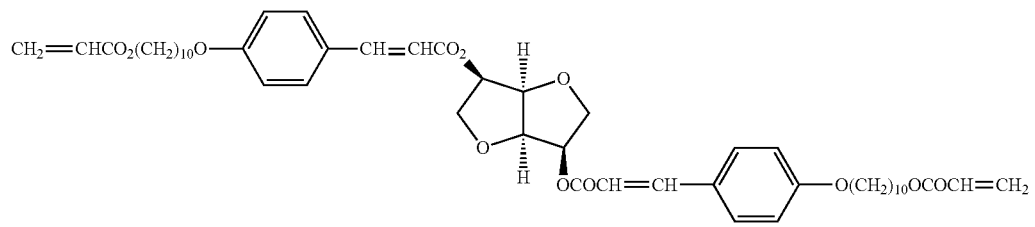
(30)

-continued

(31)
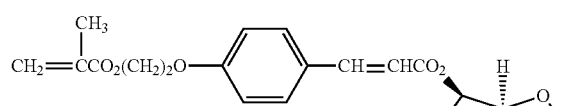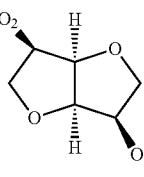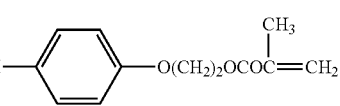

(32)
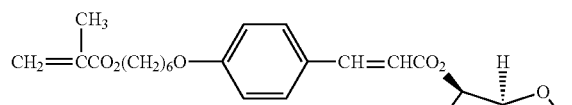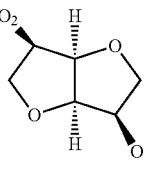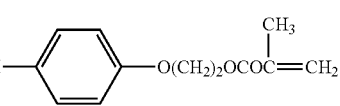

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-044451A, JP1998-509726A (JP-H10-509726A), WO1998/000428A, JP2000-506873A, JP1997-506088A(JP-H09-506088A), Liquid Crystals (1996, 21, 327), and Liquid Crystals (1998, 24, 219).

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A). The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound. That is, in a case where the cholesteric liquid crystal layer is formed on the alignment film, it is preferable that the cholesteric liquid crystal layer obtained by immobilizing a cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical element 10, the light reflectivity required for the cholesteric liquid crystal layer, the material for forming the cholesteric liquid crystal layer, and the like.

<<Liquid Crystal Alignment Pattern of Patterned Cholesteric Liquid Crystal Layer>>

In the optical element 10 according to the embodiment of the present invention, the patterned cholesteric liquid crystal layer has the liquid crystal alignment pattern in which the direction of the optical axis 30A derived from the liquid crystal compound 30 forming the cholesteric liquid crystalline phase changes while continuously rotating in the in-plane direction of the patterned cholesteric liquid crystal layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

FIG. 2 is a plan view conceptually showing the patterned cholesteric liquid crystal layer 26.

The plan view is a view in a case where the optical element 10 is seen from the top in FIG. 1, that is, a view in a case where the optical element 10 is seen from a thickness direction (laminating direction of the respective layers (films)).

In addition, as described above, in FIG. 2, in order to clarify the configuration of the optical element 10 according to the embodiment of the present invention, only the liquid crystal compound 30 on the surface of the alignment film 24 is shown.

FIG. 2 shows the patterned cholesteric liquid crystal layer 26 as a representative example. However, basically, a patterned cholesteric liquid crystal layer described below also has the same configuration and the same effects as those of the patterned cholesteric liquid crystal layer 26, except that the lengths A of the single periods of the liquid crystal alignment patterns described below or the reflection wavelength ranges are different from each other.

As shown in FIG. 2, on the surface of the alignment film 24, the liquid crystal compound 30 forming the patterned cholesteric liquid crystal layer 26 is two-dimensionally arranged according to the alignment pattern formed on the alignment film 24 as the lower layer in a predetermined in-plane direction indicated by arrow X and a direction perpendicular to the in-plane direction (arrow X direction).

In the following description, the direction perpendicular to the arrow X direction will be referred to as "Y direction" for convenience of description. That is, in FIG. 1 and FIG. 3 described below, the Y direction is a direction perpendicular to the paper plane.

In addition, the liquid crystal compound 30 forming the patterned cholesteric liquid crystal layer 26 has the liquid crystal alignment pattern in which the direction of the optical axis 30A changes while continuously rotating in the arrow X direction in a plane of the patterned cholesteric liquid crystal layer 26. In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ−180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the patterned cholesteric liquid crystal layer 26, the directions of the optical axes 30A are the same in the Y direction perpendicular to the arrow X direction, that is, the Y direction perpendicular to the in-plane direction in which the optical axis 30A continuously rotates.

In other words, in the liquid crystal compound 30 forming the patterned cholesteric liquid crystal layer 26, angles between the optical axes 30A of the liquid crystal compound 30 and the arrow X direction are the same in the Y direction.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating in a plane is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 2, a distance of centers in the arrow X direction of two liquid crystal compounds 30 in which the arrow X direction and the direction of the optical axis 30A match each other is the length Λ of the single period.

In the following description, the length Λ of the single period will also be referred to as "single period Λ".

In the optical element 10 according to the embodiment of the present invention, in the liquid crystal alignment pattern of the patterned cholesteric liquid crystal layer, the single period Λ is repeated in the arrow X direction, that is, in the in-plane direction in which the direction of the optical axis 30A changes while continuously rotating.

The patterned cholesteric liquid crystal layer 26 has the liquid crystal alignment pattern in which the optical axis 30A changes while continuously rotating in the arrow X direction in a plane (the predetermined in-plane direction).

The cholesteric liquid crystal layer obtained by immobilizing a cholesteric liquid crystalline phase typically reflects incident light (circularly polarized light) by specular reflection.

On the other hand, the patterned cholesteric liquid crystal layer 26 having the above-described liquid crystal alignment pattern reflects incidence light in a direction having an angle in the arrow X direction with respect to specular reflection. For example, in the patterned cholesteric liquid crystal layer 26, light incident from the normal direction is reflected in a state where it is tilted as indicated by the arrow X with respect to the normal direction instead of being reflected in the normal direction. That is, the light incident from the normal direction refers to light incident from the front side that is light incident to be perpendicular to a main surface. The main surface refers to the maximum surface of a sheet-shaped material.

Hereinafter, the description will be made with reference to FIG. 3.

As described above, the patterned cholesteric crystal layer 26 selectively reflects one circularly polarized light in a selective reflection wavelength. For example, a case where the selective reflection wavelength of the patterned cholesteric liquid crystal layer 26 is green light and right circularly polarized light is reflected will be described. The patterned cholesteric liquid crystal layer 26 selectively reflects right circularly polarized light $G_R$ of green light.

Accordingly, in a case where light is incident into the first reflecting layer 14, the patterned cholesteric liquid crystal layer 26 reflects only right circularly polarized light $G_R$ of green light and allows transmission of the other light.

In a case where the right circularly polarized light $G_R$ of green light incident into the patterned cholesteric liquid crystal layer 26 is reflected from the patterned cholesteric liquid crystal layer 26, the absolute phase changes depending on the directions of the optical axes 30A of the respective liquid crystal compounds 30.

Here, in the patterned cholesteric liquid crystal layer 26, the optical axis 30A of the liquid crystal compound 30 changes while rotating in the arrow X direction (the in-plane direction). Therefore, the amount of change in the absolute phase of the incident right circularly polarized light $G_R$ of green light varies depending on the directions of the optical axes 30A.

Further, the liquid crystal alignment pattern formed in the patterned cholesteric liquid crystal layer 26 is a pattern that is periodic in the arrow X direction. Therefore, as conceptually shown in FIG. 3, an absolute phase Q that is periodic in the arrow X direction corresponding to the direction of the optical axis 30A is assigned to the right circularly polarized light $G_R$ of green light incident into the patterned cholesteric liquid crystal layer 26.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the patterned cholesteric liquid crystal layer 26, an equiphase surface E that is tilted in the arrow X direction with respect to an XY plane is formed for the right circularly polarized light $G_R$ of green light.

Therefore, the right circularly polarized light $G_R$ of green light is reflected in the normal direction of the equiphase surface E (direction perpendicular to the equiphase surface E), and the reflected right circularly polarized light $G_R$ of green light is reflected in a direction that is tilted in the arrow X direction with respect to the XY plane (main surface of the patterned cholesteric liquid crystal layer 26).

Here, a reflection angle of light from the patterned cholesteric liquid crystal layer in which the optical axis 30A of the liquid crystal compound 30 continuously rotates in the in-plane direction (arrow X direction) varies depending on wavelengths of light to be reflected. Specifically, as the wavelength of light increases, the angle of reflected light with respect to incidence light increases.

On the other hand, a reflection angle of light from the patterned cholesteric liquid crystal layer in which the optical axis 30A of the liquid crystal compound 30 continuously rotates in the arrow X direction (in-plane direction) varies depending on the length Λ of the single period of the liquid crystal alignment pattern over which the optical axis 30A rotates by 180° in the arrow X direction, that is, depending on the single period Λ. Specifically, as the length of the single period Λ decreases, the angle of reflected light with respect to incidence light increases.

In the optical element 10 according to the embodiment of the present invention, the single period Λ in the alignment pattern of the patterned cholesteric liquid crystal layer is not particularly limited and may be appropriately set depending on the use of the optical element 10 and the like.

Here, the optical element 10 according to the embodiment of the present invention can be suitably used as, for example, a diffraction element that reflects light displayed by a display to be introduced into a light guide plate in AR glasses or a diffraction element that reflects light propagated in a light guide plate to be emitted to an observation position by a user from the light guide plate.

At this time, in order to totally reflect light from the light guide plate, it is necessary to reflect light to be introduced into the light guide plate at a large angle to some degree with respect to incidence light. In addition, in order to reliably emit light propagated in the light guide plate, it is necessary to reflect at a large angle to some degree with respect to incidence light.

In addition, as described above, the reflection angle from the patterned cholesteric liquid crystal layer with respect to incidence light can be increased by reducing the single period Λ in the liquid crystal alignment pattern.

In consideration of this point, the single period Λ in the liquid crystal alignment pattern of the patterned cholesteric liquid crystal layer is preferably 50 µm or less, more preferably 10 µm or less, and still more preferably 1 µm or less.

In consideration of the accuracy of the liquid crystal alignment pattern and the like, the single period Λ in the liquid crystal alignment pattern of the patterned cholesteric liquid crystal layer is preferably 0.1 µm or more.

Here, in the optical element according to the embodiment of the present invention, the patterned cholesteric liquid crystal layer has the liquid crystal alignment pattern in which the direction of the optical axis 30A derived from the liquid crystal compound 30 forming the cholesteric liquid crystalline phase changes while continuously rotating in the in-plane direction of the patterned cholesteric liquid crystal layer.

In addition, in the optical element according to the embodiment of the present invention, as conceptually shown in FIG. 1, the patterned cholesteric liquid crystal layer has regions having different pitches of helical structures in a plane.

The optical element 10 shown in FIG. 1 is configured such that the patterned cholesteric liquid crystal layer 26 of the first reflecting layer 14 has a liquid crystal alignment pattern in which a direction of an optical axis derived from a liquid crystal compound changes while continuously rotating in at least one in-plane direction (hereinafter, referred to as "in-plane direction in which the optical axis rotates") and such that a pitch of a helical structure (hereinafter, referred to as "helical pitch") in the patterned cholesteric liquid crystal layer increases from one side toward another side in the in-plane direction in which the optical axis rotates.

Specifically, the patterned cholesteric liquid crystal layer 26 in FIG. 1 is configured such that a helical pitch $PT_1$ in the right side region of FIG. 1 is longer than a helical pitch $PT_2$ in the left side region of FIG. 1 and the helical pitch increases from the left side region toward the right side region in FIG. 1.

The helical pitch is the distance over which the liquid crystal compound rotates helically once (3600 rotation). In FIG. 1, schematically, distances over which the liquid crystal compound rotates half a rotation (180° rotation) are represented by $PT_1$ and $PT_2$.

Figure 5:
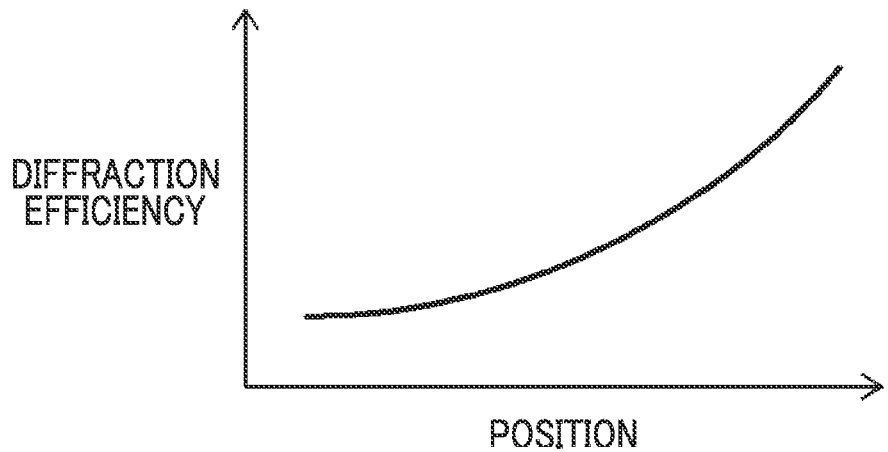
FIG. 5 is a schematic graph showing a relationship between a position and a diffraction efficiency.

The optical element according to the embodiment of the present invention has the above-described configuration such that, in a light guide element used in an AR display device or the like of augmented reality (AR) glasses or the like, in a case where the optical element according to the embodiment of the present invention is used as a diffraction element that diffracts light propagated in a light guide plate to be emitted from the light guide plate, the diffraction efficiency can be changed to increase in the light propagation direction (refer to FIG. 5). Therefore, even in a case where exit pupil expansion is performed, the brightness (light amount) of light emitted from the light guide plate can be made uniform.

Specifically, in a case where the selective reflection wavelength of the patterned cholesteric liquid crystal layer 26 is represented by $\lambda_a$, the patterned cholesteric liquid crystal layer 26 can reflect light at or near the selective reflection wavelength a. The reflection efficiency from the patterned cholesteric liquid crystal layer 26 is the highest at the selective reflection wavelength $\lambda_a$, and as the wavelength of light incident into the patterned cholesteric liquid crystal layer 26 becomes distant from the selective reflection wavelength $\lambda_a$, the reflection efficiency from the patterned cholesteric liquid crystal layer 26 decreases. Therefore, the diffraction efficiency from the patterned cholesteric liquid crystal layer 26 is also the highest at the selective reflection wavelength a, and as the wavelength of light incident into the patterned cholesteric liquid crystal layer 26 becomes distant from the selective reflection wavelength $\lambda_a$, the diffraction efficiency from the patterned cholesteric liquid crystal layer 26 decreases.

Accordingly, in the patterned cholesteric liquid crystal layer, the helical pitch changes from one side toward another side in the in-plane direction in which the optical axis rotates such that the diffraction efficiency can be changed.

For example, in a case where the optical element according to the embodiment of the present invention is used as a diffraction element of a light guide element used in an AR display device or the like, in the patterned cholesteric liquid crystal layer, the helical pitch increases from one side toward another side in the in-plane direction in which the optical axis rotates. As a result, as shown in FIG. 5, a configuration the diffraction efficiency increases from one side toward another side in the in-plane direction in which the optical axis rotates can be adopted.

This way, in the patterned cholesteric liquid crystal layer, the diffraction efficiency increases from one side toward another side in the in-plane direction in which the optical axis rotates. As a result, even in a case where exit pupil expansion is performed in a light guide element used in an AR display device or the like, the brightness (light amount) of light emitted from a light guide plate can be made uniform.

This point will be described below.

Figure 11:
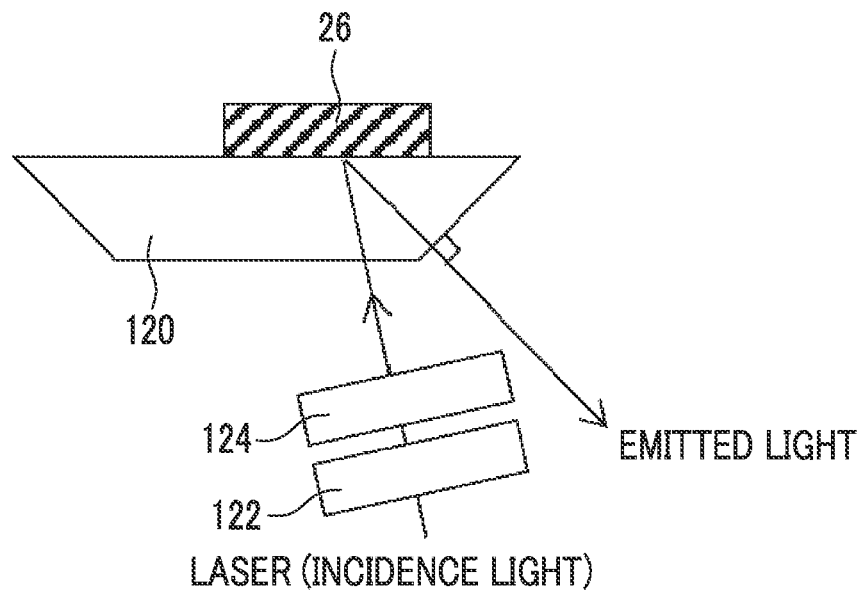
FIG. 11 is a schematic diagram showing a method of measuring the diffraction efficiency.

Here, the diffraction efficiency refers to a ratio of the amount of diffracted light to the amount of light incident into a diffraction element. The patterned cholesteric liquid crystal layer 26 is transferred to a dove prism 120 (refractive index=1.517, slope angle=45°) as shown in FIG. 11, laser light having a predetermined wavelength is caused to transmit through a linear polarizer 122 and a λ/4 plate 124 to be converted into right circularly polarized light, and the right circularly polarized light is caused to be incident into the surface of the patterned cholesteric liquid crystal layer 26 with an angle that is set such that diffracted light is emitted vertically from the slope. An emitted light intensity Lr is measured using a Power Meter 1918-C (manufactured by Newport Corporation), and a ratio (Lr/Li×100 [%]) of the emitted light intensity Lr to an incidence light intensity Li is obtained as a diffraction efficiency.

In the patterned cholesteric liquid crystal layer in which the diffraction efficiency changes in the in-plane direction in which the optical axis rotates, a helical pitch of a region having a high diffraction efficiency may be set as a helical pitch of a selective reflection wavelength close to a wavelength of light to be reflected and diffracted. In addition, a helical pitch of a region having a low diffraction efficiency may be set as a helical pitch of a selective reflection wavelength distant from a wavelength of light to be reflected and diffracted. At this time, the helical pitch may be longer or shorter than the helical pitch of the selective reflection wavelength.

In addition, in a case where a direction in which regions having a constant helical pitch are arranged in the patterned cholesteric liquid crystal layer is set as a change direction of helical pitch, The change direction of helical pitch may be the same as or different from the in-plane direction in which the optical axis rotates. That is, the change direction of helical pitch may intersect the in-plane direction in which the optical axis rotates. Even in the configuration in which the change direction of helical pitch intersects the in-plane direction in which the optical axis rotates, the helical pitch changes (increases) from one side toward another side in the in-plane direction in which the optical axis rotates.

In the patterned cholesteric liquid crystal layer (cholesteric liquid crystal layer) according to the embodiment of the present invention having a liquid crystal alignment pattern in which a direction of an optical axis derived from a liquid crystal compound changes while continuously rotating in at least one in-plane direction, by adjusting a pitch of a helical structure in the cholesteric liquid crystalline phase, a slope pitch of tilted surfaces of bright portions and dark portions with respect to a main surface in a case where a cross-section of the patterned cholesteric liquid crystal layer is observed with a scanning electron microscope (SEM) (an interval between bright portions or between dark portions in the normal direction with respect to the slope is set as ½ surface pitch) can be adjusted, and the selective reflection center wavelength with respect to oblique light can be adjusted.

In addition, the optical element according to the embodiment of the present invention includes a plurality of cholesteric liquid crystal layers. In a case where the optical element includes a plurality of cholesteric liquid crystal layers, it is preferable that the optical element includes cholesteric liquid crystal layers having different twisted directions of helical structures. In addition, in a case where the optical element includes a plurality of cholesteric liquid crystal layers, at least one of the cholesteric liquid crystal layers may be a patterned cholesteric liquid crystal layer, and it is preferable that two or more of the cholesteric liquid crystal layers are patterned cholesteric liquid crystal layers.

In addition, in a case where the optical element according to the embodiment of the present invention includes two or more patterned cholesteric liquid crystal layers, it is preferable that the optical element includes patterned cholesteric liquid crystal layers having different twisted directions of helical structures.

Figure 3:
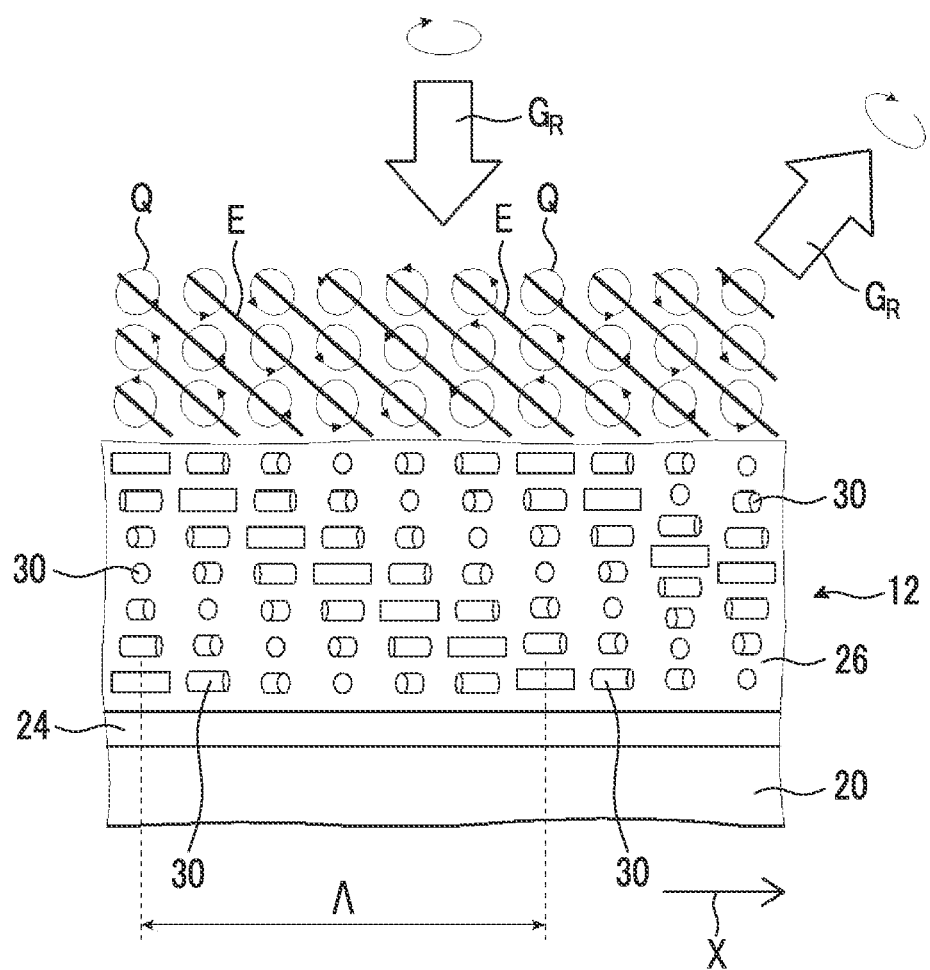
FIG. 3 is a conceptual diagram showing an action of the cholesteric liquid crystal layer of the optical element shown in FIG. 1.

For example, in FIG. 3, in a patterned cholesteric liquid crystal layer that has a liquid crystal alignment pattern in which a direction of an optical axis derived from a liquid crystal compound rotates in one in-plane direction and that has regions having different pitches of helical structures in a plane, optically-anisotropic layers having different directions (senses of helical structures) of circularly polarized light to be reflected may be laminated and used.

This way, the optical element further includes patterned cholesteric liquid crystal layers having different directions (senses of helical structures) of circularly polarized light to be reflected such that incidence light in various polarization states can be efficiently reflected.

Here, it is preferable that the patterned cholesteric liquid crystal layers have the same (substantially the same) selective reflection center wavelength.

This way, by providing the patterned cholesteric liquid crystal layers having the same selective reflection center wavelength and different directions of circularly polarized light to be reflected, a reflectivity of specific light can be improved.

Here, in the patterned cholesteric liquid crystal layers having the same selective reflection center wavelength and different directions of circularly polarized light to be reflected, it is preferable that the rotation directions of the optical axes 30A of the liquid crystal compound 30 in the liquid crystal alignment pattern are different from each other.

For example, in a case where the rotation direction of the optical axis 30A of the liquid crystal compound 30 in the patterned cholesteric liquid crystal layer 26 that reflects right circularly polarized light of green light is clockwise as shown in FIG. 2, it is preferable that the rotation direction of the optical axis 30A of the liquid crystal compound 30 in the second patterned cholesteric liquid crystal layer that reflects left circularly polarized light of green light is counterclockwise.

In the patterned cholesteric liquid crystal layers in which the optical axis 30A of the liquid crystal compound 30 continuously rotates in the arrow X direction (the in-plane direction), in a case where the directions of circularly polarized light are different from each other and the rotation directions of the optical axes 30A are the same, a reflection direction of circularly polarized light in the patterned cholesteric liquid crystal layer that reflects right circularly polarized light is opposite to that in the patterned cholesteric liquid crystal layer that reflects left circularly polarized light.

On the other hand, in the patterned cholesteric liquid crystal layers having the same selective reflection center wavelength and different directions of circularly polarized light to be reflected, by setting the rotation directions of the optical axes 30A of the liquid crystal compound 30 in the liquid crystal alignment pattern to be opposite to each other, a reflection direction (diffraction direction) of circularly polarized light in the patterned cholesteric liquid crystal layer that reflects right circularly polarized light can be made to be the same as that in the patterned cholesteric liquid crystal layer that reflects left circularly polarized light.

In addition, this way, in a case where the optical element according to the embodiment of the present invention includes the patterned cholesteric liquid crystal layers having the same selective reflection center wavelength and different directions of circularly polarized light to be reflected, it is preferable that the single periods Λ in the liquid crystal alignment patterns of the patterned cholesteric liquid crystal layers having the same selective reflection center wavelength are the same. As a result, a diffraction angle with respect to right circularly polarized light and a diffraction angle with respect to left circularly polarized light can be made to be the same.

However, the optical element according to the embodiment of the present invention is not limited to this configuration and may include a combination of patterned cholesteric liquid crystal layers having different directions of circularly polarized light to be reflected and including an overlapping portion in selective reflection wavelength ranges.

That is, in the optical element according to the embodiment of the present invention, even in a case where the selective reflection wavelength ranges of the two patterned cholesteric liquid crystal layers forming the combination of the patterned cholesteric liquid crystal layers do not completely match each other, as long as at least a part of the selective reflection wavelength ranges includes an overlapping portion, light having a wavelength in the overlapping range (hatched area) can be reflected in a large amount of light.

Here, from the viewpoint of the amount of light reflected in the optical element, it is preferable that the patterned cholesteric liquid crystal layers forming the combination of the patterned cholesteric liquid crystal layers include a wide overlapping range in the selective reflection wavelength ranges. Specifically, in a case where a range between two wavelengths of a half value transmittance of the patterned cholesteric liquid crystal layers forming the combination of the patterned cholesteric liquid crystal layers is represented by $\Delta\lambda_h$, a difference between selective reflection center wavelengths is preferably $0.8\times\Delta\lambda_h$ nm or less, more preferably $0.6\times\Delta\lambda_h$ nm or less, and still more preferably $0.4\times\Delta\lambda_h$ nm or less. In particular, it is preferable that the selective reflection center wavelengths match each other, and it is more preferable that the patterned cholesteric liquid crystal layers have the same selective reflection wavelength range.

In a case where ranges between two wavelengths of a half value transmittance of the two patterned cholesteric liquid crystal layers are different, the average value thereof is used as $\Delta\lambda_h$.

In addition, in the optical element according to the embodiment of the present invention, it is preferable that the patterned cholesteric liquid crystal layers forming the combination of the patterned cholesteric liquid crystal layers have the same single period $\Lambda$. In the present invention, the lengths of the single periods $\Lambda$ in the liquid crystal alignment patterns being the same represents that the difference between the lengths of the single periods $\Lambda$ is 30% or lower. Here, in the patterned cholesteric liquid crystal layers forming the combination of the patterned cholesteric liquid crystal layers, it is preferable that the difference between the lengths of the single periods $\Lambda$ in the liquid crystal alignment patterns is small. As described above, the length of the single period $\Lambda$ decreases, the reflection angle with respect to incidence light increases. Accordingly, as the difference between the lengths of the single periods $\Lambda$ decreases, directions in which light is reflected from the patterned cholesteric liquid crystal layers forming the combination of the patterned cholesteric liquid crystal layers can be made similar to each other. In the patterned cholesteric liquid crystal layers forming the combination of the patterned cholesteric liquid crystal layers, the difference between the lengths of the single periods $\Lambda$ in the liquid crystal alignment patterns is preferably 20% or lower and more preferably 10% or lower. It is still more preferable that the single periods $\Lambda$ match each other.

In addition, in a case where the optical element according to the embodiment of the present invention includes two or more patterned cholesteric liquid crystal layers, it is also preferable that the optical element includes patterned cholesteric liquid crystal layers having the same twisted direction of helical structures.

For example, in FIG. 3, in a patterned cholesteric liquid crystal layer that has a liquid crystal alignment pattern in which a direction of an optical axis derived from a liquid crystal compound rotates in one in-plane direction and that has regions having different pitches of helical structures in a plane, optically-anisotropic layers having the same direction (sense of helical structures) of circularly polarized light to be reflected may be laminated and used.

Here, it is preferable that the patterned cholesteric liquid crystal layers have different selective reflection center wavelengths and include at least an overlapping portion in selective reflection center wavelengths.

This way, in a case where the patterned cholesteric liquid crystal layers have different selective reflection center wavelengths, include at least an overlapping portion in selective reflection center wavelengths, and have the same direction of circularly polarized light to be reflected, the selective reflection wavelength range can be widened. By widening the selective reflection wavelength range, obliquely incident light can also be efficiently reflected. In a case where the optical element is used as a diffraction element of a light guide element used in an AR display device or the like such as AR glasses, light can be efficiently reflected in a wide viewing angle range.

Here, in the patterned cholesteric liquid crystal layers having different selective reflection center wavelengths and the same direction of circularly polarized light to be reflected, it is preferable that the rotation directions of the optical axes 30A of the liquid crystal compound 30 in the liquid crystal alignment pattern are the same as each other.

In the patterned cholesteric liquid crystal layers having different selective reflection center wavelengths and the same direction of circularly polarized light to be reflected, by setting the rotation directions of the optical axes 30A of the liquid crystal compound 30 in the liquid crystal alignment pattern to be the same as each other, a reflection direction (diffraction direction) of circularly polarized light in the patterned cholesteric liquid crystal layer that reflects right circularly polarized light can be made to be the same as that in another patterned cholesteric liquid crystal layer that reflects right circularly polarized light.

In addition, this way, in a case where the optical element according to the embodiment of the present invention includes the patterned cholesteric liquid crystal layers having different selective reflection center wavelengths and the same direction of circularly polarized light to be reflected, it is preferable that the single periods $\Lambda$ in the liquid crystal alignment patterns of the patterned cholesteric liquid crystal layers having the same selective reflection center wavelength are the same. As a result, a diffraction angle with respect to right circularly polarized light and a diffraction angle with respect to circularly polarized light of another layer can be made to be the same.

In addition, the optical element according to the embodiment of the present invention may include a plurality of patterned cholesteric liquid crystal layers having different selective reflection center wavelengths corresponding to color images. In a case where the optical element includes a plurality of patterned cholesteric liquid crystal layers having different selective reflection center wavelengths, it is preferable that a permutation of the lengths of the selective reflection center wavelengths and a permutation of the lengths of the single periods $\Lambda$ in the liquid crystal alignment patterns of the patterned cholesteric liquid crystal layers are the same as each other.

Here, a reflection angle of light from the patterned cholesteric liquid crystal layer in which the optical axis 30A of the liquid crystal compound 30 continuously rotates in the in-plane direction (arrow X direction) varies depending on wavelengths of light to be reflected. Specifically, as the wavelength of light increases, the angle of reflected light with respect to incidence light increases. Accordingly, in a case where red light, green light, and blue light are reflected, the reflection angles of red light, green light, and blue light are different from each other. Specifically, in a case where cholesteric reflecting layers having the same pitch A of the liquid crystal alignment pattern and having reflection center wavelengths of red, green, blue light are compared to each other, regarding the angle of reflected light with respect to incidence light, the angle of red light is the largest, the angle of green light is the second largest, and the angle of blue light is the smallest. Therefore, for example, in a light guide plate of AR glasses, in a case where a reflection element that is formed of cholesteric liquid crystal layers having the same pitch A of the liquid crystal alignment pattern and different reflection center wavelengths is used as a diffraction element for incidence and emission of light into and from the light guide plate, in the case of a full color image, reflection directions of red light, green light, and blue light are different from each other, and incidence angle ranges in which red light, green light, and blue light are totally reflected from the light guide plate are different from each other. Therefore, a visual field range in which red light, green light, and blue light can be seen at the same time is narrowed.

In addition, a reflection angle of light from the patterned cholesteric liquid crystal layer in which the optical axis 30A of the liquid crystal compound 30 continuously rotates in the arrow X direction (in-plane direction) varies depending on the length Λ of the single period of the liquid crystal alignment pattern over which the optical axis 30A rotates by 180° in the arrow X direction, that is, depending on the single period Λ. Specifically, as the length of the single period Λ decreases, the angle of reflected light with respect to incidence light increases.

Accordingly, a permutation of the lengths of the selective reflection center wavelengths in the patterned cholesteric liquid crystal layers and a permutation of the lengths of the single periods Λ in the liquid crystal alignment patterns are the same as each other such that the wavelength dependence on the reflection angle of light to be reflected from the patterned cholesteric liquid crystal layer is significantly reduced, and light components having different wavelengths can be reflected substantially in the same direction.

As a result, even in a case where a full color image is displayed by red light, green light, and blue light, the light can be guided to the light guide plate without a deviation in reflection angle at each wavelength, and a full color image can be displayed with a wide visual field.

(Method of Forming Regions Having Different Helical Pitches)

In the configuration in which the patterned cholesteric liquid crystal layer has regions having different helical pitches, the chiral agent in which back isomerization, dimerization, isomerization, dimerization or the like occurs during light irradiation such that the helical twisting power (HTP) changes is used. By irradiating the liquid crystal composition with light having a wavelength at which the HTP of the chiral agent changes before or during the curing of the liquid crystal composition for forming the patterned cholesteric liquid crystal layer while changing the irradiation dose for each of the regions, the regions having different helical pitches can be formed.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the helical pitch increases. On the other hand, for example, in a region that is irradiated with the light at a low irradiation dose, the decrease in HTP is small, helix is induced by the original HTP of the chiral agent, and thus the helical pitch decreases.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

[Light Guide Element and Image Display Device]

A light guide element according to the embodiment of the present invention includes the above-described optical element and a light guide plate.

An image display device according to the embodiment of the present invention is suitably used as an AR display device such as augmented reality (AR) glasses, and includes a light guide element and a display element.

Figure 6:
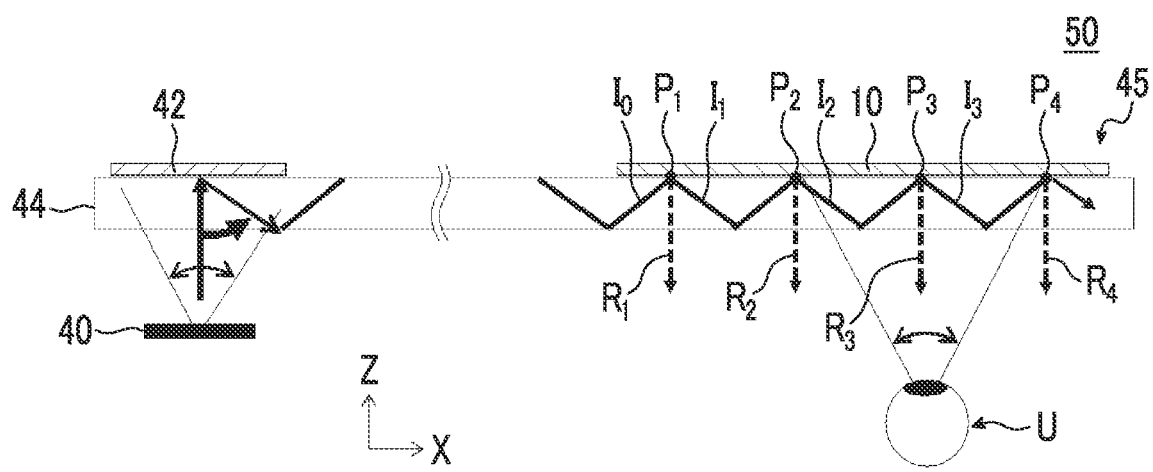
FIG. 6 is a diagram schematically showing an example of an image display device including the optical element according to the first aspect of the present invention.

FIG. 6 conceptually shows an example of the image display device (AR display device) according to the embodiment of the present invention.

An AR display device 50 shown in FIG. 6 includes a display (display element) 40 and a light guide element 45.

The light guide element 45 is the light guide element according to the embodiment of the present invention and includes the optical element 10 according to the embodiment of the present invention, a light guide plate 44, and a diffraction element 42.

The light guide plate 44 guides light in a rectangular shape that is elongated in one direction.

As shown in FIG. 6, the diffraction element 42 is disposed on a surface (main surface) of the light guide plate 44 on one end portion side in a longitudinal direction. In addition, the optical element 10 is disposed on a surface of the light guide plate 44 on another end portion side. The disposition position of the diffraction element 42 corresponds to a light incidence position of the light guide plate 44, and the disposition position of the optical element 10 corresponds to a light emission position of the light guide plate 44. In addition, the diffraction element 42 and the optical element 10 are disposed on the same surface of the light guide plate 44.

The light guide plate 44 is not particularly limited, and a well-known light guide plate of the related art that is used in an image display device or the like can be used.

The diffraction element 42 diffracts light emitted from the display 40 and incident into the light guide plate 44 such that the light is totally reflected in the light guide plate 44.

The diffraction element 42 is not particularly limited, and various diffraction elements used in an AR display device, for example, a relief type diffraction element, a diffraction element using liquid crystal, or a volume hologram element can be used.

In addition, the diffraction element 42 is not limited to a reflection type diffraction element and may be a transmission type diffraction element. In a case where the diffraction element 42 is a transmission type diffraction element, the diffraction element 42 is disposed on a surface of the light guide plate 44 facing the display 40.

As shown in FIG. 6, the display 40 is disposed on a surface of one end portion of the light guide plate 44 opposite to the surface where the diffraction element 42 is disposed. In addition, a surface of the one end portion of the light guide plate 44 opposite to the surface where the optical element 10 is disposed is an observation position of a user U.

In the following description, the longitudinal direction of the light guide plate 44 will be referred to as "X direction", and a direction that is perpendicular to the X direction and perpendicular to the surface of the optical element 10 will be referred to as "Z direction". The Z direction may be a laminating direction of the respective layers of the optical element 10.

The display 40 is not particularly limited. For example, various well-known displays used in an AR display device such as AR glasses can be used.

Examples of the display 40 include devices employing a liquid crystal display (LCOS including Liquid Crystal On Silicon), an organic electroluminescence display, digital light processing (DLP), or Micro Electro Mechanical Systems (MEMS).

The display 40 may display a monochrome image, a two-color image, or a color image.

In addition, light emitted from the display 40 may be unpolarized light or polarized light and is preferably circularly polarized light. In a case where the display 40 emits circularly polarized light, the light guide element 45 can efficiently guide the light emitted from the display 40.

In the AR display device 50 having the above-described configuration, as indicated by arrows, light displayed by the display 40 is incident into the light guide plate 44 from the surface of the one end portion of the light guide plate 44 opposite to the surface where the diffraction element 42 is disposed. The light incident into the light guide plate 44 is reflected from an interface between the light guide plate 44 and the diffraction element 42. At this time, the light is reflected in a direction having an angle different from that of a specular reflection direction due to the diffraction effect of the diffraction element 42 without being specularly reflected (regularly reflected). In the example shown in FIG. 6, light is incident from a direction (Z direction) substantially perpendicular to the diffraction element 42, and is reflected in a direction that is tilted with a large angle from the perpendicular direction toward the longitudinal direction (X direction) of the light guide plate 44.

Since the light reflected from the diffraction element 42 is reflected with a large angle with respect to the angle of the incidence light, an angle of a light traveling direction with respect to the surface of the light guide plate 44 is small. Therefore, the light is totally reflected from the both surfaces (interface) of the light guide plate 44 and is guided in the longitudinal direction (X direction) in the light guide plate 44.

The light guided in the light guide plate 44 is reflected from the interface between the light guide plate 44 and the optical element 10 in another end portion of the light guide plate 44 in the longitudinal direction. At this time, the light is reflected in a direction having an angle different from that of a specular reflection direction due to the diffraction effect of the optical element 10 without being specularly reflected. In the example shown in FIG. 6, the light is incident from an oblique direction with respect to the optical element 10 and is reflected in a direction perpendicular to the surface of the optical element 10.

The light reflected from the optical element 10 reaches the surface of the light guide plate 44 opposite to the surface where the optical element 10 is disposed, but is incident to be substantially perpendicular to the surface. Therefore, the light is emitted to the outside of the light guide plate 44 without being totally reflected. That is, the light is emitted to the observation position of the user U.

This way, in an AR display device 50, an image displayed by the display 40 is incident into one end of the light guide plate 44, propagates in the light guide plate 44, and is emitted from another end of the light guide plate 44 such that the virtual image is displayed to be superimposed on a scene that is actually being seen by the user U.

Here, in the light guide element 45, the diffraction efficiency of the patterned cholesteric liquid crystal layer of the optical element 10 is adjusted, and in a case where the light propagated in the light guide plate 44 is diffracted by the optical element 10, a part of the light is diffracted at a plurality of positions to be emitted to the outside of the light guide plate 44. As a result, the viewing zone can be expanded (exit pupil expansion).

Specifically, in FIG. 6, light $I_0$ propagated in the light guide plate 44 reaches the position of the optical element 10 while being repeatedly reflected from both surfaces (interface) of the light guide plate 44. A part of the light $I_0$ at the position of the optical element 10 is diffracted in a region (position) $P_1$ close to the incidence side to be emitted from the light guide plate 44 (emitted light $R_1$). In addition, light $I_1$ that is not diffracted further propagates in the light guide plate 44, and partial light $R_2$ is diffracted at a position $P_2$ of the optical element 10 to emitted from the light guide plate 44. Light $I_2$ that is not diffracted further propagates in the light guide plate 44, and partial light $R_3$ is diffracted at a position $P_3$ of the optical element 10 to emitted from the light guide plate 44. In addition, light $I_3$ that is not diffracted further propagates in the light guide plate 44, and partial light $R_4$ is diffracted at a position $P_4$ of the optical element 10 to emitted from the light guide plate 44.

This way, with the configuration where the light propagated in the light guide plate 44 is diffracted by the optical element 10 at a plurality of positions to be emitted to the outside of the light guide plate 44, the viewing zone can be expanded (exit pupil expansion).

Here, a case where the diffraction efficiency of the optical element 10 is constant in a plane is assumed. In a case where the diffraction efficiency is constant, the light intensity (light amount) of the incident light $I_0$ is high in the region (position) $P_1$ close to the incidence side. Therefore, the intensity of the emitted light $R_1$ is also high. Next, the light $I_1$ that is not diffracted propagates in the light guide plate 44 and is diffracted again at the position $P_2$ of the optical element 10 such that the partial light $R_2$ is emitted. However, the intensity of the light $I_1$ is lower than that of the light $I_0$. Therefore, even in a case where the light components are diffracted with the same diffraction efficiency, the intensity of the light $R_2$ is lower than that of the light $R_1$ reflected from the region close to the incidence side. Likewise, the light $I_2$ that is not diffracted propagates in the light guide plate 44 and is diffracted again at the position $P_3$ of the optical element 10 such that the partial light $R_3$ is emitted. However, the intensity of the light $I_2$ is lower than that of the light $I_1$. Therefore, even in a case where the light components are diffracted with the same diffraction efficiency, the intensity of the light $R_3$ is lower than that of the light $R_2$ reflected from the position $P_2$. Further, the intensity of the light $R_4$ reflected from the region $P_4$ distant from the incidence side is lower than the light $R_3$.

Figure 7:
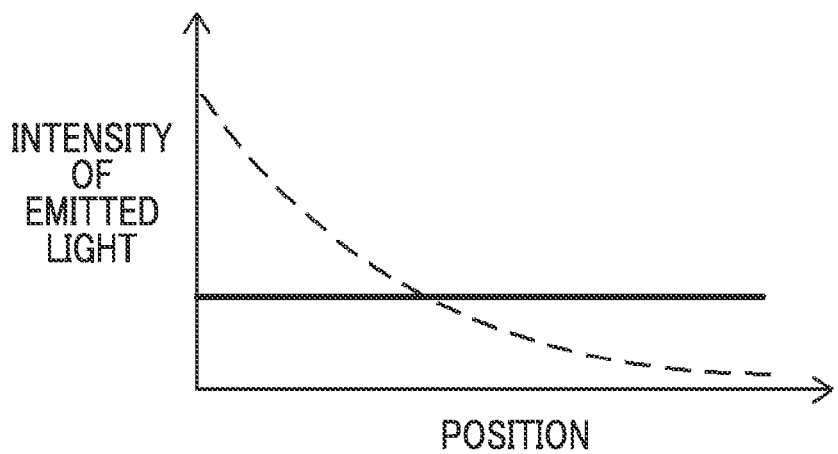
FIG. 7 is a graph schematically showing a relationship between a position and the intensity of emitted light.

This way, in a case where the diffraction efficiency of the optical element 10 is constant, light having a high light intensity is emitted from the region close to the incidence side, and light having a low light intensity is emitted from the region distant from the incidence side. Therefore, there is a problem in that, as indicated by a broken line in FIG. 7, the intensity of emitted light is not uniform depending on positions.

On the other hand, the optical element 10 according to the embodiment of the present invention has the configuration in which the patterned cholesteric liquid crystal layer has regions having different pitches of helical structures in a plane, and the helical pitch gradually changes from one side toward another side in the in-plane direction in which the optical axis rotates.

As a result, the optical element 10 can be configured such that the diffraction efficiency of the patterned cholesteric liquid crystal layer increases from one side toward another side in the in-plane direction in which the optical axis rotates (refer to FIG. 5), and the optical element 10 can be disposed in the light guide element 45 such that the diffraction efficiency of an optically-anisotropic layer 18 increases in the light traveling direction in the light guide plate 44. That is, in the example shown in FIG. 6, the patterned cholesteric liquid crystal layer of the optical element 10 can be configured such that the diffraction efficiency increases from the left toward the right in FIG. 6.

In this case, at the position $P_1$ close to the incidence side, the intensity (light amount) of the incident light $I_0$ is high, but the diffraction efficiency is low. Therefore, the intensity of the emitted light $R_1$ is high to some extent. Next, the light $I_1$ that is not diffracted propagates in the light guide plate 44 and is diffracted again at the position $P_2$ of the optical element 10 such that the partial light $R_2$ is emitted. At this time, the intensity of the light $I_1$ is lower than that of the light $I_0$, but the diffraction efficiency at the position $P_2$ is higher than that at the position $P_1$. Therefore, the intensity of the light $R_2$ can be made to be the same as that of the light $R_1$ reflected from the position $P_1$. Likewise, the light $I_2$ that is not diffracted propagates in the light guide plate 44 and is diffracted again at the position $P_3$ of the optical element 10 such that the partial light $R_3$ is emitted. At this time, the intensity of the light $I_2$ is lower than that of the light $I_1$, but the diffraction efficiency at the position $P_3$ is higher than that at the position $P_2$. Therefore, the intensity of the light $R_3$ can be made to be the same as that of the light $R_2$ reflected from the position $P_2$. Further, the diffraction efficiency at the region $P_4$ distant from the incidence side is higher than that at the position $P_3$. Therefore, the intensity of the light $R_4$ can be made to be the same as that of the light $R_3$ reflected from the position $P_3$.

This way, the diffraction efficiency of the optical element 10 is configured to increase from one side toward another side in the in-plane direction in which the optical axis rotates. As a result, light having a constant light intensity can be emitted from any position of the optical element 10. Therefore, as indicated by a solid line in FIG. 7, the intensity of emitted light can be made uniform irrespective of positions.

In FIG. 6, light is indicated by an arrow, the light emitted from the display 40 may be a surface shape. The surface-shaped light propagates in the light guide plate 44 while maintaining a positional relationship, and is diffracted by the optical element 10.

A distribution of the diffraction efficiency of the patterned cholesteric liquid crystal layer may be appropriately set based on the length of the patterned cholesteric liquid crystal layer, the thickness of the light guide plate, the wavelength of light, and the like such that the intensity of emitted light can be made to be uniform.

In addition, the diffraction efficiency of the patterned cholesteric liquid crystal layer is preferably 0.5% to 20% and more preferably 1% to 10% in a region having a low diffraction efficiency, and is preferably 20% to 100% and more preferably 30% to 95% in a region having a high diffraction efficiency.

In addition, the helical pitch of the patterned cholesteric liquid crystal layer may be set according to the distribution of the diffraction efficiency.

In addition, in the description of FIG. 6, the optical element 10 includes one patterned cholesteric liquid crystal layer. The optical element 10 may include a plurality of patterned cholesteric liquid crystal layers. Alternatively, in the light guide element 45, a plurality of optical elements 10 including the single patterned cholesteric liquid crystal layer may be laminated.

In a case where the optical element 10 includes a plurality of patterned cholesteric liquid crystal layers, or in a case where the light guide element 45 includes a plurality of optical elements 10, that is, includes a plurality of patterned cholesteric liquid crystal layers, it is preferable that the light guide element 45 includes a plurality of patterned cholesteric liquid crystal layers having different selective reflection wavelengths. For example, the optical element may include patterned cholesteric liquid crystal layers having selective reflection wavelengths of red light, green light, and blue light. As a result, the optical element (the laminate thereof) can diffract red light, green light, and blue light, respectively, and the light guide element 45 can appropriately guide light of the display 40 that displays a color image.

Alternatively, the optical element may include two patterned cholesteric liquid crystal layers having the same selective reflection wavelength that reflect circularly polarized light components having opposite turning directions. For example, the optical element may include a patterned cholesteric liquid crystal layer that reflects right circularly polarized light of red light and a patterned cholesteric liquid crystal layer that reflects left circularly polarized light of red light. As a result, the optical element (the laminate thereof) can diffract right circularly polarized light and left circularly polarized light, respectively, and The light guide element 45 can guide right circularly polarized light and left circularly polarized light, and thus the light use efficiency can be improved.

In addition, in the example shown in FIG. 6, the light guide element 45 includes the diffraction element on each of the incidence side and the emission side. However, the present invention is not limited thereto, and an intermediate diffraction element may be provided.

Figure 8:
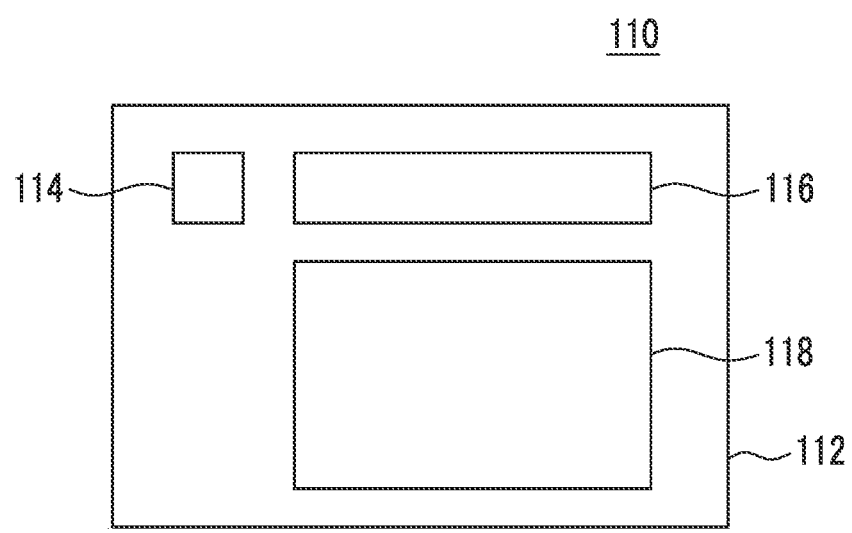
FIG. 8 is a front view schematically showing another example of a light guide element including the optical element according to the first aspect of the present invention.
Figure 9:
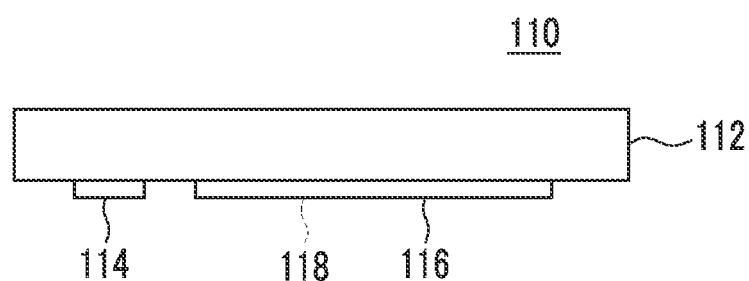
FIG. 9 is a top view of FIG. 8.

FIG. 8 is a front view schematically showing another example of the light guide element according to the embodiment of the present invention, and FIG. 9 is a top view of FIG. 8.

A light guide element 110 shown in FIGS. 8 and 9 includes a light guide plate 112, a first diffraction element 114, a second diffraction element 116, and a third diffraction element 118.

The first diffraction element 114 diffracts light incident from the outside at an angle at which the light can be totally reflected in the light guide plate 112.

The second diffraction element 116 diffracts light that is incident into the light guide plate 112 at a position of the first diffraction element 114 and propagated in the light guide plate 112 such that a light traveling direction in the light guide plate 112 is bent.

The third diffraction element 118 diffracts light that is diffracted by the second diffraction element 116 and propagated in the light guide plate 112 at an angle where the light can be emitted from the light guide plate 112 to the outside.

That is, in the light guide element 110 shown in FIGS. 8 and 9, light that is diffracted in the first diffraction element 114 for incidence and incident into the light guide plate 112 is diffracted by the intermediate second diffraction element 116 such that a light traveling direction is bent in the light guide plate 112, and then is diffracted by the third diffraction element 118 on the emission side to be emitted to the outside of the light guide plate 112.

In this configuration, exit pupil expansion can be performed in the second diffraction element 116 and/or the third diffraction element. At this time, by using the optical element according to the embodiment of the present invention as the second diffraction element 116 and/or the third diffraction element 118, the amount of light expanded can be made to be uniform. From the viewpoint that the light amount can be made to be more uniform, it is preferable that the optical element according to the embodiment of the present invention is used as the second diffraction element 116 and the third diffraction element 118.

In this case, the optical element according to the embodiment of the present invention may be included as the second diffraction element 116 and/or the third diffraction element, and various well-known diffraction elements of the related art such as a relief type diffraction element, a diffraction element using liquid crystal, or a volume hologram element can be used as other diffraction elements.

In addition, it is preferable that each of the first diffraction element 114, the second diffraction element 116, and the third diffraction element 118 is an optical element including a patterned cholesteric liquid crystal layer that is obtained by immobilizing a cholesteric liquid crystalline phase, in which the patterned cholesteric liquid crystal layer has a liquid crystal alignment pattern in which a direction of an optical axis derived from a liquid crystal compound changes while continuously rotating in at least one in-plane direction.

At this time, it is preferable that, in a case where lengths of single periods of the liquid crystal alignment patterns in the first diffraction element, the second diffraction element, and the third diffraction element are represented by $\Lambda_1$, $\Lambda_2$, and $\Lambda_3$, respectively, $\Lambda_2 < \Lambda_1$, and $\Lambda_2 < \Lambda_3$ are satisfied.

In a case where the lengths of the single periods of the liquid crystal alignment patterns of the first diffraction element, the second diffraction element, and the third diffraction element satisfy $\Lambda_2 < \Lambda_1$, and $\Lambda_2 < \Lambda_3$, light can be suitably propagated from the first diffraction element to the third diffraction element, and light can be appropriately emitted from the light guide plate to the user U.

In all the above-described optical elements according to the embodiment of the present invention, the optical axis 30A of the liquid crystal compound 30 in the liquid crystal alignment pattern of the cholesteric liquid crystal layer continuously rotates only in the arrow X direction. However, the present invention is not limited thereto, and various configurations can be used as long as the optical axis 30A of the liquid crystal compound 30 in the cholesteric liquid crystal layer continuously rotates in the in-plane direction.

The optical element according to the embodiment of the present invention can be used for various uses where light is reflected at an angle other than the angle of specular reflection, for example, an optical path changing member, a light gathering element, a light diffusing element to a predetermined direction, a diffraction element, or the like in an optical device.

In the above-described example, the optical element according to the embodiment of the present invention is used as the optical element that reflects visible light. However, the present invention is not limited to this example, and various configurations can be used.

For example, the optical element according to the embodiment of the present invention also may be configured to reflect infrared light or ultraviolet light or to reflect only light other than visible light.

Hereinabove, the optical element according to the first aspect of the present invention has been described above. However, the present invention is not limited to the above-described examples, and various improvements and modifications can be made within a range not departing from the scope of the present invention.

[Second Aspect]

Hereinafter, an optical element and a light guide element according to a second aspect of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T1/2(%) represented by the following expression is exhibited.

$$T1/2 = 100 - \frac{(100-Tmin)}{2}$$ Expression for obtaining Half Value Transmittance:

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index ((nx+ny+nz)/3) and a thickness (d (µm)) to AxoScan, the following expressions can be calculated.

Slow Axis Direction (°)

$$Re(\lambda) = R0(\lambda)$$

$R0(\lambda)$ is expressed as a numerical value calculated by AxoScan and represents $Re(\lambda)$.

The optical element according to the embodiment of the present invention is a light reflection element that reflects incident light and includes a patterned cholesteric liquid crystal layer obtained by immobilizing a cholesteric liquid crystalline phase.

In the optical element according to the embodiment of the present invention, the patterned cholesteric liquid crystal layer has a liquid crystal alignment pattern in which a direction of an optical axis derived from a liquid crystal compound changes while continuously rotating in at least one in-plane direction. Here, in the liquid crystal alignment pattern, a length over which the direction of the optical axis rotates by 180° in the in-plane direction in which the direction of the optical axis changes while continuously rotating is set as a single period. In addition, the patterned cholesteric liquid crystal layer has regions having different pitches of helical structures in a plane. Further, in a case where a length over which the direction of the optical axis derived from the liquid crystal compound rotates by 180° in a plane is set as a single period, the cholesteric liquid crystal layer has regions having different lengths of the single periods.

Although described in detail below, with the optical element according to the embodiment of the present invention having the above-described structure, the reflection angle dependence of the amount of light reflected in a plane is small, and in a case where light incident into different regions in a plane is reflected at different angles, the brightness of the reflected light can be increased.

First Embodiment

Figure 12:
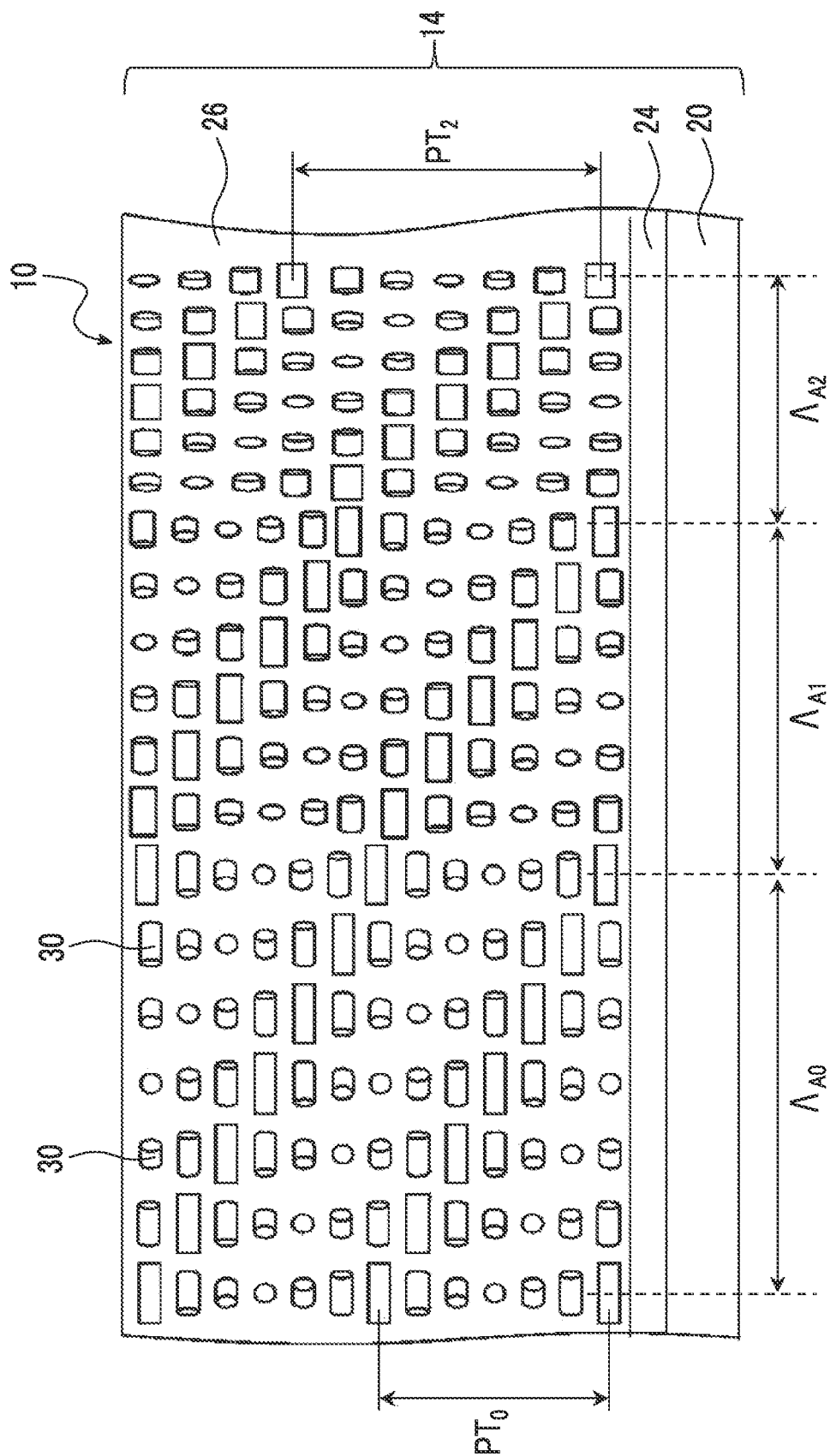
FIG. 12 is a conceptual diagram showing an example of an optical element according to a second aspect of the present invention.

FIG. 12 is a diagram conceptually showing an example of the optical element according to the embodiment of the present invention.

An optical element 10 shown in the drawing selectively reflects light having a specific wavelength and includes a first reflecting layer 14.

In the optical element 10, the first reflecting layer 14 includes a support 20, an alignment film 24, and a patterned cholesteric liquid crystal layer 26.

In addition, the optical element 10 shown in the drawing includes the support 20 for the reflecting layer. However, the optical element according to the embodiment of the present invention does not necessarily include the support 20 for the reflecting layer.

For example, the optical element according to the embodiment of the present invention may be formed of only the alignment film and the cholesteric liquid crystal layer or may be formed of only the cholesteric liquid crystal layer by peeling off the support 20 of the first reflecting layer 14 from the above-described configuration.

That is, the optical element according to the embodiment of the present invention can use various layer configurations as long as the patterned cholesteric liquid crystal layer has a liquid crystal alignment pattern in which a direction of an optical axis derived from a liquid crystal compound changes while continuously rotating in at least one in-plane direction, the cholesteric liquid crystal layer has regions having different pitches of helical structures in a plane, and in a case where a length over which the direction of the optical axis derived from the liquid crystal compound rotates by 180° in a plane is set as a single period, the patterned cholesteric liquid crystal layer has regions having different lengths of the single periods.

The above-described point can be applied to all the optical elements according to respective aspects of the present invention described below.
<Support>

In the first reflecting layer 14, the support 20 supports the alignment film 24 and the patterned cholesteric liquid crystal layer 26.

As the support 20, various sheet-shaped materials (films or plate-shaped materials) can be used as long as they can support the alignment film 24 and the patterned cholesteric liquid crystal layer 26.

A transmittance of the support 20 with respect to corresponding light is preferably 50% or higher, more preferably 70% or higher, and still more preferably 85% or higher.

The thickness of the support 20 is not particularly limited and may be appropriately set depending on the use of the optical element 10, a material for forming the support 20, and the like in a range where the alignment film 24 and the patterned cholesteric liquid crystal layer 26 can be supported.

The thickness of the support 20 is preferably 1 to 1000 µm, more preferably 3 to 250 µm, and still more preferably 5 to 150 µm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.
<Alignment Film>

In the first reflecting layer 14, the alignment film 24 is formed on a surface of the support 20. The alignment film 24 is an alignment film for aligning the liquid crystal compound 30 to a predetermined liquid crystal alignment pattern during the formation of the patterned cholesteric liquid crystal layer 26 of the first reflecting layer 14.

The following description regarding the alignment film is also applicable to an alignment film provided in the reflection member described below. Accordingly, in the following description, in a case where it is not necessary to distinguish the alignment film from another alignment film, the alignment films will also be simply referred to as "alignment film". In addition, in a case where it is not necessary to distinguish the reflecting layer 14 and the patterned cholesteric liquid crystal layer 26 from another cholesteric liquid crystal layer, the reflecting layer 14 and the patterned cholesteric liquid crystal layer 26 will also be simply referred to as "cholesteric liquid crystal layer".

Although described below, in the optical element 10 according to the embodiment of the present invention, the patterned cholesteric liquid crystal layer has a liquid crystal alignment pattern in which a direction of an optical axis 30A (refer to FIG. 14) derived from the liquid crystal compound 30 changes while continuously rotating in one in-plane direction.

In addition, in the liquid crystal alignment pattern, a length over which the direction of the optical axis 30A rotates by 180° in the in-plane direction in which the direction of the optical axis 30A changes while continuously rotating is set as a single period Λ (a rotation period of the optical axis).

In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as if-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 16:
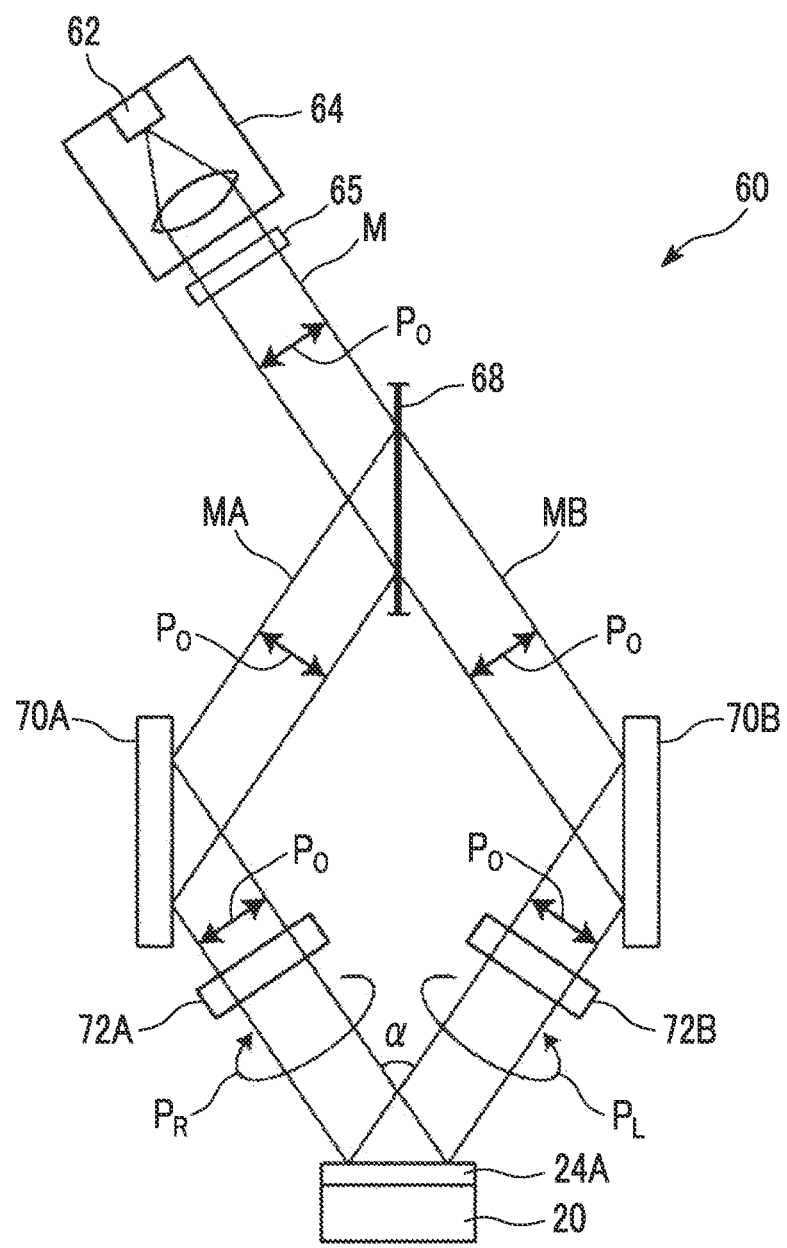
FIG. 16 is a conceptual diagram showing one example of an exposure device that exposes an alignment film of the optical element shown in FIG. 12.

FIG. 16 conceptually shows an example of an exposure device that exposes the alignment film to form an alignment pattern. In the example shown in FIG. 16, for example, the exposure of the alignment film 24 of the first reflecting layer 14 is shown.

An exposure device 60 shown in FIG. 16 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 emits linearly polarized light $P_0$. The λ/4 plate 72A converts the linearly polarized light $P_0$(beam MA) into right circularly polarized light $P_R$, and the λ/4 plate 72B converts the linearly polarized light $P_0$(beam MB) into left circularly polarized light $P_L$.

The support 20 including the alignment film 24 on which the alignment pattern is not yet formed is disposed at an exposed portion, the two beams MA and MB intersect and interfere each other on the alignment film 24, and the alignment film 24 is irradiated with and exposed to the interference light.

Due to the interference at this time, the polarization state of light with which the alignment film 24 is irradiated periodically changes according to interference fringes. As a result, in the alignment film 24, an alignment pattern in which the alignment state periodically changes can be obtained. That is, an alignment film (hereinafter, also referred to as "patterned alignment film") having an alignment pattern in which the alignment state changes periodically is obtained.

In the exposure device 60, by changing an intersection angle α between the two beams MA and MB, the period of the alignment pattern can be adjusted. That is, by adjusting the intersection angle α in the exposure device 60, in the alignment pattern in which the optical axis 30A derived from the liquid crystal compound 30 continuously rotates in the in-plane direction, the length of the single period over which the optical axis 30A rotates by 180° in the in-plane direction in which the optical axis 30A rotates can be adjusted.

By forming the cholesteric liquid crystal layer on the patterned alignment film having the alignment pattern in which the alignment state periodically changes, as described below, the patterned cholesteric liquid crystal layer 26 having the liquid crystal alignment pattern in which the optical axis 30A derived from the liquid crystal compound 30 continuously rotates in the in-plane direction can be formed.

In addition, by rotating the optical axes of the λ/4 plates 72A and 72B by 90°, respectively, the rotation direction of the optical axis 30A can be reversed.

As described above, the patterned alignment film has a liquid crystal alignment pattern in which the liquid crystal compound is aligned such that the direction of the optical axis of the liquid crystal compound in the patterned cholesteric liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the in-plane direction.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the patterned cholesteric liquid crystal layer has the liquid crystal alignment pattern in which the direction of the optical axis 30A derived from the liquid crystal compound 30 changes while continuously rotating in at least one in-plane direction.

<Patterned Cholesteric Liquid Crystal Layer>

In the first reflecting layer 14, the patterned cholesteric liquid crystal layer 26 is formed on the surface of the alignment film 24.

Figure 13:
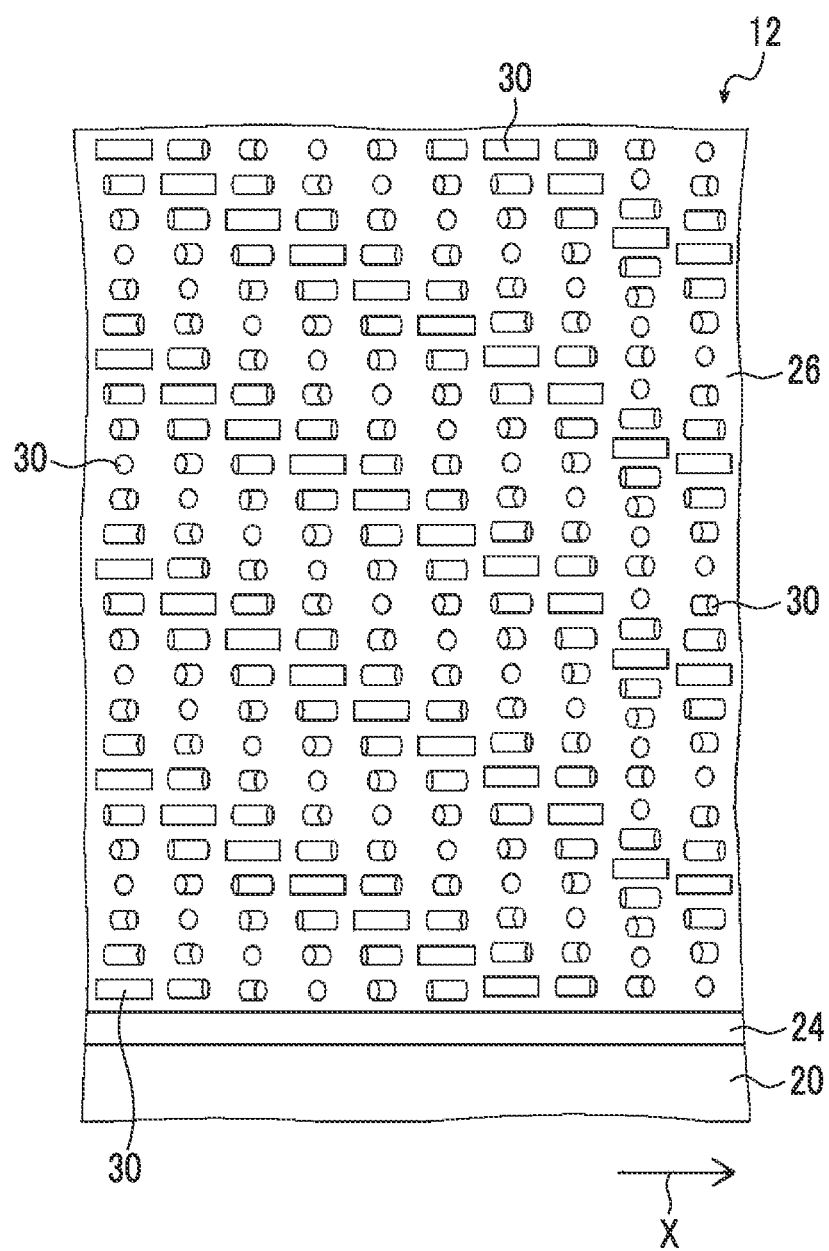
FIG. 13 is a conceptual diagram showing a patterned cholesteric liquid crystal layer of the optical element shown in FIG. 12.
Figure 14:
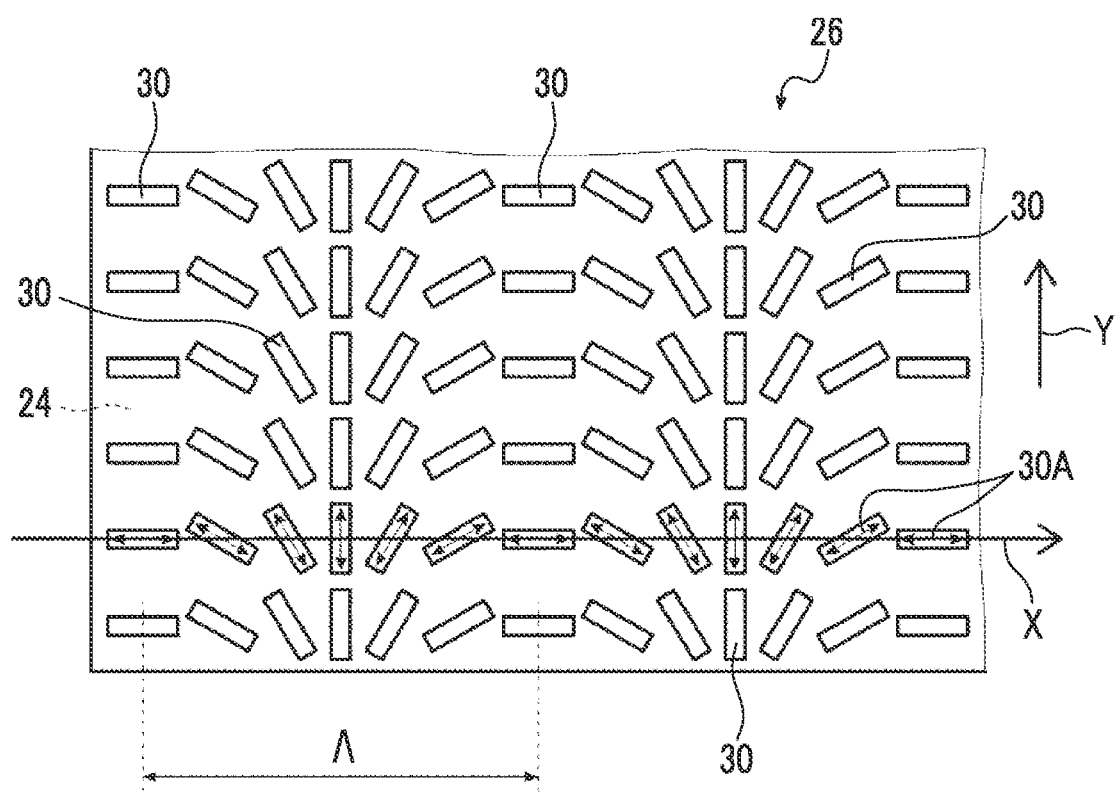
FIG. 14 is a plan view showing the patterned cholesteric liquid crystal layer of the optical element shown in FIG. 12.

In FIG. 14, in order to simplify the drawing and to clarify the configuration of the optical element 10, only the liquid crystal compound 30 (liquid crystal compound molecules) on the surface of the alignment film in the patterned cholesteric liquid crystal layer 26 is conceptually shown. However, as conceptually shown in FIG. 13, the patterned cholesteric liquid crystal layer 26 has a helical structure in which the liquid crystal compound 30 is helically turned and laminated as in a cholesteric liquid crystal layer obtained by immobilizing a typical cholesteric liquid crystalline phase. In the helical structure, a configuration in which the liquid crystal compound 30 is helically rotated once (rotated by 360) and laminated is set as one helical pitch, and plural pitches of the helically turned liquid crystal compound 30 are laminated.

The patterned cholesteric liquid crystal layer has wavelength selective reflection properties.

For example, in a case where the patterned cholesteric liquid crystal layer 26 has a selective reflection center wavelength in a green wavelength range, the patterned cholesteric liquid crystal layer 26 reflects right circularly polarized light GR of green light and allows transmission of the other light.

Here, since the liquid crystal compound 30 rotates to be aligned in a plane direction, the patterned cholesteric liquid crystal layer 26 diffracts (refracts) incident circularly polarized light to be reflected in a direction in which the direction of the optical axis continuously rotates. At this time, the diffraction direction varies depending on the turning direction of incident circularly polarized light.

That is, the patterned cholesteric liquid crystal layer 26 reflects right circularly polarized light or left circularly polarized light having a selective reflection wavelength and diffracts the reflected light.

The patterned cholesteric liquid crystal layer 26 is obtained by immobilizing a cholesteric liquid crystalline phase. That is, the patterned cholesteric liquid crystal layer 26 is a layer formed of the liquid crystal compound 30 (liquid crystal material) having a cholesteric structure.

<<Cholesteric Liquid Crystalline Phase>>

It is known that the cholesteric liquid crystalline phase exhibits selective reflection properties at a specific wavelength. The center wavelength $\lambda$ of selective reflection (selective reflection center wavelength $\lambda$) depends on a pitch P (=helical period) of a helical structure in the cholesteric liquid crystalline phase and satisfies a relationship of $\lambda=n \times P$ with an average refractive index n of the cholesteric liquid crystalline phase. Therefore, the selective reflection center wavelength can be adjusted by adjusting the pitch of the helical structure. The pitch of the cholesteric liquid crystalline phase depends on the kind of a chiral agent which is used in combination of a liquid crystal compound during the formation of the cholesteric liquid crystal layer, or the concentration of the chiral agent added. Therefore, a desired pitch can be obtained by adjusting the kind and concentration of the chiral agent.

The details of the adjustment of the pitch can be found in "Fuji Film Research&Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element 10 shown in the drawing, the cholesteric liquid crystal layer is a layer obtained by immobilizing a right-twisted cholesteric liquid crystalline phase.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda=\Delta n \times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and is, for example, 10 to 500 nm and preferably 20 to 300 nm and more preferably 30 to 100 nm.

<<Method of Forming Cholesteric Liquid Crystal Layer>>

The cholesteric liquid crystal layer (patterned cholesteric liquid crystal layer) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for turned nematic (TN) or super turned nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

—Photoreactive Chiral Agent—

In the present invention, it is preferable that a photoreactive chiral agent is used as the chiral agent. The photoreactive chiral agent is formed of, for example, a compound represented by the following Formula (I) and has properties capable of controlling an aligned structure of the liquid crystal compound and changing a helical pitch of liquid crystal, that is, a helical twisting power (HTP) of a helical structure during light irradiation. That is, the photoreactive chiral agent is a compound that causes a helical twisting power of a helical structure derived from a liquid crystal compound, preferably, a nematic liquid crystal compound to change during light irradiation (ultraviolet light to visible light to infrared light), and includes a portion including a chiral portion and a portion in which a structural change occurs during light irradiation as necessary portions (molecular structural units). However, the photoreactive chiral agent represented by the following Formula (I) can significantly change the HTP of liquid crystal molecules.

The above-described HTP represents the helical twisting power of a helical structure of liquid crystal, that is, HTP=1/(Pitch×Chiral Agent Concentration [Mass Fraction]). For example, the HTP can be obtained by measuring a helical pitch (single period of the helical structure; μm) of a liquid crystal molecule at a given temperature and converting the measured value into a value [μm$^{-1}$] in terms of the concentration of the chiral agent. In a case where a selective reflection color is formed by the photoreactive chiral agent depending on the illuminance of light, a change ratio in HTP (HTP before irradiation/HTP after irradiation) is preferably 1.5 or higher and more preferably 2.5 or higher in a case where the HTP decreases after irradiation, and is preferably 0.7 or lower and more preferably 0.4 or lower in a case where the HTP increases after irradiation.

Next, the compound represented by Formula (I) will be described.

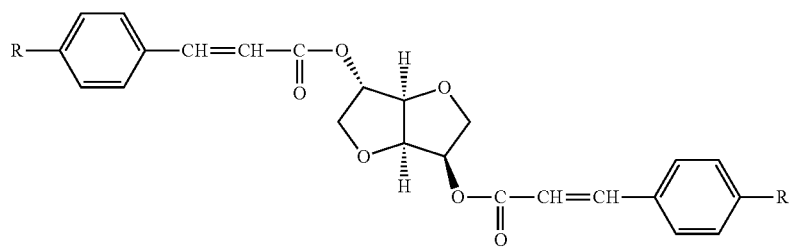

Formula (I)

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, and a dodecyloxy group. In particular, an alkoxy group having 1 to 12 carbon atoms is preferable, and an alkoxy group having 1 to 8 carbon atoms is more preferable.

Examples of the acryloyloxyalkyloxy group having 3 to 15 carbon atoms in total include an acryloyloxyethyloxy group, an acryloyloxybutyloxy group, and an acryloyloxydecyloxy group. In particular, an acryloyloxyalkyloxy group having 5 to 13 carbon atoms is preferable, and an acryloyloxyalkyloxy group having 5 to 11 carbon atoms is more preferable.

Examples of the methacryloyloxyalkyloxy group having 4 to 15 carbon atoms in total include a methacryloyloxyethyloxy group, a methacryloyloxybutyloxy group, and a methacryloyloxydecyloxy group. In particular, a methacryloyloxyalkyloxy group having 6 to 14 carbon atoms is preferable, and a methacryloyloxyalkyloxy group having 6 to 12 carbon atoms is more preferable.

The molecular weight of the photoreactive chiral agent represented by Formula (I) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (1) to (15)) of the compound represented by Formula (I) will be shown, but the present invention is not limited thereto.

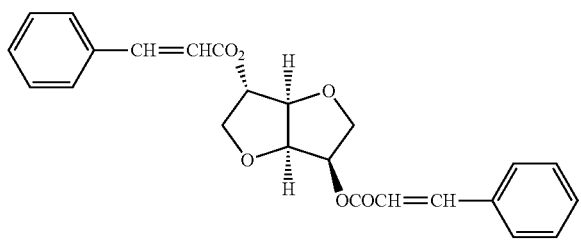
(1)
Right Twisted
Mw = 406.43
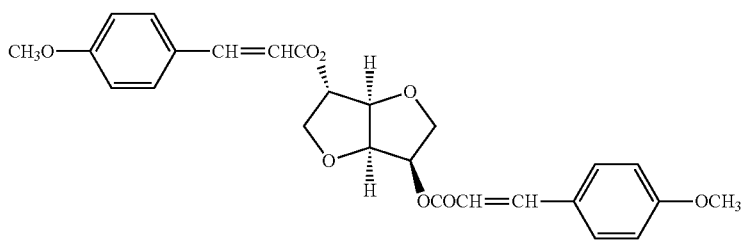
(2)
Right Twisted
Mw = 466.48
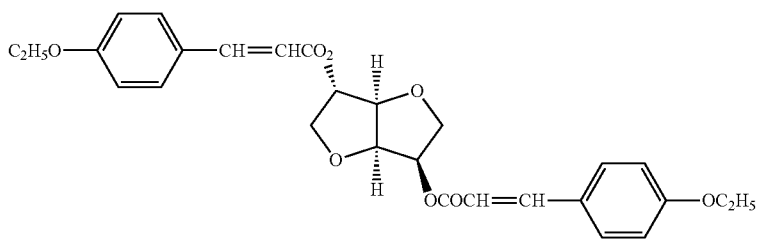
(3)
Right Twisted
Mw = 494.53
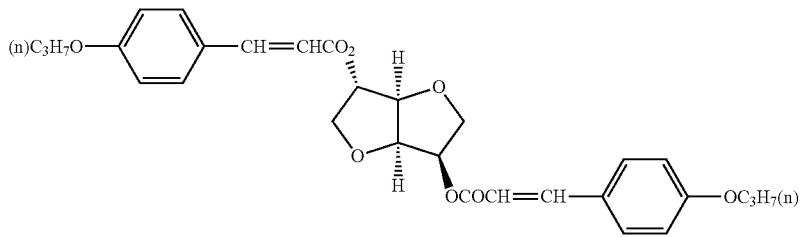
(4)
Right Twisted
Mw = 522.59
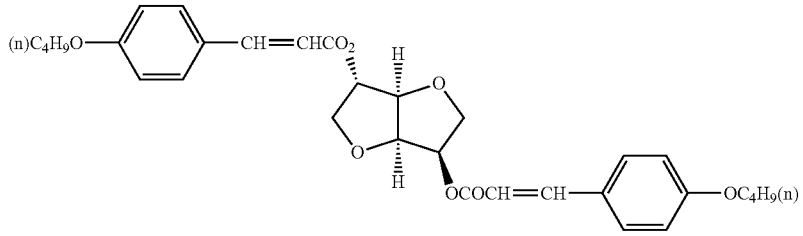
(5)
Right Twisted
Mw = 550.64

(6)
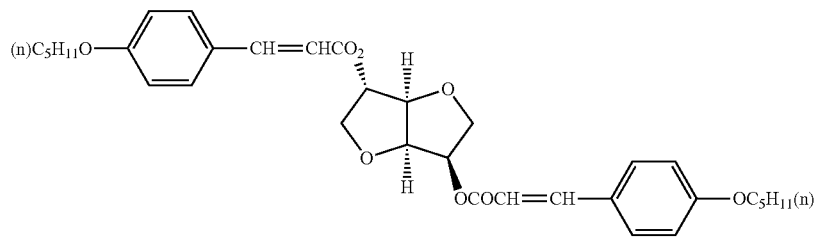
Right Twisted
Mw = 578.69
(7)
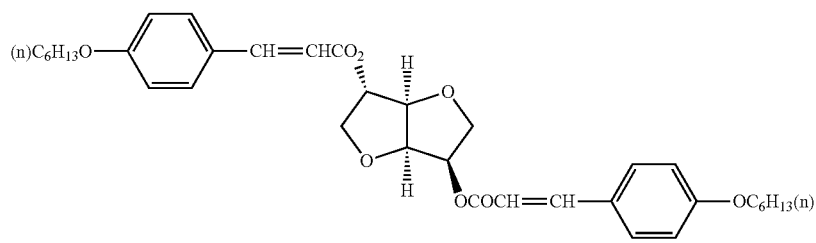
Right Twisted
Mw = 606.75
(8)
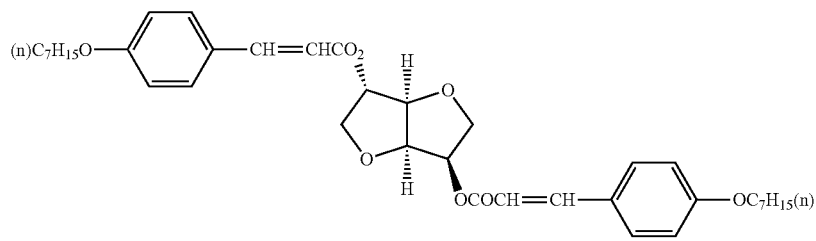
Right Twisted
Mw = 634.80
(9)
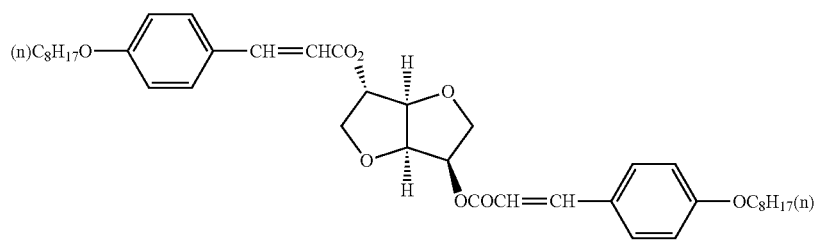
Right Twisted
Mw = 662.85
(10)
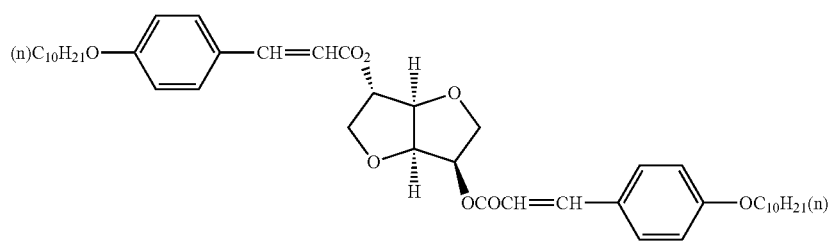
Right Twisted
Mw = 718.96

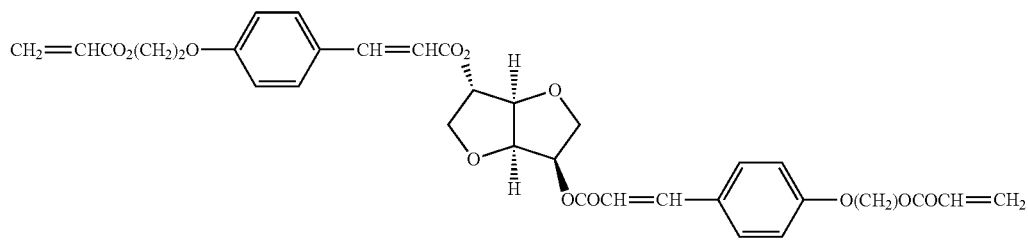
(11)
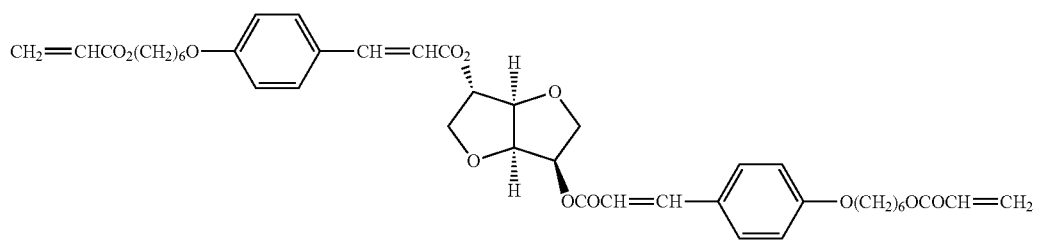
(12)
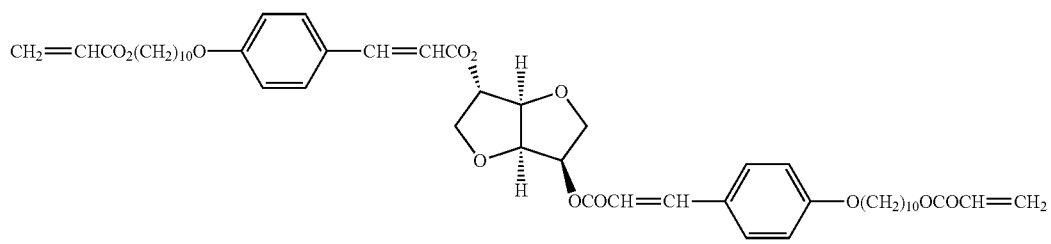
(13)
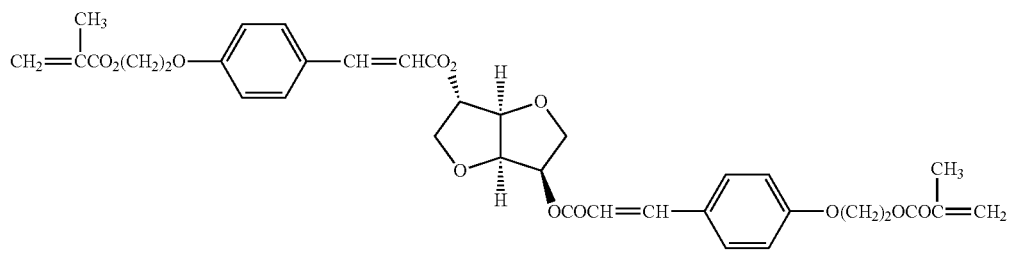
(14)
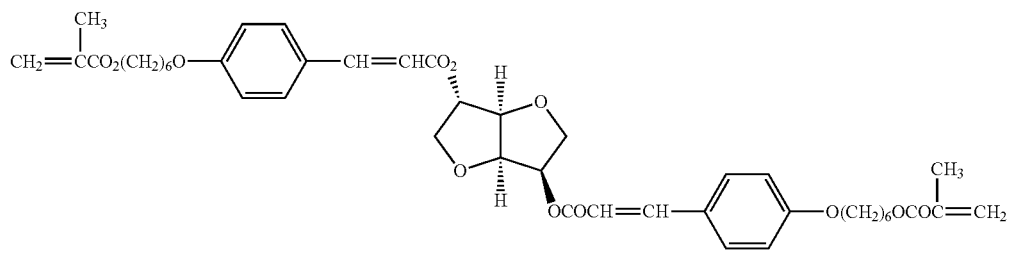
(15)
In the present invention, as the photoreactive chiral agent, for example, a photoreactive optically active compound represented by the following Formula (II) is also used.

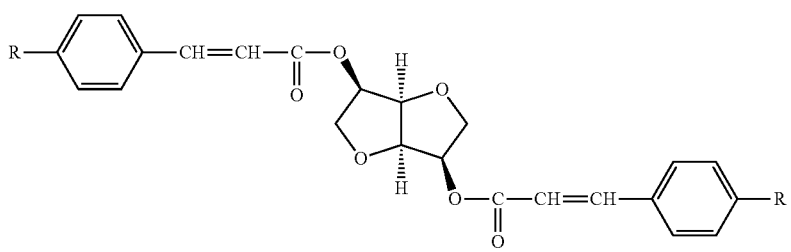

Formula (II)

In the formula, R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total.

Examples of the alkoxy group having 1 to 15 carbon atoms include a methoxy group, an ethoxy group, a propoxy group, a butoxy group, a hexyloxy group, an octyloxy group, and a dodecyloxy group. In particular, an alkoxy group having 1 to 10 carbon atoms is preferable, and an alkoxy group having 1 to 8 carbon atoms is more preferable.

Examples of the acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, and an acryloyloxydecyloxy group. In particular, an acryloyloxyalkyloxy group having 3 to 13 carbon atoms is preferable, and an acryloyloxyalkyloxy group having 3 to 11 carbon atoms is more preferable.

Examples of the methacryloyloxyalkyloxy group having 4 to 15 carbon atoms in total include a methacryloyloxy group, a methacryloyloxyethyloxy group, and a methacryloyloxyhexyloxy group. In particular, a methacryloyloxyalkyloxy group having 4 to 14 carbon atoms is preferable, and a methacryloyloxyalkyloxy group having 4 to 12 carbon atoms is more preferable.

The molecular weight of the photoreactive optically active compound represented by Formula (II) is preferably 300 or higher. In addition, it is preferable that the solubility in the liquid crystal compound described below is high, and it is more preferable that the solubility parameter SP value is close to that of the liquid crystal compound.

Hereinafter, specific examples (exemplary compounds (21) to (32)) of the photoreactive optically active compound represented by Formula (II) will be shown, but the present invention is not limited thereto.

(21)

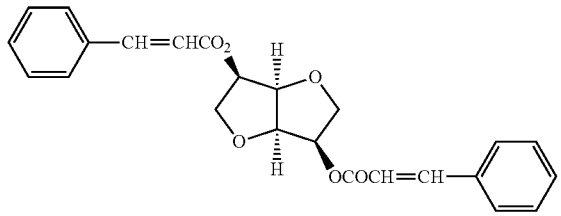

Left Twisted
Mw = 406.43

(22)

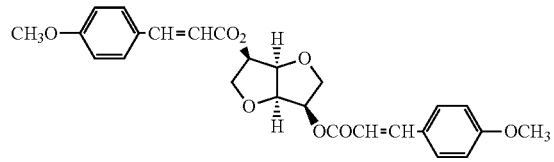

Left Twisted
Mw = 466.48

(23)

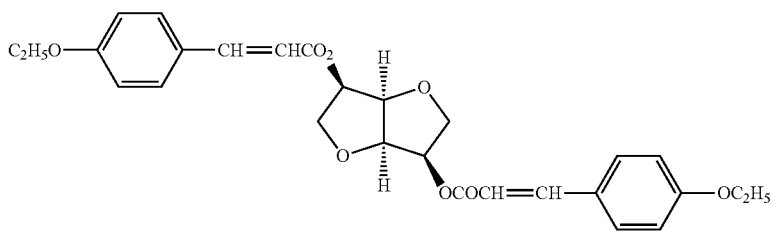

Left Twisted
Mw = 494.53

-continued
(24)
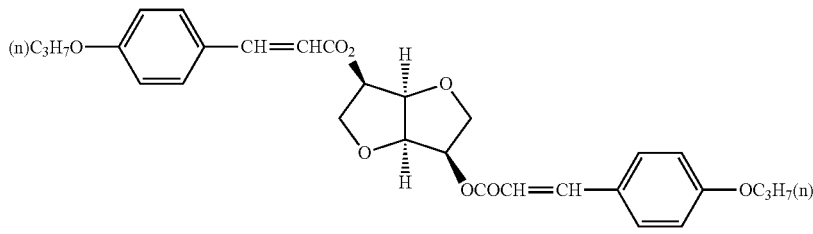
Left Twisted
Mw = 522.59
(25)
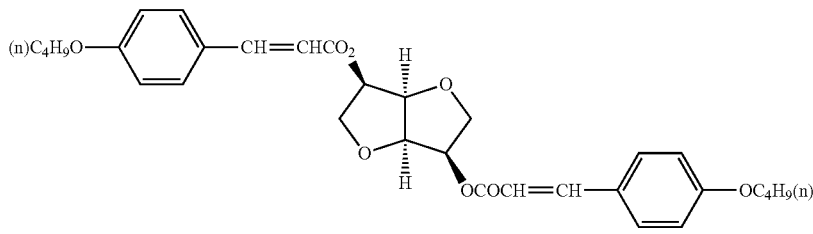
Left Twisted
Mw = 550.64
(26)
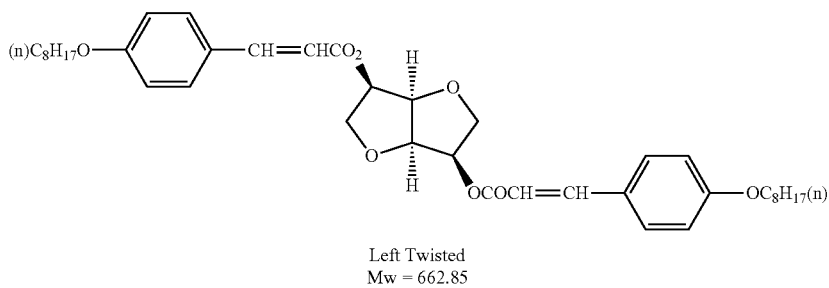
Left Twisted
Mw = 662.85
(27)
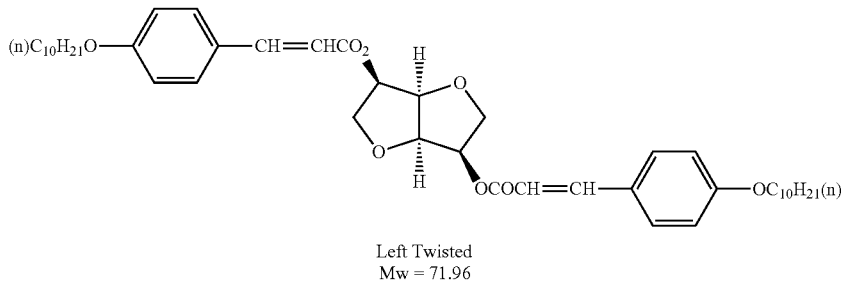
Left Twisted
Mw = 71.96
(28)
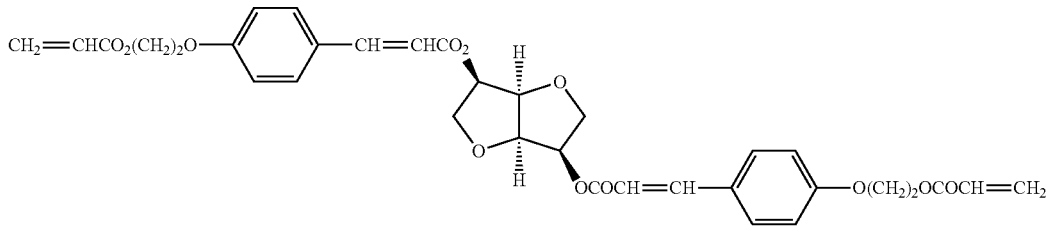
(29)
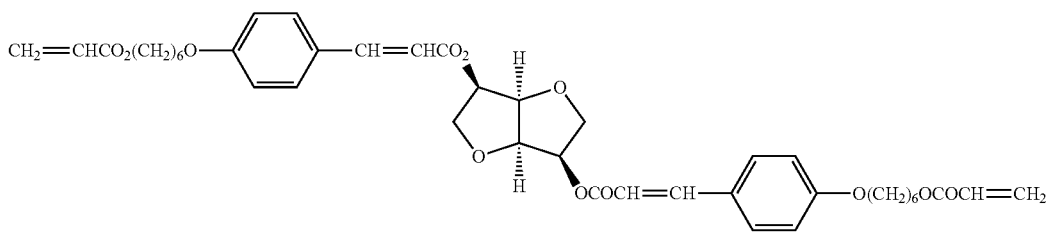

-continued

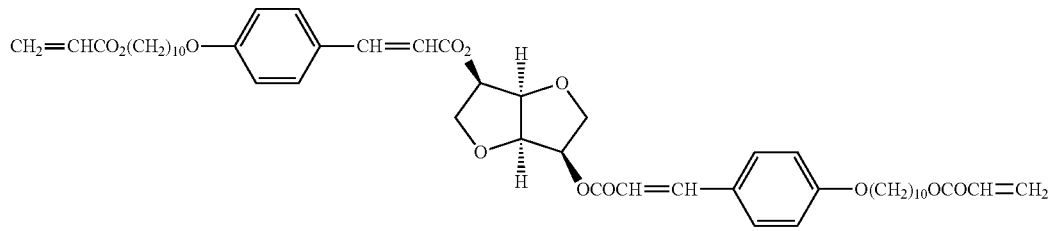

(30)

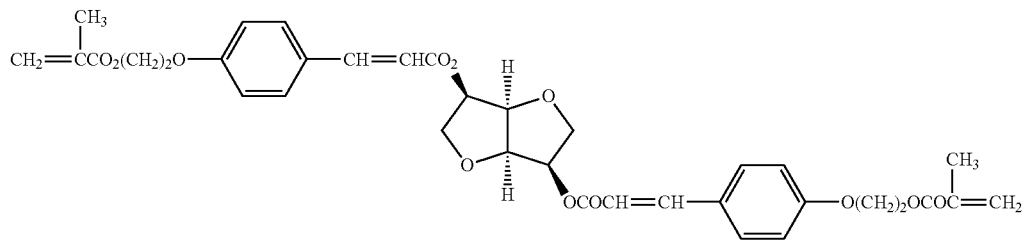

(31)

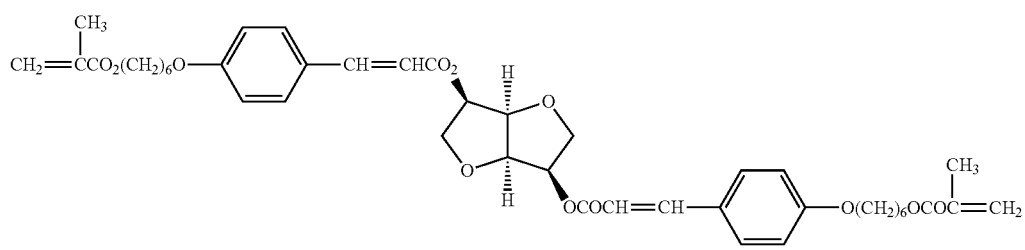

(32)

In addition, the photoreactive chiral agent can also be used in combination with a chiral agent having no photoreactivity such as a chiral compound having a large temperature dependence of the helical twisting power. Examples of the well-known chiral agent having no photoreactivity include chiral agents described in JP2000-044451A, JP1998-509726A (JP-H10-509726A), WO1998/000428A, JP2000-506873A, JP1997-506088A(JP-H09-506088A), Liquid Crystals (1996, 21, 327), and Liquid Crystals (1998, 24, 219).

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film, it is preferable that the cholesteric liquid crystal layer obtained by immobilizing a cholesteric liquid crystalline phase is formed by applying the liquid crystal composition to the alignment film, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical element 10, the light reflectivity required for the cholesteric liquid crystal layer, the material for forming the cholesteric liquid crystal layer, and the like.

<<Liquid Crystal Alignment Pattern of Patterned Cholesteric Liquid Crystal Layer>>

In the optical element 10 according to the embodiment of the present invention, the patterned cholesteric liquid crystal layer has the liquid crystal alignment pattern in which the direction of the optical axis 30A derived from the liquid crystal compound 30 forming the cholesteric liquid crystalline phase changes while continuously rotating in the in-plane direction of the patterned cholesteric liquid crystal layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction. In the following description, the optical axis 30A derived from the liquid crystal compound 30 will also be referred to as "the optical axis 30A of the liquid crystal compound 30" or "the optical axis 30A".

FIG. 14 is a plan view conceptually showing the patterned cholesteric liquid crystal layer 26.

The plan view is a view in a case where the optical element 10 is seen from the top in FIG. 12, that is, a view in a case where the optical element 10 is seen from a thickness direction (laminating direction of the respective layers (films)).

In addition, as described above, in FIG. 14, in order to clarify the configuration of the optical element 10 according to the embodiment of the present invention, as in FIG. 12, only the liquid crystal compound 30 on the surface of the alignment film 24 is shown.

FIG. 14 shows the patterned cholesteric liquid crystal layer 26 as a representative example. However, basically, a patterned cholesteric liquid crystal layer described below also has the same configuration and the same effects as those of the patterned cholesteric liquid crystal layer 26, except that the lengths A of the single periods of the liquid crystal alignment patterns described below or the reflection wavelength ranges are different from each other.

As shown in FIG. 14, on the surface of the alignment film 24, the liquid crystal compound 30 forming the patterned cholesteric liquid crystal layer 26 is two-dimensionally arranged according to the alignment pattern formed on the alignment film 24 as the lower layer in a predetermined in-plane direction indicated by arrow X and a direction perpendicular to the in-plane direction (arrow X direction).

In the following description, the direction perpendicular to the arrow X direction will be referred to as "Y direction" for convenience of description. That is, in FIGS. 12 and 13 and FIG. 15 described below, the Y direction is a direction perpendicular to the paper plane.

In addition, the liquid crystal compound 30 forming the patterned cholesteric liquid crystal layer 26 has the liquid crystal alignment pattern in which the direction of the optical axis 30A changes while continuously rotating in the arrow X direction in a plane of the patterned cholesteric liquid crystal layer 26. In the example shown in the drawing, the liquid crystal compound 30 has the liquid crystal alignment pattern in which the optical axis 30A of the liquid crystal compound 30 changes while continuously rotating clockwise in the arrow X direction.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and still more preferably less than 15°.

On the other hand, in the liquid crystal compound 30 forming the patterned cholesteric liquid crystal layer 26, the directions of the optical axes 30A are the same in the Y direction perpendicular to the arrow X direction, that is, the Y direction perpendicular to the in-plane direction in which the optical axis 30A continuously rotates.

In other words, in the liquid crystal compound 30 forming the patterned cholesteric liquid crystal layer 26, angles between the optical axes 30A of the liquid crystal compound 30 and the arrow X direction are the same in the Y direction.

In the optical element 10 according to the embodiment of the present invention, in the liquid crystal alignment pattern of the liquid crystal compound 30, the length (distance) over which the optical axis 30A of the liquid crystal compound 30 rotates by 180° in the arrow X direction in which the optical axis 30A changes while continuously rotating in a plane is the length Λ of the single period in the liquid crystal alignment pattern.

That is, a distance between centers of two liquid crystal compounds 30 in the arrow X direction is the length Λ of the single period, the two liquid crystal compounds having the same angle in the arrow X direction. Specifically, as shown in FIG. 14, a distance of centers in the arrow X direction of two liquid crystal compounds 30 in which the arrow X direction and the direction of the optical axis 30A match each other is the length Λ of the single period.

In the following description, the length Λ of the single period will also be referred to as "single period Λ".

In the optical element 10 according to the embodiment of the present invention, in the liquid crystal alignment pattern of the patterned cholesteric liquid crystal layer, the single period Λ is repeated in the arrow X direction, that is, in the in-plane direction in which the direction of the optical axis 30A changes while continuously rotating.

The patterned cholesteric liquid crystal layer 26 has the liquid crystal alignment pattern in which the optical axis 30A changes while continuously rotating in the arrow X direction in a plane (the predetermined in-plane direction).

The cholesteric liquid crystal layer obtained by immobilizing a cholesteric liquid crystalline phase typically reflects incident light (circularly polarized light) by specular reflection.

On the other hand, the patterned cholesteric liquid crystal layer 26 having the above-described liquid crystal alignment pattern reflects incidence light in a direction having an angle in the arrow X direction with respect to specular reflection. For example, in the patterned cholesteric liquid crystal layer 26, light incident from the normal direction is reflected in a state where it is tilted as indicated by the arrow X with respect to the normal direction instead of being reflected in the normal direction. That is, the light incident from the normal direction refers to light incident from the front side that is light incident to be perpendicular to a main surface. The main surface refers to the maximum surface of a sheet-shaped material.

Hereinafter, the description will be made with reference to FIG. 15.

As described above, the patterned cholesteric liquid crystal layer 26 selectively reflects one circularly polarized light in a selective reflection wavelength. For example, a case where the selective reflection wavelength of the patterned cholesteric liquid crystal layer 26 is green light and right circularly polarized light is reflected will be described. The patterned cholesteric liquid crystal layer 26 selectively reflects right circularly polarized light $G_R$ of green light.

Accordingly, in a case where light is incident into the first reflecting layer 14, the patterned cholesteric liquid crystal layer 26 reflects only right circularly polarized light $G_R$ of green light and allows transmission of the other light.

In a case where the right circularly polarized light $G_R$ of green light incident into the patterned cholesteric liquid crystal layer 26 is reflected from the patterned cholesteric liquid crystal layer 26, the absolute phase changes depending on the directions of the optical axes 30A of the respective liquid crystal compounds 30.

Here, in the patterned cholesteric liquid crystal layer 26, the optical axis 30A of the liquid crystal compound 30 changes while rotating in the arrow X direction (the in-plane direction). Therefore, the amount of change in the absolute phase of the incident right circularly polarized light $G_R$ of green light varies depending on the directions of the optical axes 30A.

Further, the liquid crystal alignment pattern formed in the patterned cholesteric liquid crystal layer 26 is a pattern that is periodic in the arrow X direction. Therefore, as conceptually shown in FIG. 15, an absolute phase Q that is periodic in the arrow X direction corresponding to the direction of the optical axis 30A is assigned to the right circularly polarized light $G_R$ of green light incident into the patterned cholesteric liquid crystal layer 26.

In addition, the direction of the optical axis 30A of the liquid crystal compound 30 with respect to the arrow X direction is uniform in the arrangement of the liquid crystal compound 30 in the Y direction perpendicular to arrow X direction.

As a result, in the patterned cholesteric liquid crystal layer 26, an equiphase surface E that is tilted in the arrow X direction with respect to an XY plane is formed for the right circularly polarized light $G_R$ of green light.

Therefore, the right circularly polarized light $G_R$ of green light is reflected in the normal direction of the equiphase surface E (direction perpendicular to the equiphase surface E), and the reflected right circularly polarized light $G_R$ of green light is reflected in a direction that is tilted in the arrow X direction with respect to the XY plane (main surface of the patterned cholesteric liquid crystal layer 26).

Here, a reflection angle of light from the patterned cholesteric liquid crystal layer in which the optical axis 30A of the liquid crystal compound 30 continuously rotates in the in-plane direction (arrow X direction) varies depending on wavelengths of light to be reflected. Specifically, as the wavelength of light increases, the angle of reflected light with respect to incidence light increases.

On the other hand, a reflection angle of light from the patterned cholesteric liquid crystal layer in which the optical axis 30A of the liquid crystal compound 30 continuously rotates in the arrow X direction (in-plane direction) varies depending on the length Λ of the single period of the liquid crystal alignment pattern over which the optical axis 30A rotates by 180° in the arrow X direction, that is, depending on the single period Λ. Specifically, as the length of the single period Λ decreases, the angle of reflected light with respect to incidence light increases. This point will be described below.

In the optical element 10 according to the embodiment of the present invention, the single period Λ in the alignment pattern of the patterned cholesteric liquid crystal layer is not particularly limited and may be appropriately set depending on the use of the optical element 10 and the like.

Here, the optical element 10 according to the embodiment of the present invention can be suitably used as, for example, a diffraction element that reflects light displayed by a display to be introduced into a light guide plate in AR glasses or a diffraction element that emits light propagated in a light guide plate to an observation position by a user from the light guide plate.

At this time, in order to totally reflect light from the light guide plate, it is necessary to reflect light to be introduced into the light guide plate at a large angle to some degree with respect to incidence light. In addition, in order to reliably emit light propagated in the light guide plate, it is necessary to reflect at a large angle to some degree with respect to incidence light.

In addition, as described above, the reflection angle from the patterned cholesteric liquid crystal layer with respect to incidence light can be increased by reducing the single period Λ in the liquid crystal alignment pattern.

In consideration of this point, the single period Λ in the liquid crystal alignment pattern of the patterned cholesteric liquid crystal layer is preferably 50 µm or less, more preferably 10 µm or less, and still more preferably 1 µm or less.

In consideration of the accuracy of the liquid crystal alignment pattern and the like, the single period Λ in the liquid crystal alignment pattern of the patterned cholesteric liquid crystal layer is preferably 0.1 µm or more.

Here, in the optical element according to the embodiment of the present invention, the patterned cholesteric liquid crystal layer has the liquid crystal alignment pattern in which the direction of the optical axis 30A derived from the liquid crystal compound 30 forming the cholesteric liquid crystalline phase changes while continuously rotating in the in-plane direction of the patterned cholesteric liquid crystal layer.

In addition, in the optical element according to the embodiment of the present invention, as conceptually shown in FIG. 12, the patterned cholesteric liquid crystal layer has regions having different pitches of helical structures in a plane.

Further, in the optical element according to the embodiment of the present invention, as conceptually shown in FIG. 12, the patterned cholesteric liquid crystal layer has regions having different lengths A of the single periods in the liquid crystal alignment pattern in a plane.

In the configuration of the optical element 10 shown in FIG. 12, the patterned cholesteric liquid crystal layer 26 of the first reflecting layer 14 has a liquid crystal alignment pattern in which a direction of an optical axis derived from a liquid crystal compound changes while continuously rotating in at least one in-plane direction, the patterned cholesteric liquid crystal layer has regions having different pitches of helical structures in a plane, and the patterned cholesteric liquid crystal layer has regions having different lengths A of the single periods in the liquid crystal alignment pattern in a plane. That is, the reflecting layer in the present invention is configured.

Specifically, the patterned cholesteric liquid crystal layer 26 in FIG. 12 is configured such that a helical pitch $PT_2$ in the right side region of FIG. 12 is longer than a helical pitch $PT_0$ in the left side region of FIG. 12 and a helical pitch $PT_1$ (not shown) in the intermediate region in the left-right direction in FIG. 12 is longer than the helical pitch $PT_0$ and is shorter than the helical pitch $PT_2$. That is, the helical pitch increases from the left side region toward the right side region in FIG. 12.

The helical pitch is the distance over which the liquid crystal compound rotates helically once (360° rotation). In FIG. 12, schematically, distances over which the liquid crystal compound rotates half a rotation (180° rotation) are represented by $PT_0$ and $PT_2$.

In addition, in the patterned cholesteric liquid crystal layer 26 in FIG. 12, a length $\Lambda_{A2}$ of the single period of the right side region in FIG. 12 is shorter than a length $\Lambda_{A0}$ of the single period of the left side region in FIG. 12, and a length $\Lambda_{A1}$ of the single period of the center region in the left-right direction in FIG. 12 is shorter than the length $\Lambda_{A0}$ of the single period and is longer than the length $\Lambda_{A2}$ of the single period. That is, the length Λ of the single period decreases from the left side region toward the right side region in FIG. 12.

Hereinafter, the optical element according to the embodiment of the present invention will be described in more detail by describing the action of the optical element 10 according to the embodiment of the present invention with reference to FIG. 17.

Figure 17:
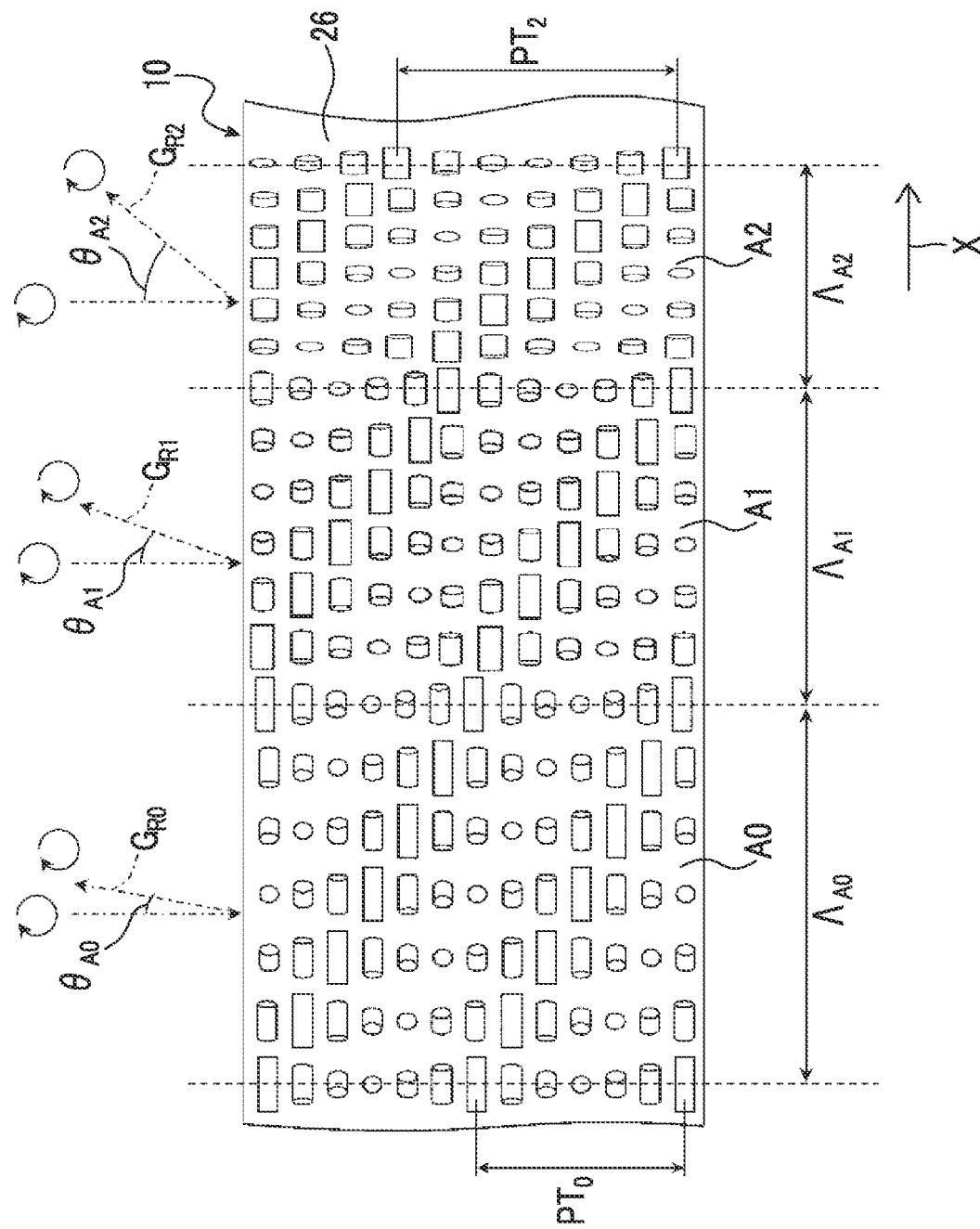
FIG. 17 is a conceptual diagram showing an action of the optical element shown in FIG. 12.

In FIG. 17, in order to clarify the action of the optical element 10, only the patterned cholesteric liquid crystal layer 26 is shown instead of the entirety of the first reflecting layer 14. In addition, due to the same reason, light is incident from the normal direction (front side) into the optical element 10.

As described above, the patterned cholesteric liquid crystal layer 26 selectively reflects right circularly polarized light GR of green light and allows transmission of the other light.

In addition, in the portion shown in FIG. 17, the patterned cholesteric liquid crystal layer 26 includes three regions A0, A1, A2 in order from the left side in FIG. 17, and the respective regions have different lengths of helical pitches and different lengths A of single periods. Specifically, the helical pitch increases in order of the regions A0, A1, and A2, and the length Λ of the single period decreases in order of the regions A0, A1, and A2.

In the optical element 10, in a case where right circularly polarized light $G_{R1}$ of green light is incident into an in-plane region A1 of the patterned cholesteric liquid crystal layer 26, as described above, the light is reflected in a direction that is tilted by a predetermined angle in the arrow X direction, that is, in the in-plane direction in which the direction of the optical axis of the liquid crystal compound changes while continuously rotating with respect to the incidence direction. Likewise, in a case where right circularly polarized light $G_{R2}$ of green light is incident into an in-plane region A2 of the patterned cholesteric liquid crystal layer 26, the light is reflected in a direction that is tilted by a predetermined angle in the arrow X direction with respect to the incidence direction. Likewise, in a case where the right circularly polarized light $G_{R2}$ of green light is incident into an in-plane region A0 of the patterned cholesteric liquid crystal layer 26, the light is reflected in a direction that is tilted by a predetermined angle in the arrow X direction with respect to the incidence direction.

Here, as described above, the patterned cholesteric liquid crystal layer 26 has the liquid crystal alignment pattern in which the optical axis 30A derived from the liquid crystal compound 30 changes while continuously rotating clockwise in the arrow X direction.

Regarding the reflection angles from the patterned cholesteric liquid crystal layer 26, since a single period $\Lambda_{A2}$ of the liquid crystal alignment pattern of the region A2 is shorter than a single period $\Lambda_{A1}$ of the liquid crystal alignment pattern of the region A1, as shown in FIG. 17, a reflection angle $\Lambda_{A2}$ of reflected light of the region A2 is more than a reflection angle $\theta_{A1}$ of reflected light of the region A1 with respect to the incidence light. In addition, since a single period $\Lambda_{A0}$ of the liquid crystal alignment pattern of the region A0 is longer than the single period $\Lambda_{A1}$ of the liquid crystal alignment pattern of the region A1, as shown in FIG. 17, a reflection angle $\theta_{A0}$ of reflected light of the region A0 is less than the reflection angle $\theta_{A1}$ of reflected light of the region A1 with respect to the incidence light.

Here, in the reflection of light from the cholesteric liquid crystal layer, a so-called blue shift (short-wavelength shift) in which the wavelength of light to be selectively reflected shifts to a short wavelength side occurs depending on angles of incidence light. Therefore, in the cholesteric liquid crystal layer that has a liquid crystal alignment pattern in which a direction of an optical axis derived from a liquid crystal compound changes while continuously rotating in at least one in-plane direction, there is a problem in that the amount of light reflected decreases due to influence of blue shift (short-wavelength shift) as the reflection angle increases. Therefore, in a case where the patterned cholesteric liquid crystal layer has regions having different lengths of the single periods over which the direction of the optical axis of the liquid crystal compound rotates by 180° in a plane, the reflection angle varies depending on light incidence positions. Therefore, there is a difference in the amount of light reflected depending on in-plane incidence positions. That is, it was found that there is a problem in that a region where the brightness of light reflected is low depending on in-plane incidence positions is present.

Accordingly, in the example shown in FIG. 17, the amount of reflected light in the region A1 is less than the amount of reflected light in the region A0, and the amount of reflected light in the region A2 is less than the amount of reflected light in the region A1.

On the other hand, in the optical element according to the embodiment of the present invention, the patterned cholesteric liquid crystal layer has regions having different helical pitches in a plane.

In the example shown in FIG. 17, in the patterned cholesteric liquid crystal layer 26, a length $PL_{A2}$ of the pitch of the helical structure in the region A2 is more than a length $PL_{A1}$ of the pitch of the helical structure in the region A1, and a length $PL_{A0}$ of the pitch of the helical structure in the region A0 is more than the length $PL_{A1}$ of the pitch of the helical structure in the region A1.

As a result, the influence of blue shift in which the wavelength of light to be selectively reflected shifts to a short wavelength side can be reduced, and a decrease in the amount of reflected light in the region where the reflection angle of reflected light is large can be suppressed. Specifically, by increasing the length of the pitch of the helical structure such that the selective reflection wavelength during blue shift is the same as the wavelength of light to be incident, the reflection efficiency at the wavelength of light to be incident can be increased. Accordingly, the generation of a region where the brightness of light reflected is low depending on in-plane incidence positions can be suppressed.

In the example shown in FIG. 17, the helical pitch $PL_{A1}$ in the region A1 where the reflection angle $\theta_{A1}$ of reflected light is less than that in the region A0, that is, the length $\Lambda_{A1}$ of the single period is shorter than the length $\Lambda_{A0}$ of the single period in the region A0 is set to be longer than the helical pitch $PL_{A0}$ in the region A0. In addition, the helical pitch $PL_{A2}$ in the region A2 where the reflection angle $\theta_{A2}$ of reflected light is the largest, that is, the length $\Lambda_{A2}$ of the single period is the shortest is set to be longer than the helical pitch in the region A0 and the helical pitch in the region A1. As a result, a decrease in the amount of light reflected from the regions A1 and A2 can be suppressed, and the amounts of light reflected from in-plane incidence positions can be made to be uniform.

This way, in the optical element 10 according to the embodiment of the present invention, in an in-plane region where the reflection angle from the patterned cholesteric liquid crystal layer is large, incidence light is reflected from a region where the pitch of the helical structure is long. On the other hand, in an in-plane region where the reflection angle from the patterned cholesteric liquid crystal layer is small, incidence light is reflected from a region where the pitch of the helical structure is short.

That is, in the optical element 10, by setting the length of the pitch of the helical structure in a plane according to the size of the reflection angle from the patterned cholesteric liquid crystal layer, the brightness of reflected light with respect to incidence light can be increased.

Therefore, in the optical element 10 according to the embodiment of the present invention, the reflection angle dependence of the amount of light reflected in a plane can be reduced.

As described above, the angle of reflected light in a plane of the patterned cholesteric liquid crystal layer 26 increases as the single period $\Lambda$ of the liquid crystal alignment pattern decreases.

In addition, the length of the pitch of the helical structure in a plane of the patterned cholesteric liquid crystal layer 26 in the region where the length of the single period $\Lambda$ over which the direction of the optical axis 30A rotates by 180° in the arrow X direction in the liquid crystal alignment pattern is short is longer than that in the region where the single period $\Lambda$ is long. In the optical element 10, for example, as shown in FIG. 17, the single period $\Lambda_{A2}$ of the liquid crystal alignment pattern in the region A2 of the patterned cholesteric liquid crystal layer 26 is shorter than the single period $\Lambda_{A1}$ of the liquid crystal alignment pattern in the region A1, and the length $PL_{A2}$ of the pitch of the helical structure is long. That is, in the region A2 of the patterned cholesteric liquid crystal layer 26, a large amount of light is reflected.

Accordingly, by setting the length PL of the pitch of the helical structure in a plane with respect to the single period $\Lambda$ of the liquid crystal alignment pattern as a target, the brightness of light reflected from different in-plane regions at different angles can be suitably increased.

In the optical element according to the embodiment of the present invention, as described above, the length of the single period $\Lambda$ of the liquid crystal alignment pattern decreases, the reflection angle increases. Therefore, by setting the length PL of the pitch of the helical structure to be long in the region where the length of the single period $\Lambda$ of the liquid crystal alignment pattern is short, the brightness of reflected light can be increased.

Therefore, in the optical element according to the embodiment of the present invention, in regions having different lengths of single periods of liquid crystal alignment patterns, it is preferable that a permutation of the lengths of the single periods and a permutation of the lengths of the pitches of the helical structures are different from each other.

However, the present invention is not limited to this configuration. In the optical element according to the embodiment of the present invention, in regions having different lengths of single periods of liquid crystal alignment patterns, a permutation of the lengths of the single periods and a permutation of the lengths of the pitches of the helical structures may be the same as each other. In the optical element according to the embodiment of the present invention, the length of the pitch of the helical structure has a preferable range and may be appropriately set according to the single period Λ of the liquid crystal alignment pattern in a plane.

In the patterned cholesteric liquid crystal layer (cholesteric liquid crystal layer) according to the embodiment of the present invention having a liquid crystal alignment pattern in which a direction of an optical axis derived from a liquid crystal compound changes while continuously rotating in at least one in-plane direction, by adjusting a pitch of a helical structure in the cholesteric liquid crystalline phase, a slope pitch of tilted surfaces of bright portions and dark portions with respect to a main surface in a case where a cross-section of the patterned cholesteric liquid crystal layer is observed with a scanning electron microscope (SEM) (an interval between bright portions or between dark portions in the normal direction with respect to the slope is set as ½ surface pitch) can be adjusted, and the selective reflection center wavelength with respect to oblique light can be adjusted.

Here, in the example shown in FIG. 12, the optical element 10 includes one patterned cholesteric liquid crystal layer, but the present invention is not limited thereto. The optical element may include two or more patterned cholesteric liquid crystal layers. In addition, the optical element may include one or more patterned cholesteric liquid crystal layers and one or more cholesteric liquid crystal layers in the related art.

In addition, in a case where the optical element according to the embodiment of the present invention includes two or more patterned cholesteric liquid crystal layers, the optical element may include patterned cholesteric liquid crystal layers having different directions (senses of helical structures) of circularly polarized light to be reflected.

Figure 22:
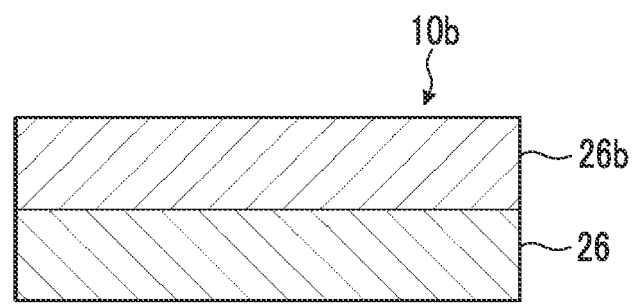
FIG. 22 is a diagram conceptually showing another example of the optical element according to the second aspect of the present invention.

For example, an optical element 10b shown in FIG. 22 has a configuration in which two patterned cholesteric liquid crystal layers having different directions (senses of helical structures) of circularly polarized light to be reflected are laminated. In FIG. 22, the patterned cholesteric liquid crystal layer 26 has the same configuration as that of the patterned cholesteric liquid crystal layer 26 shown in FIG. 12 and the like. On the other hand, a (second) patterned cholesteric liquid crystal layer 26b has the same configuration as that of the patterned cholesteric liquid crystal layer 26, except that the patterned cholesteric liquid crystal layer 26b has a rotation direction opposite to the rotation direction of the helical structure in the patterned cholesteric liquid crystal layer 26. That is, the patterned cholesteric liquid crystal layer 26b has a liquid crystal alignment pattern in which a direction of an optical axis of a liquid crystal compound rotates in one in-plane direction, has regions having different pitches of helical structures in a plane, and has regions having different lengths Λ of the single periods of the liquid crystal alignment patterns.

This way, the optical element further includes reflection cholesteric liquid crystal layers having different directions (senses of helical structures) of circularly polarized light to be reflected such that incidence light in various polarization states can be efficiently reflected.

Here, in a case where the optical element includes a plurality of patterned cholesteric liquid crystal layers having different directions of circularly polarized light to be reflected, it is preferable that the selective reflection center wavelengths are the same (substantially the same).

This way, by providing the patterned cholesteric liquid crystal layers having the same selective reflection center wavelength and different directions of circularly polarized light to be reflected, a reflectivity of specific light can be improved.

Here, in the patterned cholesteric liquid crystal layers having the same selective reflection center wavelength and different directions of circularly polarized light to be reflected, it is preferable that the rotation directions of the optical axes 30A of the liquid crystal compound 30 in the liquid crystal alignment pattern are different from each other.

For example, in a case where the rotation direction of the optical axis 30A of the liquid crystal compound 30 in the patterned cholesteric liquid crystal layer 26 that reflects right circularly polarized light of green light is clockwise as shown in FIG. 14, it is preferable that the rotation direction of the optical axis 30A of the liquid crystal compound 30 in the second patterned cholesteric liquid crystal layer 26b that reflects left circularly polarized light of green light is counterclockwise.

In the cholesteric liquid crystal layers in which the optical axis 30A of the liquid crystal compound 30 continuously rotates in the arrow X direction (the in-plane direction), in a case where the directions of circularly polarized light are different from each other and the rotation directions of the optical axes 30A are the same, a reflection direction of circularly polarized light in the patterned cholesteric liquid crystal layer that reflects right circularly polarized light is opposite to that in the patterned cholesteric liquid crystal layer that reflects left circularly polarized light.

On the other hand, in the patterned cholesteric liquid crystal layers having the same selective reflection center wavelength and different directions of circularly polarized light to be reflected, by setting the rotation directions of the optical axes 30A of the liquid crystal compound 30 in the liquid crystal alignment pattern to be opposite to each other, a reflection direction of circularly polarized light in the patterned cholesteric liquid crystal layer that reflects right circularly polarized light can be made to be the same as that in the patterned cholesteric liquid crystal layer that reflects left circularly polarized light.

In addition, this way, in a case where the optical element according to the embodiment of the present invention includes the patterned cholesteric liquid crystal layers having the same selective reflection center wavelength and different directions of circularly polarized light to be reflected, it is preferable that the single periods Λ in the liquid crystal alignment patterns of the patterned cholesteric liquid crystal layers having the same selective reflection center wavelength are the same in each in-plane region.

However, the optical element according to the embodiment of the present invention is not limited to this configuration and may include a combination of patterned cholesteric liquid crystal layers having different directions of circularly polarized light to be reflected and including an overlapping portion in selective reflection wavelength ranges.

Figure 18:
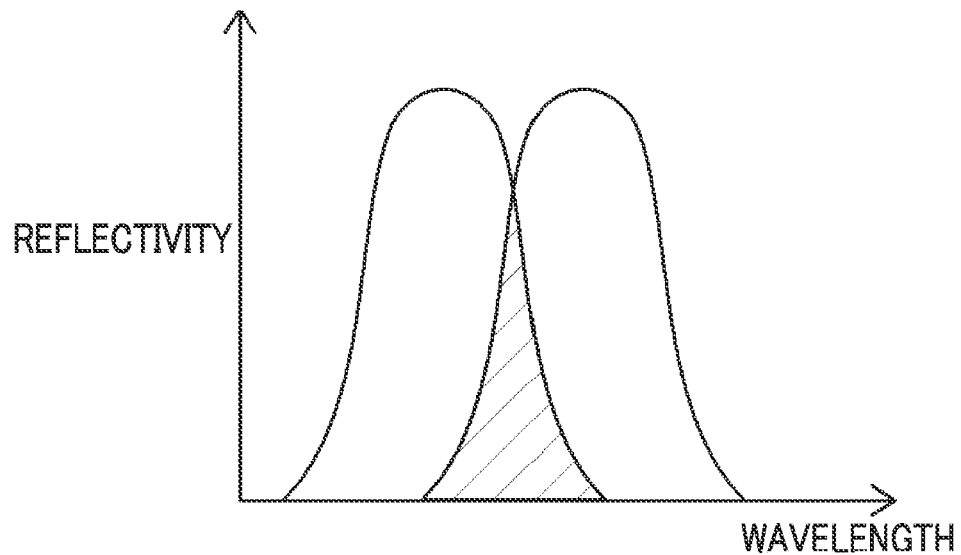
FIG. 18 is a graph showing an optical element according to a second aspect of the present invention.

That is, in the optical element according to the embodiment of the present invention, even in a case where the selective reflection wavelength ranges of the two patterned cholesteric liquid crystal layers forming the combination of the patterned cholesteric liquid crystal layers do not completely match each other, as long as at least a part of the selective reflection wavelength ranges includes an overlapping portion as shown in FIG. 18, light having a wavelength in the overlapping range (hatched area) can be reflected in a large amount of light.

Here, from the viewpoint of the amount of light reflected in the optical element, it is preferable that the patterned cholesteric liquid crystal layers forming the combination of the patterned cholesteric liquid crystal layers include a wide overlapping range in the selective reflection wavelength ranges. Specifically, in a case where a range between two wavelengths of a half value transmittance of the patterned cholesteric liquid crystal layers forming the combination of the patterned cholesteric liquid crystal layers is represented by $\Delta\lambda_h$, a difference between selective reflection center wavelengths is preferably $0.8\times\Delta\lambda_h$ nm or less, more preferably $0.6\times\Delta\lambda_h$ nm or less, and still more preferably $0.4\times\Delta\lambda_h$ nm or less. In particular, it is preferable that the selective reflection center wavelengths match each other, and it is more preferable that the patterned cholesteric liquid crystal layers have the same selective reflection wavelength range.

In a case where ranges between two wavelengths of a half value transmittance of the two patterned cholesteric liquid crystal layers are different, the average value thereof is used as $\Delta\lambda_h$.

In addition, in the optical element according to the embodiment of the present invention, it is preferable that the patterned cholesteric liquid crystal layers forming the combination of the patterned cholesteric liquid crystal layers have the same single period $\Lambda$ in each in-plane region. In the present invention, the lengths of the single periods $\Lambda$ in the liquid crystal alignment patterns being the same represents that the difference between the lengths of the single periods $\Lambda$ is 10% or lower.

Here, in respective regions of the patterned cholesteric liquid crystal layers forming the combination of the patterned cholesteric liquid crystal layers, it is preferable that the difference between the lengths of the single periods $\Lambda$ in the liquid crystal alignment patterns is small. As described above, the length of the single period $\Lambda$ decreases, the reflection angle with respect to incidence light increases. Accordingly, as the difference between the lengths of the single periods $\Lambda$ decreases, directions in which light is reflected from the respective regions of the patterned cholesteric liquid crystal layers forming the combination of the patterned cholesteric liquid crystal layers can be made similar to each other. In the respective regions of the patterned cholesteric liquid crystal layers forming the combination of the patterned cholesteric liquid crystal layers, the difference between the lengths of the single periods $\Lambda$ in the liquid crystal alignment patterns is preferably 5% or lower and more preferably 3% or lower. It is still more preferable that the single periods $\Lambda$ match each other.

In addition, in a case where the optical element according to the embodiment of the present invention includes two or more patterned cholesteric liquid crystal layers, it is also preferable that the optical element includes patterned cholesteric liquid crystal layers having the same twisted direction of helical structures.

For example, in FIG. 17, in a patterned cholesteric liquid crystal layer that has a liquid crystal alignment pattern in which a direction of an optical axis derived from a liquid crystal compound rotates in one in-plane direction and that has regions having different pitches of helical structures in a plane, optically-anisotropic layers having the same direction (sense of helical structures) of circularly polarized light to be reflected may be laminated and used.

Here, it is preferable that the patterned cholesteric liquid crystal layers have different selective reflection center wavelengths and include at least an overlapping portion in selective reflection center wavelengths.

This way, in a case where the patterned cholesteric liquid crystal layers have different selective reflection center wavelengths and have the same direction of circularly polarized light to be reflected, the selective reflection wavelength range can be widened.

Here, in the patterned cholesteric liquid crystal layers having different selective reflection center wavelengths and the same direction of circularly polarized light to be reflected, it is preferable that the rotation directions of the optical axes 30A of the liquid crystal compound 30 in the liquid crystal alignment pattern are the same as each other.

In the patterned cholesteric liquid crystal layers having different selective reflection center wavelengths and the same direction of circularly polarized light to be reflected, by setting the rotation directions of the optical axes 30A of the liquid crystal compound 30 in the liquid crystal alignment pattern to be the same as each other, a reflection direction (diffraction direction) of circularly polarized light in the patterned cholesteric liquid crystal layer that reflects right circularly polarized light can be made to be the same as that in another patterned cholesteric liquid crystal layer that reflects right circularly polarized light.

In addition, this way, in a case where the optical element according to the embodiment of the present invention includes the patterned cholesteric liquid crystal layers having different selective reflection center wavelengths and the same direction of circularly polarized light to be reflected, it is preferable that the single periods $\Lambda$ in the liquid crystal alignment patterns of the patterned cholesteric liquid crystal layers having the same selective reflection center wavelength are the same. As a result, a diffraction angle with respect to right circularly polarized light and a diffraction angle with respect to circularly polarized light of another layer can be made to be the same.

(Method of Forming Regions Having Different Helical Pitches)

In the configuration in which the patterned cholesteric liquid crystal layer has regions having different helical pitches, the chiral agent in which back isomerization, dimerization, isomerization, dimerization or the like occurs during light irradiation such that the helical twisting power (HTP) changes is used. By irradiating the liquid crystal composition with light having a wavelength at which the HTP of the chiral agent changes before or during the curing of the liquid crystal composition for forming the patterned cholesteric liquid crystal layer while changing the irradiation dose for each of the regions, the regions having different helical pitches can be formed.

For example, by using a chiral agent in which the HTP decreases during light irradiation, the HTP of the chiral agent decreases during light irradiation. Here, by changing the irradiation dose of light for each of the regions, for example, in a region that is irradiated with the light at a high irradiation dose, the decrease in HTP is large, the induction of helix is small, and thus the helical pitch increases. On the other hand, for example, in a region that is irradiated with the light at a low irradiation dose, the decrease in HTP is small, helix is induced by the original HTP of the chiral agent, and thus the helical pitch decreases.

The method of changing the irradiation dose of light for each of the regions is not particularly limited, and a method of irradiating light through a gradation mask, a method of changing the irradiation time for each of the regions, or a method of changing the irradiation intensity for each of the regions can be used.

The gradation mask refers to a mask in which a transmittance with respect to light for irradiation changes in a plane.

In all the above-described optical elements according to the embodiment of the present invention, the optical axis 30A of the liquid crystal compound 30 in the liquid crystal alignment pattern of the patterned cholesteric liquid crystal layer continuously rotates only in the arrow X direction.

However, the present invention is not limited thereto, and various configurations can be used as long as the optical axis 30A of the liquid crystal compound 30 in the patterned cholesteric liquid crystal layer continuously rotates in the in-plane direction.

Figure 19:
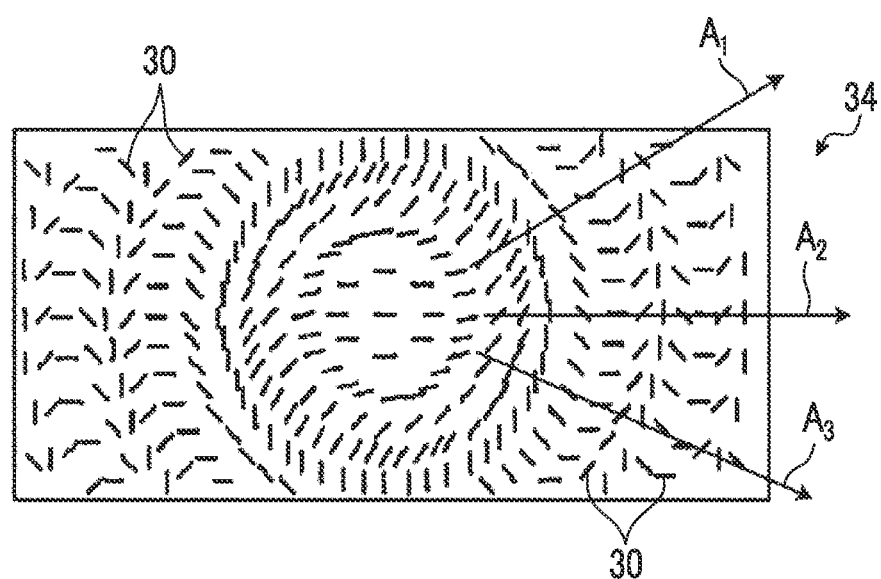
FIG. 19 is a plan view showing another example of a patterned cholesteric liquid crystal layer of the optical element according to the second aspect of the present invention.

For example, a patterned cholesteric liquid crystal layer 34 conceptually shown in a plan view of FIG. 19 can be used, in which a liquid crystal alignment pattern is a concentric circular pattern having a concentric circular shape where the in-plane direction in which the direction of the optical axis of the liquid crystal compound 30 changes while continuously rotating moves from an inside toward an outside.

Alternatively, a liquid crystal alignment pattern can also be used where the in-plane direction in which the direction of the optical axis of the liquid crystal compound 30 changes while continuously rotating is provided in a radial shape from the center of the patterned cholesteric liquid crystal layer 34 instead of a concentric circular shape.

FIG. 19 shows only the liquid crystal compound 30 of the surface of the alignment film as in FIG. 14. However, as in the example shown in FIG. 13, the patterned cholesteric liquid crystal layer 34 has the helical structure in which the liquid crystal compound 30 on the surface of the alignment film is helically turned and laminated as described above.

Further, FIG. 19 shows only one cholesteric liquid crystal layer 34, and the optical element according to the embodiment of the present invention may include the combination of the patterned cholesteric liquid crystal layers as described above. In addition, a preferable configuration and various aspects are the same as those of the above-described various embodiments.

In the patterned cholesteric liquid crystal layer 34 shown in FIG. 19, the optical axis (not shown) of the liquid crystal compound 30 is a longitudinal direction of the liquid crystal compound 30.

In the patterned cholesteric liquid crystal layer 34, the direction of the optical axis of the liquid crystal compound 30 changes while continuously rotating in a direction in which a large number of optical axes move to the outside from the center of the patterned cholesteric liquid crystal layer 34, for example, a direction indicated by an arrow $A_1$, a direction indicated by an arrow $A_2$, a direction indicated by an arrow $A_3$, or . . . .

In addition, as a preferable aspect, for example, the direction of the optical axis of the liquid crystal compound changes while rotating in a radial direction from the center of the patterned cholesteric liquid crystal layer 34 as shown in FIG. 19. In the aspect shown in FIG. 19, counterclockwise alignment is shown. The rotation directions of the optical axes indicated by the respective arrows A1, A2, and A3 in FIG. 19 are counterclockwise toward the outside from the center.

In circularly polarized light incident into the patterned cholesteric liquid crystal layer 34 having the above-described liquid crystal alignment pattern, the absolute phase changes depending on individual local regions having different directions of the optical axes of the liquid crystal compound 30. At this time, the amount of change in absolute phase varies depending on the directions of the optical axes of the liquid crystal compound 30 into which circularly polarized light is incident.

This way, in the patterned cholesteric liquid crystal layer 34 having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 30 and the direction of circularly polarized light to be reflected.

That is, by setting the liquid crystal alignment pattern of the patterned cholesteric liquid crystal layer in a concentric circular shape, the optical element according to the embodiment of the present invention exhibits, for example, a function as a concave mirror or a convex mirror.

Here, in a case where the liquid crystal alignment pattern of the patterned cholesteric liquid crystal layer is concentric circular such that the optical element functions as a concave mirror, it is preferable that the length of the single period Λ over which the optical axis rotates by 180° in the liquid crystal alignment pattern gradually decreases from the center of the patterned cholesteric liquid crystal layer 34 toward the outer direction in the in-plane direction in which the optical axis continuously rotates.

As described above, the reflection angle of light with respect to an incidence direction increases as the length of the single period Λ in the liquid crystal alignment pattern decreases. Accordingly, the length of the single period Λ in the liquid crystal alignment pattern gradually decreases from the center of the patterned cholesteric liquid crystal layer 34 toward the outer direction in the in-plane direction in which the optical axis continuously rotates. As a result, light can be further gathered, and the performance as a concave mirror can be improved.

Here, as described above, in the patterned cholesteric liquid crystal layer, in a region where the length Λ of the single period in the liquid crystal alignment pattern is short and the reflection angle is large, the amount of light reflected is small. That is, in the example shown in FIG. 19, in an outer region where the reflection angle is large, the amount of light reflected is small.

On the other hand, in the optical element according to the embodiment of the present invention, the patterned cholesteric liquid crystal layer has regions having different pitches of helical structures in a plane. In the example shown in FIG. 19, in the patterned cholesteric liquid crystal layer 34, the pitch of the helical structure gradually increases from the center toward the outside in the in-plane direction in which the optical axis continuously rotates. As a result, a decrease in the amount of light reflected in an outer region of the patterned cholesteric liquid crystal layer 34 can be suppressed.

In the present invention, in a case where the optical element functions as a convex mirror, it is preferable that the continuous rotation direction of the optical axis in the liquid crystal alignment pattern is in a direction opposite to that of the case of the above-described concave mirror from the center of the patterned cholesteric liquid crystal layer 34.

In addition, by gradually decreasing the length of the single period Λ over which the optical axis rotates by 180° from the center of the patterned cholesteric liquid crystal layer 34 toward the outer direction in the in-plane direction in which the optical axis continuously rotates, light incident into the patterned cholesteric liquid crystal layer can be further diffused, and the performance as a convex mirror can be improved.

Further, in the patterned cholesteric liquid crystal layer 34, the pitch of the helical structure gradually increases from the center toward the outside in the in-plane direction in which the optical axis continuously rotates. As a result, a decrease in the amount of light reflected in an outer region of the patterned cholesteric liquid crystal layer 34 can be suppressed.

In the present invention, in a case where the optical element functions as a convex mirror, it is preferable that a direction of circularly polarized light to be reflected (sense of a helical structure) from the patterned cholesteric liquid crystal layer is reversed to be opposite to that in the case of a concave mirror, that is, the helical twisted direction of the patterned cholesteric liquid crystal layer is reversed.

Even in this case, by gradually decreasing the length of the single period Λ over which the optical axis rotates by 180° from the center of the patterned cholesteric liquid crystal layer 34 toward the outer direction in the in-plane direction in which the optical axis continuously rotates, light reflected from the patterned cholesteric liquid crystal layer can be further diffused, and the performance as a convex mirror can be improved.

In a state where the helical twisted direction of the patterned cholesteric liquid crystal layer is reversed, it is preferable that the continuous rotation direction of the optical axis in the liquid crystal alignment pattern is reversed from the center of the patterned cholesteric liquid crystal layer 34. As a result, the optical element can be made to function as a concave mirror.

In the present invention, in a case where the optical element is made to function as a convex mirror or a concave mirror, it is preferable that the optical element satisfies the following Expression (4).

$$\Phi(r) = (\pi/\lambda)[(r^2+f^2)^{1/2} - f]$$  Expression (4)

Here, r represents a distance from the center of a concentric circle and is represented by Expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, X represents the selective reflection center wavelength of the patterned cholesteric liquid crystal layer, and f represents a desired focal length.

In the present invention, depending on the uses of the optical element, conversely, the length of the single period Λ in the concentric circular liquid crystal alignment pattern may gradually increase from the center of the patterned cholesteric liquid crystal layer 34 toward the outer direction in the in-plane direction in which the optical axis continuously rotates.

Further, depending on the uses of the optical element such as a case where it is desired to provide a light amount distribution in reflected light, a configuration in which regions having partially different lengths of the single periods Λ in the in-plane direction in which the optical axis continuously rotates are provided can also be used instead of the configuration in which the length of the single period Λ gradually changes in the in-plane direction in which the optical axis continuously rotates.

Further, the optical element according to the embodiment of the present invention may include: a patterned cholesteric liquid crystal layer in which the single period Λ is uniform over the entire surface; and a patterned cholesteric liquid crystal layer in which regions having different lengths of the single periods Λ are provided. This point is also applicable to a configuration in which the optical axis continuously rotates only in the in-plane direction as shown in FIG. 12.

Figure 20:
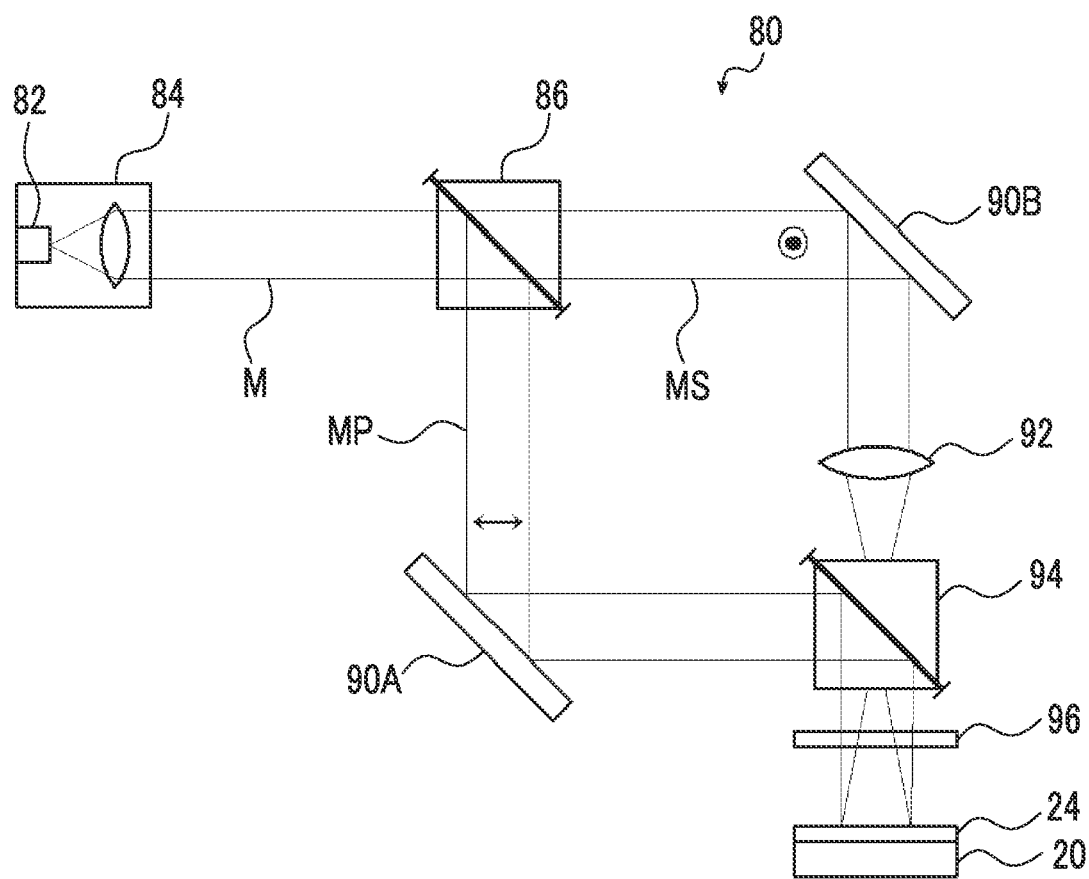
FIG. 20 is a conceptual diagram showing another example of an exposure device that exposes the alignment film of the optical element shown in FIG. 19.

FIG. 20 conceptually shows an example of an exposure device that forms the concentric circular alignment pattern in the alignment film.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is gathered by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 24 on the support 20.

Due to interference between the right circularly polarized light and the left circularly polarized light, the polarization state of light with which the alignment film 24 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 24, a concentric circular alignment pattern in which the alignment state periodically changes can be obtained.

In the exposure device 80, the length Λ of the single period in the liquid crystal alignment pattern in which the optical axis of the liquid crystal compound 30 continuously rotates by 180° can be controlled by changing the refractive power of the lens 92 (the F number of the lens 92), the focal length of the lens 92, the distance between the lens 92 and the alignment film 24, and the like.

In addition, by adjusting the refractive power of the lens 92 (the F number of the lens 92), the length Λ of the single period in the liquid crystal alignment pattern in the in-plane direction in which the optical axis continuously rotates can be changed. Specifically, In addition, the length Λ of the single period in the liquid crystal alignment pattern in the in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases.

Conversely, in a case where the refractive power of the lens 92 becomes stronger, the length Λ of the single period in the liquid crystal alignment pattern rapidly decreases from the inside toward the outside, and the F number decreases.

Figure 15:
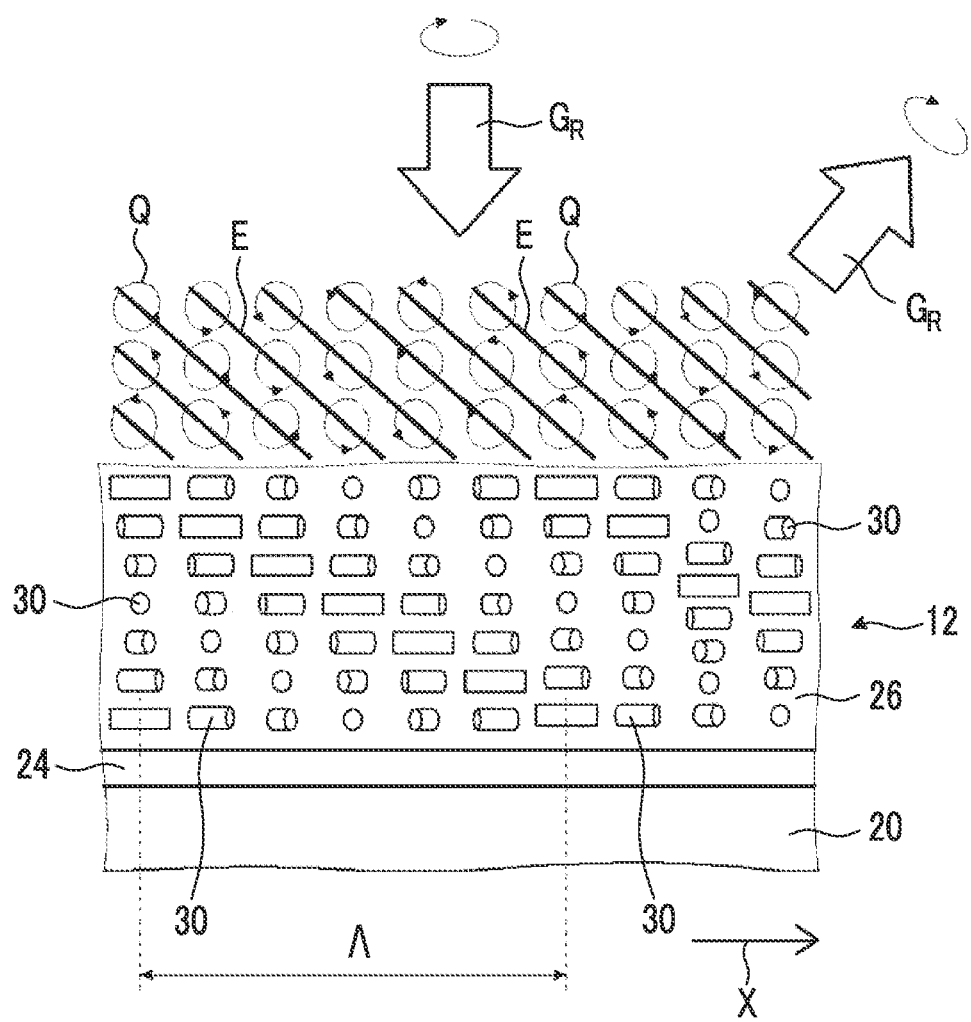
FIG. 15 is a conceptual diagram showing an action of the patterned cholesteric liquid crystal layer of the optical element shown in FIG. 12.

This way, the configuration of changing the length of the single period Λ over which the optical axis rotates by 180° in the in-plane direction in which the optical axis continuously rotates can also be used in the configuration shown in FIGS. 13, 14, and 15 in which the optical axis 30A of the liquid crystal compound 30 changes while continuously rotating only in the in-plane direction as the arrow X direction.

For example, by gradually decreasing the single period Λ of the liquid crystal alignment pattern in the arrow X direction, an optical element that reflects light to be gathered can be obtained.

In addition, by reversing the direction in which the optical axis in the liquid crystal alignment pattern rotates by 180°, an optical element that reflects light to be diffused only in the arrow X direction can be obtained. Likewise, by reversing the direction of circularly polarized light to be reflected (sense of a helical structure) from the cholesteric liquid crystal layer, an optical element that reflects light to be diffused only in the arrow X direction can be obtained. By reversing the direction (the sense of the helical structure) in which the optical axis of the liquid crystal alignment pattern rotates by 180° in a state where the direction of circularly polarized light to be reflected from the cholesteric liquid crystal layer, an optical element that reflects light to be gathered can be obtained.

Further, depending on the uses of the optical element such as a case where it is desired to provide a light amount distribution in reflected light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be gathered can be used.

The optical element according to the embodiment of the present invention can be used for various uses where light is reflected at an angle other than the angle of specular reflection, for example, an optical path changing member, a light gathering element, a light diffusing element to a predetermined direction, a diffraction element, or the like in an optical device.

In the above-described example, the optical element according to the embodiment of the present invention is used as the optical element that reflects visible light. However, the present invention is not limited to this example, and various configurations can be used.

For example, the optical element according to the embodiment of the present invention also may be configured to reflect infrared light or ultraviolet light or to reflect only light other than visible light.

Hereinabove, the optical element according to the second aspect of the present invention has been described above. However, the present invention is not limited to the above-described examples, and various improvements and modifications can be made within a range not departing from the scope of the present invention.

EXAMPLES

Hereinafter, the characteristics of the first aspect of the present invention will be described in detail using examples.

Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1-1

(Formation of Alignment Film)

The following alignment film-forming coating solution was applied to a glass substrate by spin coating. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

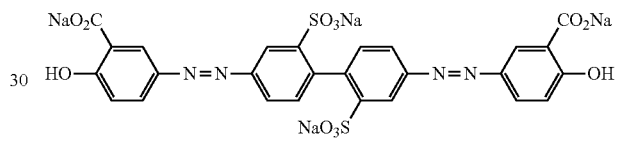

(Exposure of Alignment Film)

By using the exposure device shown in FIG. 4 as the exposure device for exposing the alignment film, the alignment film was exposed to form an alignment film P-1 having an alignment pattern.

In the exposure device, a laser that emits laser light having a wavelength (325 nm) was used as the laser. The exposure dose of the interference light was 300 mJ/cm². The single period (the length over which the optical axis rotates by 180°) of an alignment pattern formed by interference of two laser beams was controlled to be 0.41 μm by changing an intersection angle (intersection angle α) between the two beams.

(Formation of Cholesteric Liquid Crystal Layer)

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.00 parts by mass |
| Chiral agent Ch-2A | 1.00 part by mass |
| Leveling agent T-1 | 0.08 parts by mass |
| Methyl ethyl ketone | 2660.00 parts by mass |

Rod-Shaped Liquid Crystal Compound L-1

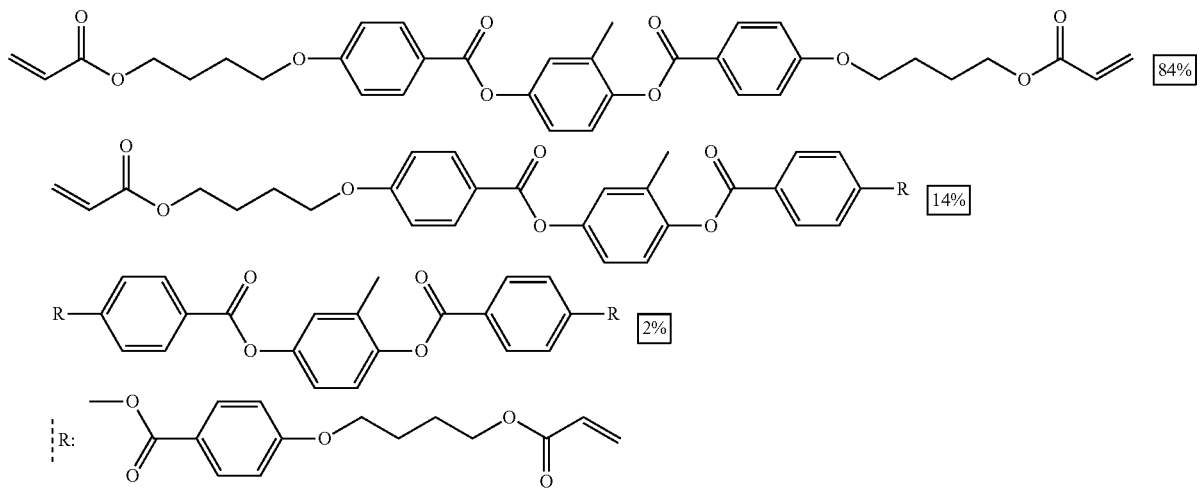

Chiral Agent Ch-1

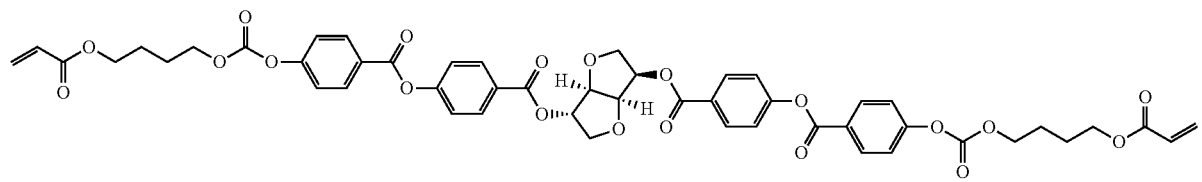 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Chiral Agent Ch-2A

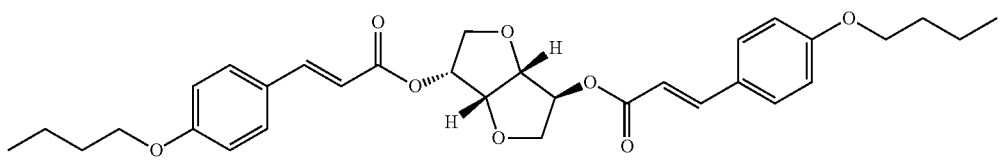 [SMILES: CCCCOc1ccc(/C=C/C(=O)O[C@H]2CO[C@H]3[C@@H]2OC[C@H]3OC(=O)/C=C/c2ccc(OCCCC)cc2)cc1]

Leveling Agent T-1

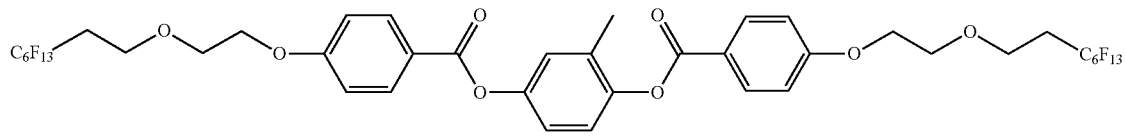

The cholesteric liquid crystal layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the cholesteric liquid crystal layer to an upper surface thereof.

Regarding the first liquid crystal layer, the composition A-1 was applied to the alignment film P-1 to form a coating film, the coating film was heated using a hot plate at 95° C., the coating film was cooled to 80° C., and the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized. At this time, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and a cholesteric liquid crystal layer was formed.

In a case where a cross-section of the cholesteric liquid crystal layer was observed with a scanning electron microscope (SEM), the cholesteric liquid crystalline phase of the cholesteric liquid crystal layer had 2 pitches. In addition, a slope pitch of tilted surfaces of bright portions and dark portions with respect to a main surface (an interval between bright portions or between dark portions in the normal direction with respect to the slope was set as ½ surface pitch) was 0.42 µm. A pitch of tilted surfaces of bright portions and dark portions in a SEM cross-section of the cholesteric liquid crystal layer changes depending on the helical pitch of the cholesteric liquid crystalline phase and the single period of the liquid crystal alignment pattern.

It was verified using a polarizing microscope that the cholesteric liquid crystal layer had a periodic alignment pattern as shown in FIG. 2.

The selective reflection center wavelength of the cholesteric liquid crystal layer was measured using a spectrophotometer (manufactured by Shimadzu Corporation, UV-3150).

Example 1-1

(Formation of Patterned Cholesteric Liquid Crystal Layer)

As the liquid crystal composition forming the cholesteric liquid crystal layer, the following composition A-2A was prepared. This composition A-2A is a liquid crystal composition forming a cholesteric liquid crystal layer (cholesteric liquid crystalline phase) that reflects right circularly polarized light.

Composition A-2A

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.00 parts by mass |
| Chiral agent Ch-2A | 1.00 part by mass |
| Leveling agent T-1 | 0.08 parts by mass |
| Methyl ethyl ketone | 2660.00 parts by mass |

The patterned cholesteric liquid crystal layer was formed by applying multiple layers of the composition A-2A to the alignment film P-1. The application of the multiple layers refers to repetition of the following processes including: preparing a first liquid crystal immobilized layer by applying the first layer-forming composition A-2A to the alignment film, heating the composition A-2A, cooling the composition A-2A, and irradiating the composition A-2A with ultraviolet light for curing; and preparing a second or subsequent liquid crystal immobilized layer by applying the second or subsequent layer-forming composition A-2A to the formed liquid crystal immobilized layer, heating the composition A-2A, cooling the composition A-2A, and irradiating the composition A-2A with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

First, regarding the first liquid crystal layer, the composition A-2A was applied to the alignment film P-1, and the coating film was heated on a hot plate at 95° C. Next, the coating film was cooled to 25° C. and was irradiated with ultraviolet light using a high-pressure mercury lamp. At this time, the irradiation was performed through a long pass filter cutting a wavelength of 350 nm or less. At this time, the coating film was irradiated while changing the irradiation dose of ultraviolet light in a plane. Specifically, the coating film was irradiated while gradually changing the irradiation dose in the in-plane direction in which the optical axis rotated such that the irradiation dose of one end portion was 0 mJ/cm$^2$ and the irradiation dose of another end portion was 10 mJ/cm$^2$. Next, the coating film was heated again to 95° C. on a hot plate, was cooled to 80° C., and was irradiated with ultraviolet light using a high-pressure mercury lamp under a nitrogen atmosphere. As a result, the alignment of the liquid crystal compound was immobilized. At this time, the thickness of the first liquid crystal layer was 0.2 µm.

Regarding the second or subsequent liquid crystal layer, the composition was applied to the first liquid crystal layer, and then a liquid crystal immobilized layer was prepared under the same conditions as described above. This way, by repeating the application multiple times until the total thickness reached a desired thickness, and a patterned cholesteric liquid crystal layer was formed.

In a case where a cross-section of the patterned cholesteric liquid crystal layer was observed with a scanning electron microscope (SEM), the cholesteric liquid crystalline phase of the reflecting layer had 2 pitches. In addition, it was found that the slope pitch of tilted surfaces of bright portions and dark portions with respect to a main surface changed in a range of 0.37 µm to 0.41 µm.

It was verified using a polarizing microscope that the patterned cholesteric liquid crystal layer had a periodic alignment pattern as shown in FIG. 2.

Example 1-2

A patterned cholesteric liquid crystal layer was formed using the same method as that of Example 1-1, except that the single period (the length over which the optical axis rotated by 180°) of the alignment pattern of the alignment film was controlled to be 0.34 µm by changing the intersection angle α and the addition amount of the chiral agent Ch-1 in the composition for forming the patterned cholesteric liquid crystal layer was changed to 5.60 parts by mass.

In a case where a cross-section of the patterned cholesteric liquid crystal layer was observed with a scanning electron microscope (SEM), the cholesteric liquid crystalline phase of the patterned cholesteric liquid crystal layer had 2 pitches. In addition, it was found that the slope pitch of tilted surfaces of bright portions and dark portions with respect to a main surface changed in a range of 0.31 µm to 0.36 µm.

It was verified using a polarizing microscope that the patterned cholesteric liquid crystal layer had a periodic alignment pattern as shown in FIG. 2.

Comparative Example 1-2

A cholesteric liquid crystal layer was formed using the same method as that of Comparative Example 1-1, except that the single period (the length over which the optical axis rotated by 180°) of the alignment pattern of the alignment film was controlled to be 0.34 μm by changing the intersection angle α and the addition amount of the chiral agent Ch-1 in the composition for forming the cholesteric liquid crystal layer was changed to 5.60 parts by mass.

In a case where a cross-section of the cholesteric liquid crystal layer was observed with a scanning electron microscope (SEM), the cholesteric liquid crystalline phase of the cholesteric liquid crystal layer had 2 pitches. In addition, the slope pitch of tilted surfaces of bright portions and dark portions with respect to a main surface was 0.36 μm.

It was verified using a polarizing microscope that the cholesteric liquid crystal layer had a periodic alignment pattern as shown in FIG. 2.

Example 1-3

A patterned cholesteric liquid crystal layer was formed using the same method as that of Example 1-1, except that the single period (the length over which the optical axis rotated by 180°) of the alignment pattern of the alignment film was controlled to be 0.49 μm by changing the intersection angle α and the addition amount of the chiral agent Ch-1 in the composition for forming the patterned cholesteric liquid crystal layer was changed to 3.20 parts by mass.

In a case where a cross-section of the patterned cholesteric liquid crystal layer was observed with a scanning electron microscope (SEM), the cholesteric liquid crystalline phase of the patterned cholesteric liquid crystal layer had 2 pitches. In addition, it was found that the slope pitch of tilted surfaces of bright portions and dark portions with respect to a main surface changed in a range of 0.43 μm to 0.48 μm.

It was verified using a polarizing microscope that the patterned cholesteric liquid crystal layer had a periodic alignment pattern as shown in FIG. 2.

Comparative Example 1-3

A cholesteric liquid crystal layer was formed using the same method as that of Comparative Example 1-1, except that the single period (the length over which the optical axis rotated by 180°) of the alignment pattern of the alignment film was controlled to be 0.49 μm by changing the intersection angle α and the addition amount of the chiral agent Ch-1 in the composition for forming the cholesteric liquid crystal layer was changed to 3.2 parts by mass.

In a case where a cross-section of the cholesteric liquid crystal layer was observed with a scanning electron microscope (SEM), the cholesteric liquid crystalline phase of the cholesteric liquid crystal layer had 2 pitches. In addition, the slope pitch of tilted surfaces of bright portions and dark portions with respect to a main surface was 0.50 μm.

It was verified using a polarizing microscope that the cholesteric liquid crystal layer had a periodic alignment pattern as shown in FIG. 2.

[Evaluation]
(Emitted Light Intensity Distribution (Uniformity))

Figure 10:
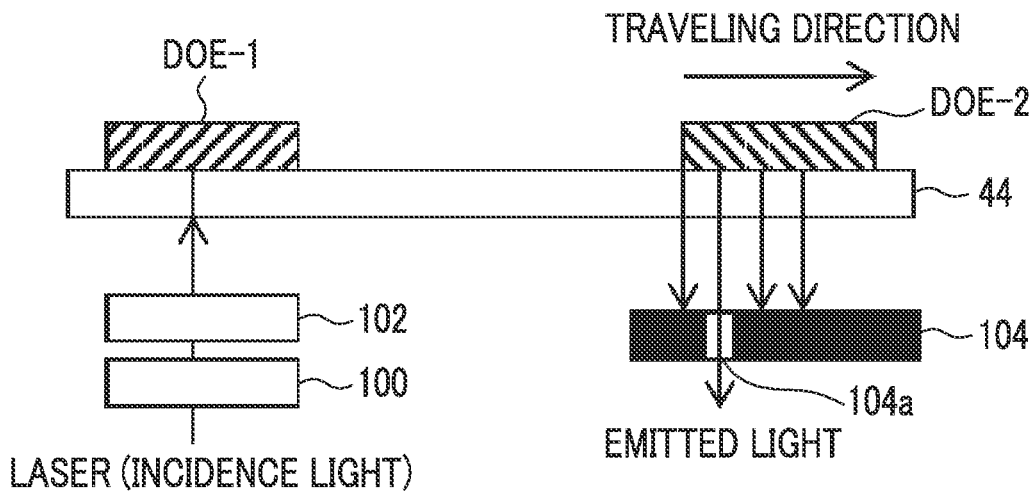
FIG. 10 is a diagram showing a method of measuring an emitted light intensity in Examples.

As shown in FIG. 10, each of the optical elements according to Examples and Comparative Examples prepared as described above was disposed on a surface of the light guide plate 44 to prepare a light guide element. In FIG. 10, the optical element was disposed on a surface (position of DOE-2) of an end portion of the light guide plate on an emission side. In addition, the optical element of which the thickness was adjusted such that the cholesteric liquid crystalline phase had 8 pitches in the optical element according to the corresponding Comparative Example was disposed on a surface (position of DOE-1) of an end portion of the light guide plate 44 on an incidence side.

As the light guide plate 44, a glass light guide plate having a refractive index of 1.52 and a thickness of 1 mm was used.

In addition, the optical element and the light guide plate 44 were bonded to each other using a heat-sensitive adhesive.

In addition, the optical element of DOE-1 and the optical element of DOE-2 were disposed such that directions of in-plane periods of the liquid crystal alignment patterns were opposite to each other.

As shown in FIG. 10, in the end portion of the light guide plate 44 on the side where DOE-1 was disposed, a laser was disposed to face a surface opposite to the surface where DOE-1 was disposed such that a linear polarizer 100 and an λ/4 plate 102 were disposed between the laser and the light guide plate 44.

On the other hand, in the end portion of the light guide plate 44 on the side where DOE-2 was disposed, a light screen 104 was disposed to face a surface opposite to the surface where DOE-2 was disposed. In the light screen 104, a pinhole 104a having a diameter of 2 mm was formed.

In a case where light is emitted from the laser, the light passed through the linear polarizer 100 and the λ/4 plate 102 to be converted into right circularly polarized light, and the right circularly polarized light was incident into the light guide plate 44. The light incident into the light guide plate 44 was incident into the optical element of DOE-1.

The diffracted light that was reflected and diffracted due to the diffraction effect and the selective reflection effect of the optical element of DOE-1 propagated in the light guide plate 44. The light propagated in the light guide plate 44 was diffracted and reflected in the optical element of DOE-2 to be emitted in the direction of the light screen 104.

The intensity (emitted light intensity) of the light emitted from the light guide plate 44 was measured through the pinhole 104a of the light screen 104. By changing the position of the pinhole 104a, the emitted light intensity was measured at each position of the optical element of DOE-2. The emitted light intensity was measured using a Power Meter 1918-C (manufactured by Newport Corporation).

For Example 1-1 and Comparative Example 1-1, the measurement was performed using a laser that emits light having a wavelength of 532 nm. For Example 1-2 and Comparative Example 1-2, the measurement was performed using a laser that emits light having a wavelength of 450 nm. For Example 1-3 and Comparative Example 1-3, the measurement was performed using a laser that emits light having a wavelength of 635 nm.

A ratio of a minimum value to a maximum value of the measured emitted light intensity was obtained to evaluate uniformity based on the following standards.

A: the ratio (minimum value/maximum value) of the minimum value to the maximum value of the emitted light intensity was 0.8 or higher B: the ratio (minimum value/maximum value) of the minimum value to the maximum value of the emitted light intensity was 0.7 or higher and lower than 0.8

C: the ratio (minimum value/maximum value) of the minimum value to the maximum value of the emitted light intensity was 0.5 or higher and lower than 0.7

D: the ratio (minimum value/maximum value) of the minimum value to the maximum value of the emitted light intensity was lower than 0.5

The results are shown in Table 1.

TABLE 1

|  |  | Comparative Example 1-1 | Example 1-1 | Comparative Example 1-2 | Example 1-2 | Comparative Example 1-3 | Example 1-3 |
|---|---|---|---|---|---|---|---|
| Cholesteric Liquid Crystal Layer (Incidence Side) | In-Plane Period [μm] | 0.41 | 0.41 | 0.34 | 0.34 | 0.49 | 0.49 |
|  | Slope Pitch [μm] | 0.42 | 0.42 | 0.36 | 0.36 | 0.50 | 0.50 |
| Cholesteric Liquid Crystal Layer (Emission Side) | In-Plane Period [μm] | 0.41 | 0.41 | 0.34 | 0.34 | 0.49 | 0.49 |
|  | Slope Pitch [μm] | 0.42 | Change | 0.36 | Change | 0.50 | Change |
| Evaluation | Uniformity | D | A | D | A | D | A |

As shown in Table 1, regarding Examples of the optical element according to the embodiment of the present invention in which the patterned cholesteric liquid crystal layer has a liquid crystal alignment pattern in which a direction of an optical axis derived from a liquid crystal compound changes while continuously rotating in at least one in-plane direction and the cholesteric liquid crystal layer has regions having different pitches of helical structures in a plane, it can be seen that, in a case where the optical element is used as a diffraction element of a light guide element on an emission side, the emitted light intensity is constant irrespective of positions such that uniform light was able to be emitted.

Example 1-4

A first patterned cholesteric liquid crystal layer was formed using the same method as that of Example 1-1, except that the addition amount of the chiral agent Ch-1 in the composition A-2A was changed to 4.26 parts by mass.

In a case where a cross-section of the first patterned cholesteric liquid crystal layer was observed with a scanning electron microscope (SEM), the cholesteric liquid crystalline phase of the reflecting layer had 2 pitches. In addition, it was found that the slope pitch of tilted surfaces of bright portions and dark portions with respect to a main surface changed in a range of 0.35 μm to 0.39 μm.

The in-plane period of the first patterned cholesteric liquid crystal layer was 0.41 μm.

A second patterned cholesteric liquid crystal layer was formed on the first patterned cholesteric liquid crystal layer using the same method as that of Example 1-1, except that the addition amount of the chiral agent Ch-1 in the composition A-2A was changed to 3.65 parts by mass.

In a case where a cross-section of the second patterned cholesteric liquid crystal layer was observed with a scanning electron microscope (SEM), the cholesteric liquid crystalline phase of the reflecting layer had 2 pitches. In addition, it was found that the slope pitch of tilted surfaces of bright portions and dark portions with respect to a main surface changed in a range of 0.4 μm to 0.44 μm.

The in-plane period of the second patterned cholesteric liquid crystal layer was 0.41 μm.

A light guide element in which the second patterned cholesteric liquid crystal layer was laminated on the first patterned cholesteric liquid crystal layer was used as DOE-2.

The following optical element was prepared as the optical element (DOE-1) on the incidence side.

A first cholesteric liquid crystal layer was formed using the same preparation method as that of the cholesteric liquid crystal layer according to Comparative Example 1-1, except that the addition amount of the chiral agent Ch-1 in the composition A-1 was changed to 4.26 parts by mass.

In a case where a cross-section of the first cholesteric liquid crystal layer was observed with a scanning electron microscope (SEM), the cholesteric liquid crystalline phase of the first cholesteric liquid crystal layer had 8 pitches. In addition, the slope pitch of tilted surfaces of bright portions and dark portions with respect to a main surface was 0.39 μm.

The single period of the in-plane alignment pattern of the first cholesteric liquid crystal layer was 0.41 μm.

A second cholesteric liquid crystal layer was formed on the first cholesteric liquid crystal layer using the same preparation method as that of the cholesteric liquid crystal layer according to Comparative Example 1-1, except that the addition amount of the chiral agent Ch-1 in the composition A-1 was changed to 3.65 parts by mass.

In a case where a cross-section of the second cholesteric liquid crystal layer was observed with a scanning electron microscope (SEM), the cholesteric liquid crystalline phase of the second cholesteric liquid crystal layer had 8 pitches. In addition, the slope pitch of tilted surfaces of bright portions and dark portions with respect to a main surface was 0.44 μm.

The period of the in-plane alignment pattern of the second cholesteric liquid crystal layer was 0.41 μm.

A light guide element in which the second cholesteric liquid crystal layer was laminated on the first cholesteric liquid crystal layer was used as DOE-1.

[Evaluation]

Using the same method as that of Example 1-1, the optical element prepared as described above was disposed on a surface of the light guide plate 44 to prepare a light guide element. A light guide element according to Example 1-5 was prepared using the same preparation method as that of the light guide element according to Example 1-1, except that the optical element on the incidence side was changed to the optical element on the incidence side prepared in Example 1-4.

As shown in FIG. 10, in the end portion of the light guide plate 44 on the side where DOE-1 was disposed, a laser was disposed to face a surface opposite to the surface where DOE-1 was disposed such that a linear polarizer 100 and an λ/4 plate 102 were disposed between the laser and the light guide plate 44.

On the other hand, in the end portion of the light guide plate 44 on the side where DOE-2 was disposed, a light screen 104 was disposed to face a surface opposite to the surface where DOE-2 was disposed. In the light screen 104, a pinhole 104a having a diameter of 2 mm was formed.

While changing the angle of the incidence light from the laser in FIG. 10 at an interval of 5° in a range of −20° to +20°, the intensity (emitted light intensity) of the light emitted from the light guide plate 44 was measured through the pinhole 104a of the light screen 104. By changing the position of the pinhole 104a, the emitted light intensity was measured at each position of the optical element of DOE-2. The emitted light intensity was measured using a Power Meter 1918-C (manufactured by Newport Corporation).

For Example 1-4 and Example 1-5, the measurement was performed using a laser that emits light having a wavelength of 532 nm.

As a result of a comparison between Examples 1-4 and 1-5, the incidence angle range having a high diffraction efficiency (high emitted light intensity) in Example 1-4 was wider than that in Example 1-5.

As described above, regarding the optical element according to the embodiment of the present invention including a plurality of cholesteric liquid crystal layers having the same twisted direction of the helical structure and having different slope pitches, in which the cholesteric liquid crystal layer has a liquid crystal alignment pattern in which a direction of an optical axis derived from a liquid crystal compound changes while continuously rotating in at least one in-plane direction, and the cholesteric liquid crystal layer has regions having different pitches of helical structures in a plane, it can be seen that, in a case where the optical element is used as a diffraction element of a light guide element on an emission side, the incidence angle range having a high diffraction efficiency can be widened. In a case where this light guide element is used for AR glasses, light can be efficiently reflected with a wide viewing angle range, and a bright display can be obtained.

Hereinafter, the characteristics of the second aspect of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 2-1

<Preparation of First Reflecting Layer>
(Support and Saponification Treatment of Support)

As the support, a commercially available triacetyl cellulose film (manufactured by Fujifilm Corporation, Z-TAC) was used.

The support was caused to pass through an induction heating roll at a temperature of 60° C. such that the support surface temperature was increased to 40° C. Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| Potassium hydroxide | 4.70 parts by mass |
| Water | 15.80 parts by mass |
| Isopropanol | 63.70 parts by mass |
| Surfactant SF-1: | 1.0 part by mass |
| $C_{14}H_{29}O(CH_2CH_2O)_2OH$ | |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| The following modified polyvinyl alcohol | 2.40 parts by mass |
| Isopropyl alcohol | 1.60 parts by mass |
| Methanol | 36.00 parts by mass |
| Water | 60.00 parts by mass |

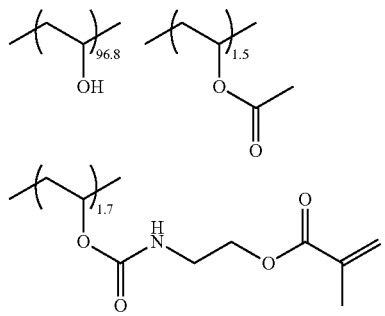

Modified Polyvinyl Alcohol (Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

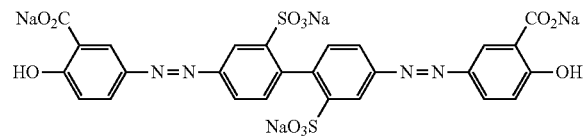

(Exposure of Alignment Film)

By using the exposure device shown in FIG. 20 as the exposure device for exposing the alignment film, the alignment film P-1 was formed. By using the exposure device shown in FIG. 20, the single period of the alignment pattern gradually decreased toward the outer direction.

(Formation of Cholesteric Liquid Crystal Layer)

As the liquid crystal composition forming the cholesteric liquid crystal layer, the following composition A-1 was prepared. This composition A-1 is a liquid crystal composition forming a cholesteric liquid crystal layer (cholesteric liquid crystalline phase) that has a selective reflection center wavelength of 650 nm and reflects right circularly polarized light.

Composition A-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 4.57 parts by mass |
| Leveling agent T-1 | 0.08 parts by mass |
| Methyl ethyl ketone | 977.00 parts by mass |

Chiral Agent Ch-1

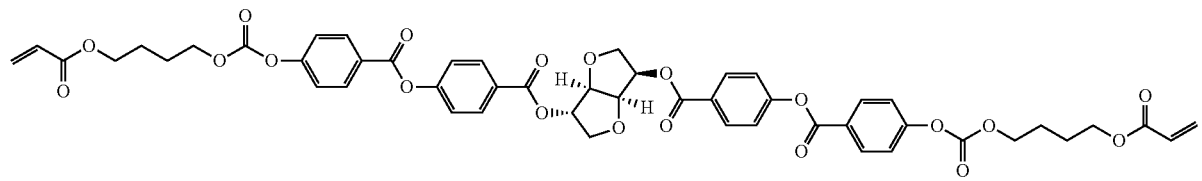 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

The cholesteric liquid crystal layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the composition A-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and a cholesteric liquid crystal layer was formed.

In a case where a cross-section of the cholesteric liquid crystal layer was observed with a scanning electron microscope (SEM), the cholesteric liquid crystalline phase of the cholesteric liquid crystal layer had 8 pitches.

It was verified using a polarizing microscope that the cholesteric liquid crystal layer had a periodically aligned surface having a concentric circular shape (radial shape) as shown in FIG. 19. In the liquid crystal alignment pattern of the cholesteric liquid crystal layer, regarding the single period over which the optical axis of the liquid crystal compound rotated by 180°, the single period of a center portion was 181 μm, the single period of a portion at a distance of 5 mm from the center was 1.8 μm, the single period of a portion at a distance of 10 mm from the center was 1.0 μm. This way, the single period decreased toward the outer direction.

In addition, the selective reflection center wavelengths of the cholesteric liquid crystal layer were 650 nm at the center portion, at the position at a distance of 5 mm from the center, and at the position at a distance of 10 mm from the center. That is, the pitch of the helical structure of the cholesteric liquid crystal layer was uniform in a plane.

The selective reflection center wavelength of the cholesteric liquid crystal layer was measured using a spectrophotometer (manufactured by Shimadzu Corporation, UV-3150).

Example 2-1

(Formation of Patterned Cholesteric Liquid Crystal Layer)

As the liquid crystal composition forming the patterned cholesteric liquid crystal layer, the following composition A-2A was prepared. This composition A-2A is a liquid crystal composition forming a patterned cholesteric liquid crystal layer (cholesteric liquid crystalline phase) that reflects right circularly polarized light.

Composition A-2A

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Chiral agent Ch-2A | 3.84 part by mass |
| Leveling agent T-1 | 0.08 parts by mass |
| Methyl ethyl ketone | 977.00 parts by mass |

Chiral Agent Ch-2A

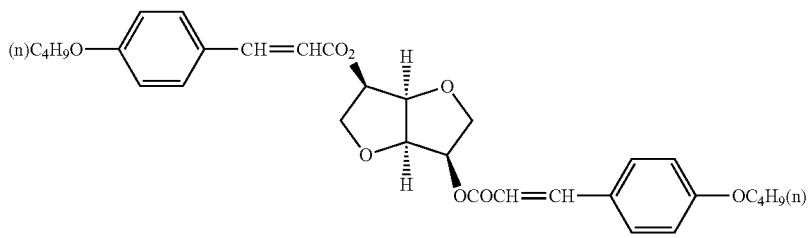

The patterned cholesteric liquid crystal layer was formed by applying multiple layers of the composition A-2A to the alignment film P-1. The application of the multiple layers refers to repetition of the following processes including: preparing a first liquid crystal immobilized layer by applying the first layer-forming composition A-2A to the alignment film, heating the composition A-2A, cooling the composition A-2A, and irradiating the composition A-2A with ultraviolet light for curing; and preparing a second or subsequent liquid crystal immobilized layer by applying the second or subsequent layer-forming composition A-2A to the formed liquid crystal immobilized layer, heating the composition A-2A, cooling the composition A-2A, and irradiating the composition A-2A with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

First, in order to form the first layer, the composition A-2A was applied to the alignment film P-1, and the coating film was heated on a hot plate at 95° C. Next, the coating film was cooled to 25° C. and was irradiated with only ultraviolet light (i-ray) having a wavelength of 365 nm using a LED light source under a nitrogen atmosphere. At this time, the coating film was irradiated while changing the irradiation dose of ultraviolet light in a plane. Specifically, the coating film was irradiated while changing the irradiation dose to 0 mJ/cm$^2$ (center portion), 30 mJ/cm$^2$ (the distance of 5 mm from the center), and 60 mJ/cm$^2$ (the distance of 10 mm from the center) in a plane. Next, the coating film was heated to 95° C. on a hot plate, was cooled to 25° C., and was irradiated with mixed ultraviolet light having a wavelength of 350 nm or shorter using a high-pressure mercury lamp under a nitrogen atmosphere. As a result, the alignment of the liquid crystal compound was immobilized. At this time, the thickness of the first liquid crystal layer was 0.2 µm.

Regarding the second or subsequent liquid crystal layer, the composition was applied to the first liquid crystal layer, and then a liquid crystal immobilized layer was prepared under the same conditions as described above. This way, by repeating the application multiple times until the total thickness reached a desired thickness, and a patterned cholesteric liquid crystal layer was formed.

In a case where a cross-section of the patterned cholesteric liquid crystal layer was observed with a scanning electron microscope (SEM), the cholesteric liquid crystalline phase of the patterned cholesteric liquid crystal layer had 8 pitches.

It was verified using a polarizing microscope that the patterned cholesteric liquid crystal layer had a periodically aligned surface having a concentric circular shape (radial shape) as shown in FIG. 19. In the liquid crystal alignment pattern of the patterned cholesteric liquid crystal layer, regarding the single period over which the optical axis of the liquid crystal compound rotated by 180°, the single period of a center portion was 181 µm, the single period of a portion at a distance of 5 mm from the center was 1.8 µm, the single period of a portion at a distance of 10 mm from the center was 1.0 µm. This way, the single period decreased toward the outer direction. In addition, the selective reflection center wavelengths of the patterned cholesteric liquid crystal layer were 650 nm at the center portion, 700 nm at the position at a distance of 5 mm from the center, and 750 nm at the position at a distance of 10 mm from the center. That is, the pitch of the helical structure of the cholesteric liquid crystal layer increased toward the outside.

Example 2-2

A patterned cholesteric liquid crystal layer was formed using the same method as that of Example 2-1, except that the chiral agent Ch-2A was changed to a chiral agent Ch-2B having the following structure and the addition amount thereof was changed to 3.85 parts by mass.

Chiral Agent Ch-2B

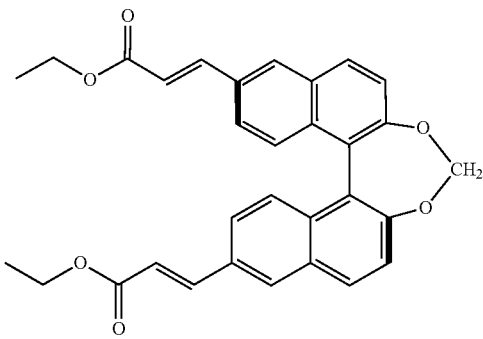

In a case where a cross-section of the patterned cholesteric liquid crystal layer was observed with a scanning electron microscope (SEM), the cholesteric liquid crystalline phase of the patterned cholesteric liquid crystal layer had 8 pitches.

It was verified using a polarizing microscope that the patterned cholesteric liquid crystal layer had a periodically aligned surface having a concentric circular shape (radial shape) as shown in FIG. 19. In the liquid crystal alignment pattern of the patterned cholesteric liquid crystal layer, regarding the single period over which the optical axis of the liquid crystal compound rotated by 180°, the single period of a center portion was 181 μm, the single period of a portion at a distance of 5 mm from the center was 1.8 μm, the single period of a portion at a distance of 10 mm from the center was 1.0 μm. This way, the single period decreased toward the outer direction. In addition, the selective reflection center wavelengths of the patterned cholesteric liquid crystal layer were 650 nm at the center portion, 700 nm at the position at a distance of 5 mm from the center, and 750 nm at the position at a distance of 10 mm from the center. That is, the pitch of the helical structure of the patterned cholesteric liquid crystal layer increased toward the outside.

Comparative Example 2-2

A second cholesteric liquid crystal layer having a selective reflection center wavelength of 650 nm and reflecting left circularly polarized light was formed using the same method as that of Comparative Example 2-1, except that the chiral agent was changed to Ch-3 and the addition amount thereof was changed to 7.69 parts by mass. At this time, the irradiation dose of ultraviolet light was not changed in a plane as in Comparative Example 2-1.

The second cholesteric layer was laminated on the optical element according to Comparative Example 2-1 to prepare an optical element.

In a case where the cholesteric layer reflecting right circularly polarized light and the second cholesteric layer reflecting left circularly polarized light were laminated, the reflecting layers were bonded to each other such that the directions in which the direction of the optical axis in the liquid crystal alignment pattern continuously changed were different from each other.

—Chiral Agent Ch-3—

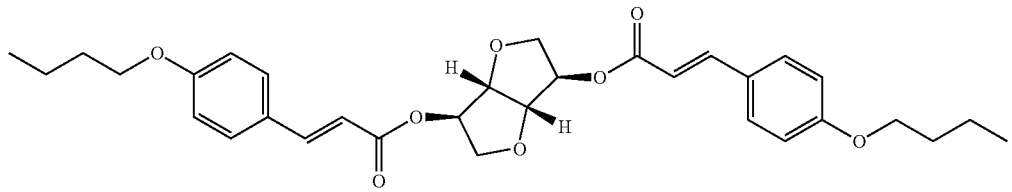 [SMILES: CCCCOc1ccc(/C=C/C(=O)O[C@@H]2CO[C@@H]3[C@H]2OC[C@H]3OC(=O)/C=C/c2ccc(OCCCC)cc2)cc1]

Example 3

A composition A-4A for forming a second patterned cholesteric liquid crystal layer was prepared using the same method as that of Example 2-1, except that the chiral agent was changed to Ch-4A and the addition amount thereof was changed to 7.40 parts by mass. This composition A-4A is a liquid crystal composition forming a second patterned cholesteric liquid crystal layer (cholesteric liquid crystalline phase) that reflects left circularly polarized light.

—Chiral Agent Ch-4A—

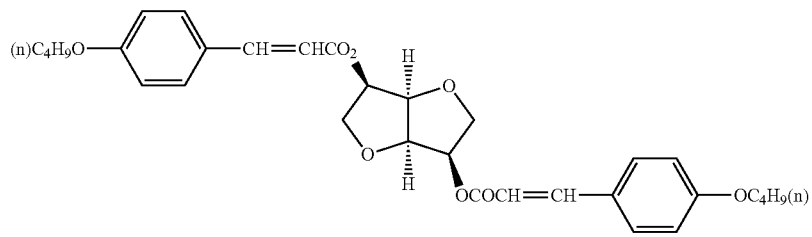

In Example 2-1, the composition A-2A was changed to the composition A-4A, the composition A-4A was applied to the alignment film P-1, and the coating film was heated to 95° C. on a hot plate. Next, the coating film was cooled to 25° C. and was irradiated with only ultraviolet light (i-ray) having a wavelength of 365 nm using a LED light source under a nitrogen atmosphere. At this time, the coating film was irradiated while changing the irradiation dose of ultraviolet light in a plane. Specifically, the coating film was irradiated while changing the irradiation dose to 0 mJ/cm$^2$ (center portion), 45 mJ/cm$^2$ (the distance of 5 mm from the center), and 90 mJ/cm$^2$ (the distance of 10 mm from the center) in a plane. Next, the coating film was heated to 95° C. on a hot plate, was cooled to 25° C., and was irradiated with mixed ultraviolet light having a wavelength of 350 nm or shorter using a high-pressure mercury lamp under a nitrogen atmosphere. As a result, the alignment of the liquid crystal compound was immobilized, and a second patterned cholesteric liquid crystal layer was formed. In addition, the selective reflection center wavelengths of the second patterned cholesteric liquid crystal layer were 650 nm at the center portion, 700 nm at the position at a distance of 5 mm from the center, and 750 nm at the position at a distance of 10 mm from the center. That is, the pitch of the helical structure of the second patterned cholesteric liquid crystal layer increased toward the outside. The second patterned cholesteric layer was laminated on the optical element according to Example 2-1 to prepare an optical element.

In a case where the patterned cholesteric layer reflecting right circularly polarized light and the second patterned cholesteric layer reflecting left circularly polarized light were laminated, the reflecting layers were bonded to each other such that the directions in which the direction of the optical axis in the liquid crystal alignment pattern continuously changed were different from each other.

Example 2-4

A composition A-4B for forming a second patterned cholesteric liquid crystal layer was prepared using the same method as that of Example 2-3, except that the chiral agent was changed to Ch-4B and the addition amount thereof was changed to 3.85 parts by mass. This composition A-4B is a liquid crystal composition forming a patterned cholesteric liquid crystal layer (cholesteric liquid crystalline phase) that reflects left circularly polarized light.

—Chiral Agent Ch-4B—

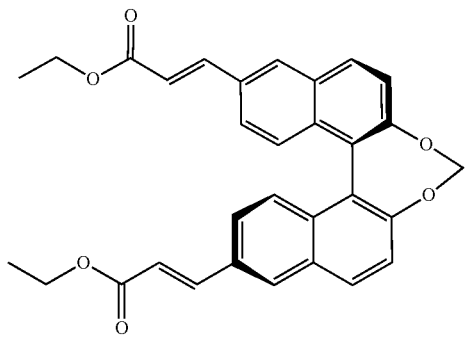

In Example 2-3, the composition A-4A was changed to the composition A-4B, the composition A-4B was applied to the alignment film P-1, and the coating film was heated to 95° C. on a hot plate. Next, the coating film was cooled to 25° C. and was irradiated with only ultraviolet light (i-ray) having a wavelength of 365 nm using a LED light source under a nitrogen atmosphere. At this time, the coating film was irradiated while changing the irradiation dose of ultraviolet light in a plane. Specifically, the coating film was irradiated while changing the irradiation dose to 0 mJ/cm$^2$ (center portion), 30 mJ/cm$^2$ (the distance of 5 mm from the center), and 60 mJ/cm$^2$ (the distance of 10 mm from the center) in a plane. Next, the coating film was heated to 95° C. on a hot plate, was cooled to 25° C., and was irradiated with mixed ultraviolet light having a wavelength of 350 nm or shorter using a high-pressure mercury lamp under a nitrogen atmosphere. As a result, the alignment of the liquid crystal compound was immobilized. In addition, the selective reflection center wavelengths of the second patterned cholesteric liquid crystal layer were 650 nm at the center portion, 700 nm at the position at a distance of 5 mm from the center, and 750 nm at the position at a distance of 10 mm from the center. That is, the pitch of the helical structure of the second patterned cholesteric liquid crystal layer increased toward the outside. The second patterned cholesteric layer was laminated on the optical element according to Example 2-2 to prepare an optical element.

In a case where the patterned cholesteric layer reflecting right circularly polarized light and the second patterned cholesteric layer reflecting left circularly polarized light were laminated, the reflecting layers were bonded to each other such that the directions in which the direction of the optical axis in the liquid crystal alignment pattern continuously changed were different from each other.

[Preparation of Circular Polarization Plate]

In order to perform "Measurement of Light Intensity" described below, a circular polarization plate was prepared as described below.

First, the support on which the undercoat layer was formed was prepared using the same method as that of Example 2-1.

(Formation of Alignment Film P-10)

The following alignment film P-10-forming coating solution was continuously applied to the support on which the undercoat layer was formed using a #2.4 wire bar. The support on which the coating film of the alignment film P-10-forming coating solution was formed was dried using a hot plate at 80° C. for 5 minutes. As a result, an alignment film P-10 was formed.

<Alignment Film P-10-Forming Coating Solution>

| | |
|---|---|
| Material for photo-alignment Polymer A2 | 4.35 parts by mass |
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

<<Synthesis of Polymer A2>>100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dripping funnel, and a reflux cooling pipe and were mixed with each other at room temperature. Next, 100 parts by mass of deionized water was dropped for 30 minutes using a dripping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid.

In a case where the epoxy-containing polyorganosiloxane was analyzed by nuclear magnetic resonance ($^1$H-NMR), a peak having a theoretical intensity based on an oxiranyl group was obtained in the vicinity of chemical shift ($\delta$)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, co-carboxypolycaprolactone monoacrylate (polymerization degree n≈2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

—Polymer A2—

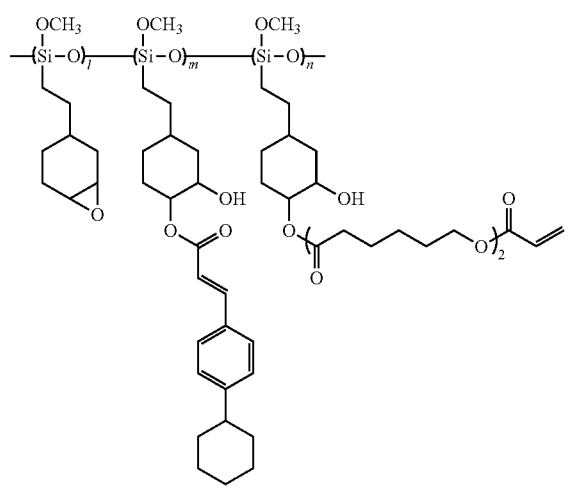

—Low Molecular Weight Compound B2—

The low molecular weight compound B2 shown in the following table (manufactured by Nissin Ion Equipment Co., Ltd., NOMCOAT TAB) was used.

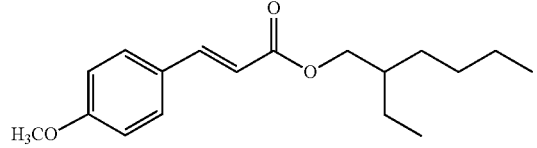

—Crosslinking Agent C1—

The crosslinking agent C1 (manufactured by Nagase ChemteX Corporation, DENACOL EX411) shown in the following table was used.

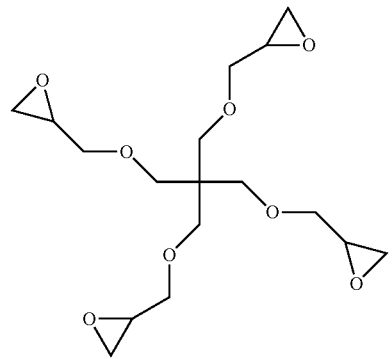

—Compound D1—

The following compound D1 (manufactured by Kawaken Fine Chemicals Co., Ltd., ALUMINUM CHELATE A(W)) shown in the following table was used.

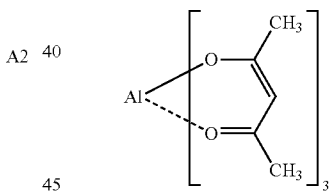

—Compound D2—

The compound D2 (manufactured by Toyo Science Corp., triphenylsilanol) shown in the following table was used.

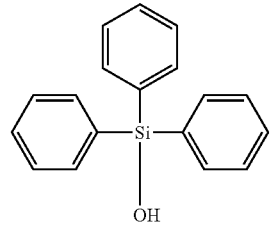

(Exposure of Alignment Film P-10)

By irradiating the obtained alignment film P-10 with polarized ultraviolet light (20 mJ/cm$^2$, using an extra high pressure mercury lamp), the alignment film P-10 was exposed.

[Preparation of Optically-Anisotropic Layer (λ/4 Plate)]

An optically-anisotropic layer was formed by applying the composition C-1 to the alignment film P-10. The applied coating film was heated using a hot plate at 110° C., the coating film was cooled to 60° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and an optically-anisotropic layer was prepared.

In the obtained optically-anisotropic layer, $\Delta n_{650} \times d$ (Re (650)) was 162.5 nm.

[Preparation of Circular Polarization Plate]

A linear polarizing plate was bonded to the triacetyl cellulose film side of the optically-anisotropic layer (λ/4 plate) through a pressure sensitive adhesive to obtain a circular polarization plate.

[Measurement of Reflection Angle]

In a case where light was incident into the prepared optical element from the normal direction (the front; a direction with an angle of 0° with respect to the normal line), angles (reflection angles) of reflected light of red light with respect to the incidence light were measured. It was assumed that light was incident from the surface where the patterned cholesteric liquid crystal layer was provided.

Specifically, each of laser beams having an output center wavelength in a red light range (650 nm) was caused to be vertically incident into the prepare optical element from a position at a distance of 100 cm in the normal direction, and reflected light was captured using a screen disposed at a distance of 100 cm to calculate a reflection angle.

Laser light was caused to be vertically incident into the circular polarization plate prepared as described above corresponding to the wavelength of the laser light to be converted into right circularly polarized light, the right circularly polarized light was incident into the prepared optical element, and the evaluation was performed.

[Measurement of Light Intensity]

Figure 21:
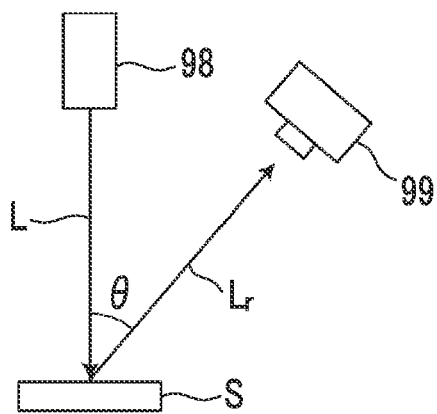
FIG. 21 is a conceptual diagram showing a method of measuring a light intensity.

Using a method shown in FIG. 21, a relative light intensity was measured.

In a case where light was incident into the prepared optical element from the front (direction with an angle of 0° with respect to the normal line), a relative light intensity of reflected light with respect to the incidence light was measured.

Specifically, laser light L having an output center wavelength of 650 nm was caused to be vertically incident from a light source 98 into the prepared optical element S. A light intensity of reflected light $L_r$ reflected at a reflection angle θ was measured using a photodetector 99. A ratio between the light intensity of the reflected light $L_r$ and the light intensity of the light L was obtained to obtain the value of the relative light intensity of the reflected light $L_r$ relative to the incidence light (laser light L) (reflected light $L_r$/laser light L). As the reflection angle θ, the reflection angle measured in advance was used.

In each of the liquid crystal alignment patterns of the patterned cholesteric liquid crystal layers of the prepared optical elements according to Comparative Examples 2-1 and Examples 2-1 and 2-2, laser light was caused to be vertically incident into a position at a distance of 0.7 mm from the center of the concentric circle and a position at a distance of 10 mm from the center of the concentric circle, a relative light intensity of the reflected light relative to the incidence light was measured, and the results thereof were compared to each other. In Comparative Example 2-1, the reflection angle θ of the light incident into the position at a distance of 0.7 mm from the center of the concentric circle was 3°, and the reflection angle θ of the light incident into the position at a distance of 10 mm from the center of the concentric circle was 41°. In Comparative Example 1, a relative light intensity of the reflected light relative to the light incident into the position at a distance of 10 mm from the center of the concentric circle was significantly lower than that of the reflected light relative to the light incident into the position at a distance of 0.7 mm from the center of the concentric circle. In Examples 2-1 and 2-2, the reflection angle θ of the light incident into the position at a distance of 0.7 mm from the center of the concentric circle was 3°, and the reflection angle θ of the light incident into the position at a distance of 10 mm from the center of the concentric circle was 41°. In Examples 2-1 and 2-2, in a case where a relative light intensity of the reflected light relative to the light incident into the position at a distance of 10 mm from the center of the concentric circle was compared to that of the reflected light relative to the light incident into the position at a distance of 0.7 mm from the center of the concentric circle, it was found that a decrease in relative light intensity was suppressed, and the reflection angle dependence of the amount of light reflected in a plane was able to be reduced as compared to Comparative Example 1.

The evaluation of Comparative Examples 2-2 and Examples 2-3 and 2-4 was performed using the same method as that of Comparative Example 2-1, except that laser light incident into the prepared optical element did not pass through the circular polarization plate. In the evaluation of Comparative Examples 2-2 and Examples 2-3 and 2-4, in Examples 2-3 and 2-4, the reflection angle dependence of the amount of light reflected in a plane was able to be reduced as compared to Comparative Example 2-2. In addition, in Examples 2-3 and 2-4, a large amount of light reflected was obtained for polarized light other than circularly polarized light.

As shown in the above results, in the optical element according to the embodiment of the present invention including a cholesteric liquid crystal layer, in which the cholesteric liquid crystal layer has a liquid crystal alignment pattern in which a direction of an optical axis derived from a liquid crystal compound changes while continuously rotating in at least one in-plane direction, the cholesteric liquid crystal layer has regions having different pitches of helical structures in a plane, and the cholesteric liquid crystal layer has regions having different lengths of the single periods of the liquid crystal alignment patterns in a plane, the reflection angle dependence of the amount of light reflected can be reduced. In particular, as in Examples 2-1 and 2-2, in a case where, in regions having different lengths of single periods of liquid crystal alignment patterns, a permutation of the lengths of the single periods and a permutation of the lengths (selective reflection center wavelengths) of the pitches of the helical structures in the cholesteric liquid crystal layers are different from each other, a larger amount of light reflected can be obtained.

In addition, as in Examples 2-3 and 2-4, in a case where a plurality of cholesteric liquid crystal layers having different twisted directions (directions of circularly polarized light to be reflected) of helical structures of the cholesteric liquid crystal layers are combined, a larger amount of light reflected can also be obtained for various incident polarized light.

The present invention is suitably applicable to various uses where light is reflected in an optical device, for example, a diffraction element that causes light to be incident into a light guide plate of AR glasses or emits light to the light guide plate.

EXPLANATION OF REFERENCES 10, 10b: optical element
12: reflection member
14: first reflecting layer
20: support
24: alignment film
26, 26b, 34: patterned cholesteric liquid crystal layer
30: liquid crystal compound
30A: optical axis
60, 80: exposure device
62, 82, 98: laser
64, 84: light source
65: $\lambda/2$ plate
68, 86, 94: polarization beam splitter
70A, 70B, 90A, 90B: mirror
72A, 72B, 96: $\lambda/4$ plate
92: lens
99: photodetector
100: linear polarizer
102: $\lambda/4$ plate
104: light screen
104a: pinhole
110: light guide element
112: light guide plate
114: first diffraction element
116: second diffraction element
118: third diffraction element
120: dove prism
122: linear polarizer
124: $\lambda/4$ plate
M: laser light
MA, MB: beam
MP: P polarized light
MS: S polarized light
Po: linearly polarized light
$P_R$: right circularly polarized light
$P_L$: left circularly polarized light
α: intersection angle
Q: absolute phase
E: equiphase surface
S: sample
L: light
$L_r$: reflected light
$I_0$ to $I_3$: light propagated in light guide plate
$P_1$ to $P_4$: position
$R_1$ to $R_4$: light
$PT_1$, $PT_2$: helical pitch

What is claimed is:

1. An optical element comprising a plurality of patterned cholesteric liquid crystal layers that are obtained by immobilizing a cholesteric liquid crystalline phase,
wherein the patterned cholesteric liquid crystal layers have different twisted directions of helical structures,
the patterned cholesteric liquid crystal layers have a liquid crystal alignment pattern in which a direction of an optical axis derived from a liquid crystal compound changes while continuously rotating in at least one in-plane direction,
the patterned cholesteric liquid crystal layers have regions having different pitches of helical structures in a plane,
in a case where a length over which the direction of the optical axis derived from the liquid crystal compound rotates by 180° in a plane is set as a single period, the patterned cholesteric liquid crystal layers have regions having different lengths of the single periods,
the patterned cholesteric liquid crystal layers having different twisted directions of the helical structures have the same selective reflection center wavelength, and
in the patterned cholesteric liquid crystal layers having different twisted directions of helical structures, directions in which the direction of the optical axis derived from the liquid crystal compound continuously rotates in the liquid crystal alignment pattern are different from each other.

2. The optical element according to claim 1,
wherein in the patterned cholesteric liquid crystal layer, a pitch of a helical structure is larger in a region where the length of the single period is shorter and a reflection angle of reflected light is larger, and the pitch of the helical structure is smaller in a region where the length of the single period is longer and the reflection angle of the reflected light is smaller.

3. The optical element according to claim 1,
wherein in the patterned cholesteric liquid crystal layer, the length of the single period in the liquid crystal alignment pattern gradually decreases in the in-plane direction in which the direction of the optical axis derived from the liquid crystal compound changes while continuously rotating in the liquid crystal alignment pattern.

4. The optical element according to claim 1,
wherein the liquid crystal alignment pattern is a concentric circular pattern having a concentric circular shape where the in-plane direction in which the direction of the optical axis derived from the liquid crystal compound changes while continuously rotating moves from an inside toward an outside.

5. The optical element according to claim 1,
wherein the length of the single period in the liquid crystal alignment pattern is 50 m or less.

* * * * *